(12) United States Patent
Antchak et al.

(10) Patent No.: US 9,151,366 B2
(45) Date of Patent: Oct. 6, 2015

(54) INTELLIGENT BELT DRIVE SYSTEM AND METHOD

(75) Inventors: John R. Antchak, Aurora (CA); Gary J. Spicer, Mississauga (CA); Warren Williams, Oakville (CA); Zbyslaw Staniewicz, Mississauga (CA); Andrew M. Boyes, Aurora (CA); Gerald J. Hamers, Woodbridge (CA); Ron Farewell, Mississauga (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 367 days.

(21) Appl. No.: 13/821,914

(22) PCT Filed: Sep. 12, 2011

(86) PCT No.: PCT/CA2011/001032
§ 371 (c)(1),
(2), (4) Date: Mar. 25, 2013

(87) PCT Pub. No.: WO2012/031361
PCT Pub. Date: Mar. 15, 2012

(65) Prior Publication Data
US 2013/0172137 A1 Jul. 4, 2013

Related U.S. Application Data

(60) Provisional application No. 61/381,929, filed on Sep. 10, 2010, provisional application No. 61/382,892, filed on Sep. 14, 2010, provisional application No. 61/391,266, filed on Oct. 8, 2010, provisional application No. 61/531,021, filed on Sep. 5, 2011, provisional application No. 61/486,189, filed on May 13, 2011.

(51) Int. Cl.
| | |
|---|---|
| *F16H 7/08* | (2006.01) |
| *F16H 7/22* | (2006.01) |
| *F16H 7/14* | (2006.01) |
| *F16H 7/12* | (2006.01) |
| *B60K 25/02* | (2006.01) |

(52) U.S. Cl.
CPC *F16H 7/12* (2013.01); *B60K 25/02* (2013.01); *F16H 7/1263* (2013.01); *F16H 7/1281* (2013.01); *F16H 2007/0806* (2013.01); *F16H 2007/0812* (2013.01); *F16H 2007/0823* (2013.01); *F16H 2007/0885* (2013.01); *F16H 2007/0891* (2013.01); *F16H 2007/0893* (2013.01)

(58) Field of Classification Search
CPC ............ F02B 67/06; F16H 7/1281; F16H 2007/0885; F16H 2007/0861; F16H 2007/0887
USPC ............... 474/101, 113, 111, 135, 133, 109
See application file for complete search history.

(56) References Cited

U.S. PATENT DOCUMENTS

| | | | |
|---|---|---|---|
| 3,954,016 A | 5/1976 | Sarosy et al. | |
| 4,131,306 A | 12/1978 | Sokoly et al. | |
| (Continued) | | | |

FOREIGN PATENT DOCUMENTS

| | | | |
|---|---|---|---|
| CA | 2469497 A1 | 6/2003 | |
| CA | 2508352 A1 | 7/2004 | |
| (Continued) | | | |

OTHER PUBLICATIONS

Extended EP Search Report for EP118822962, Jun. 24, 2014.
(Continued)

*Primary Examiner* — Henry Liu
(74) *Attorney, Agent, or Firm* — Millman IP Inc.

(57) ABSTRACT

In one aspect, the invention relates to a tensioner that is capable of precognitively anticipating when it is desirable to increase the tension in a belt or other endless drive element so as to prevent belt slip prior to events that would raise the risk of it.

7 Claims, 46 Drawing Sheets

(56) References Cited

U.S. PATENT DOCUMENTS

| | | | |
|---|---|---|---|
| 4,478,595 A * | 10/1984 | Hayakawa et al. | 474/109 |
| 4,674,781 A | 6/1987 | Reece et al. | |
| 4,702,727 A | 10/1987 | Dahm | |
| 4,728,260 A | 3/1988 | Ishii | |
| 4,850,466 A | 7/1989 | Rogakos et al. | |
| 4,878,461 A | 11/1989 | Sapienza, IV et al. | |
| 4,885,954 A | 12/1989 | Wanlass | |
| 4,893,704 A | 1/1990 | Fry et al. | |
| 5,338,076 A | 8/1994 | Tanaka | |
| 5,439,420 A * | 8/1995 | Meckstroth et al. | 474/133 |
| 5,634,676 A | 6/1997 | Feder | |
| 5,733,214 A * | 3/1998 | Shiki et al. | 474/69 |
| 5,862,903 A | 1/1999 | Gruden et al. | |
| 5,983,739 A | 11/1999 | Feder | |
| 6,374,608 B1 | 4/2002 | Corris et al. | |
| 6,375,588 B1 | 4/2002 | Frankowski et al. | |
| 6,422,962 B1 | 7/2002 | Lehtovaara et al. | |
| 6,547,692 B1 | 4/2003 | Ries-Mueller et al. | |
| 6,821,223 B2 * | 11/2004 | Henry | 474/134 |
| 6,834,228 B2 * | 12/2004 | Serkh et al. | 701/115 |
| 6,953,407 B2 * | 10/2005 | Kitamura et al. | 474/135 |
| 7,217,206 B2 * | 5/2007 | Stone et al. | 474/110 |
| 2002/0039942 A1 * | 4/2002 | Liu et al. | 474/133 |
| 2002/0039945 A1 * | 4/2002 | Ali et al. | 474/135 |
| 2003/0083803 A1 * | 5/2003 | Serkh et al. | 701/115 |
| 2005/0029991 A1 * | 2/2005 | Albertson | 322/29 |
| 2005/0192142 A1 * | 9/2005 | Stone et al. | 474/101 |
| 2005/0261094 A1 * | 11/2005 | Foster et al. | 474/113 |
| 2005/0282668 A1 * | 12/2005 | Ali et al. | 474/101 |
| 2006/0178240 A1 * | 8/2006 | Hansel | 474/135 |
| 2007/0080037 A1 * | 4/2007 | Larry et al. | 192/21.5 |
| 2007/0142145 A1 * | 6/2007 | Namuduri | 474/110 |
| 2009/0186726 A1 | 7/2009 | Van Maanen | |
| 2009/0195203 A1 * | 8/2009 | Yurgil | 318/452 |
| 2010/0102783 A1 * | 4/2010 | McDonald et al. | 322/23 |
| 2010/0137083 A1 * | 6/2010 | Carlson | 474/110 |
| 2012/0065009 A1 * | 3/2012 | Mueller | 474/101 |

FOREIGN PATENT DOCUMENTS

| | | |
|---|---|---|
| DE | 4114716 A1 | 11/1992 |
| DE | 10225268 A1 | 12/2003 |
| EP | 0676537 A1 | 3/1995 |
| EP | 1564440 B1 | 7/2008 |
| FR | 2899685 A1 | 10/2007 |
| FR | 2899685 A1 | 12/2007 |
| JP | 51-003013 | 1/1976 |
| JP | 57-161344 | 10/1982 |
| JP | 60-172048 | 11/1985 |
| JP | 62-10522 Y2 | 3/1987 |
| JP | 63-97747 | 6/1988 |
| JP | 01288656 A | 11/1989 |
| JP | 1-310125 | 12/1989 |
| JP | 2-118252 A | 5/1990 |
| JP | 2-225234 A | 9/1990 |
| JP | 3-91559 U | 9/1991 |
| JP | 04252823 A | 8/1992 |
| JP | 10-299847 A | 11/1998 |
| JP | 2001-059555 A | 3/2001 |
| JP | 2001-289291 A | 10/2001 |
| JP | 2005265039 | 9/2005 |
| JP | 2006189073 A | 7/2006 |
| KR | 1019930025186 B1 | 12/1998 |
| KR | 20070025396 A | 3/2007 |
| KR | 1020070025396 A | 3/2007 |
| WO | 00/00756 A1 | 1/2000 |
| WO | 2004061333 A1 | 7/2004 |
| WO | 2004061333 A4 | 7/2004 |
| WO | 2005119089 A1 | 12/2005 |
| WO | 2010094127 A1 | 8/2010 |
| WO | 2012031361 A1 | 3/2012 |

OTHER PUBLICATIONS

PCT/CA2011/001032 Search Report Jan. 24, 2012.
PCT/CA2012/000466 Search Report Aug. 28, 2012.
PCT/CA2012/000818 Search Report Dec. 14, 2012.
PCT/CA2013/000258 Search Report Jul. 10, 2013.

* cited by examiner

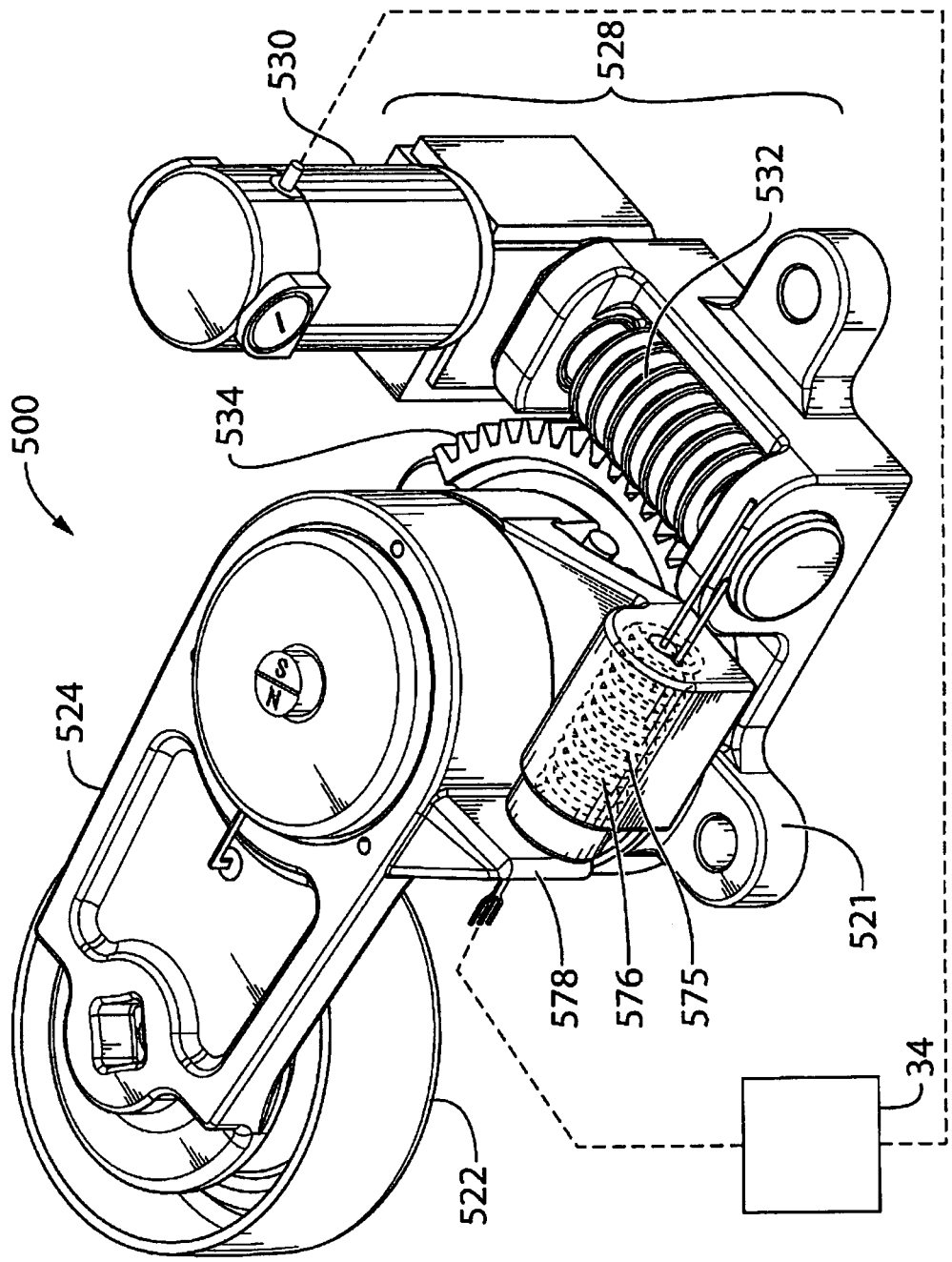

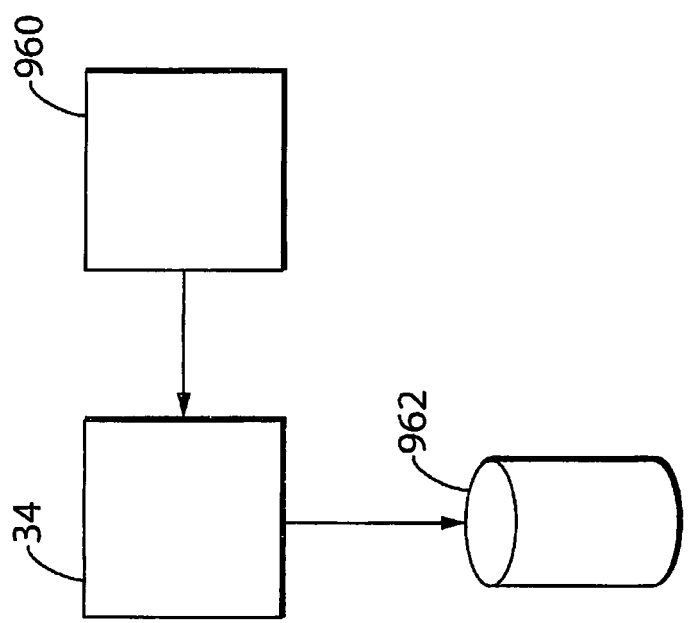

INTELLIGENT BELT DRIVE SYSTEM AND METHOD

CROSS REFERENCE TO RELATED APPLICATIONS

This application is a national phase entry application of PCT/CA2011/001032, filed Sep. 12, 2011, which claims the benefit of: U.S. Provisional Application No. 61/381,929, filed Sep. 10, 2010; U.S. Provisional Application No. 61/382,892, filed Sep. 14, 2010; U.S. Provisional Application No. 61/391,266, filed October, 2010; U.S. Provisional Application No. 61/486,189, filed May 13, 2011; and, U.S. Provisional Application No. 61/531,021, filed Sep. 5, 2010.

FIELD OF THE INVENTION

The present invention relates to tensioners for tensioning engine driven elements such as timing belts, timing chains and accessory drive belts. In particular, the present invention is directed to belt tensioners that have the capability to adjust the belt tension in the belt.

BACKGROUND OF THE INVENTION

Tensioners for timing belts, timing chains and accessory drive belts are well known. Some tensioners are adjustable in terms of the amount of tension is generated in the belt during operation of the engine. Such tensioners react to certain sensed conditions that indicate a potential for, or occurrence of, belt slip. While such systems may reduce the frequency of belt slip, they are, by design, inherently permitting some belt slip to occur. In those systems that sense the actual occurrence of belt slip, belt slip has already necessarily occurred before the tensioner will increase belt tension. In systems where the conditions for belt slip are sensed, the conditions that create the potential for belt slip must already occur for them to be sensed by the tensioner, which inherently means therefore that belt slip can occur before the tensioner has reacted to increase belt tension.

While these systems have some advantage in terms of reducing the frequency of belt slip, they still permit some belt slip to occur, which may be detrimental to the belt, to certain accessories driven by the belt, and to the perception of quality of a person hearing the chirp that can accompany belt slip.

Furthermore, the tension adjustment mechanisms employed by such tensioning systems may be expensive, and/or unreliable.

It would be beneficial to provide a tensioning system that has at least partially addresses one or more of these problems.

SUMMARY OF THE INVENTION

In one aspect, the invention relates to a tensioner that is capable of precognitively anticipating when it is desirable to increase the tension in a belt or other endless drive element so as to prevent belt slip prior to events that would raise the risk of it.

In another aspect, the invention relates to controlling a tensioner that has adjustable tension, in such a way as to avoid the tendency of the tensioner to cycle between high and low tension settings.

In another aspect, the invention relates to the use of one or more of the parameters described herein for the purpose of preventing belt slip.

In another aspect the invention relates to the embodiments of tensioners shown and described herein.

BRIEF DESCRIPTION OF THE DRAWINGS

FIG. 2b is a sectional side view of variant of the tensioner shown in FIG. 2a;

FIG. 3a is another plan view of the tensioner shown in FIG. 1a;

FIG. 3b is another plan view of the tensioner shown in FIG. 1a;

FIG. 4b is a perspective view of the tensioner shown in FIG. 4a;

FIG. 4c is another perspective view of the tensioner shown in FIG. 4a;

FIG. 8b is a cutaway perspective view of the tensioner shown in FIG. 8a;

FIG. 10 is a perspective view of another tensioner in accordance with yet another embodiment of the present invention;

FIG. 30 is a controller for a tensioner.

DETAILED DESCRIPTION OF THE INVENTION

Figure 1A:
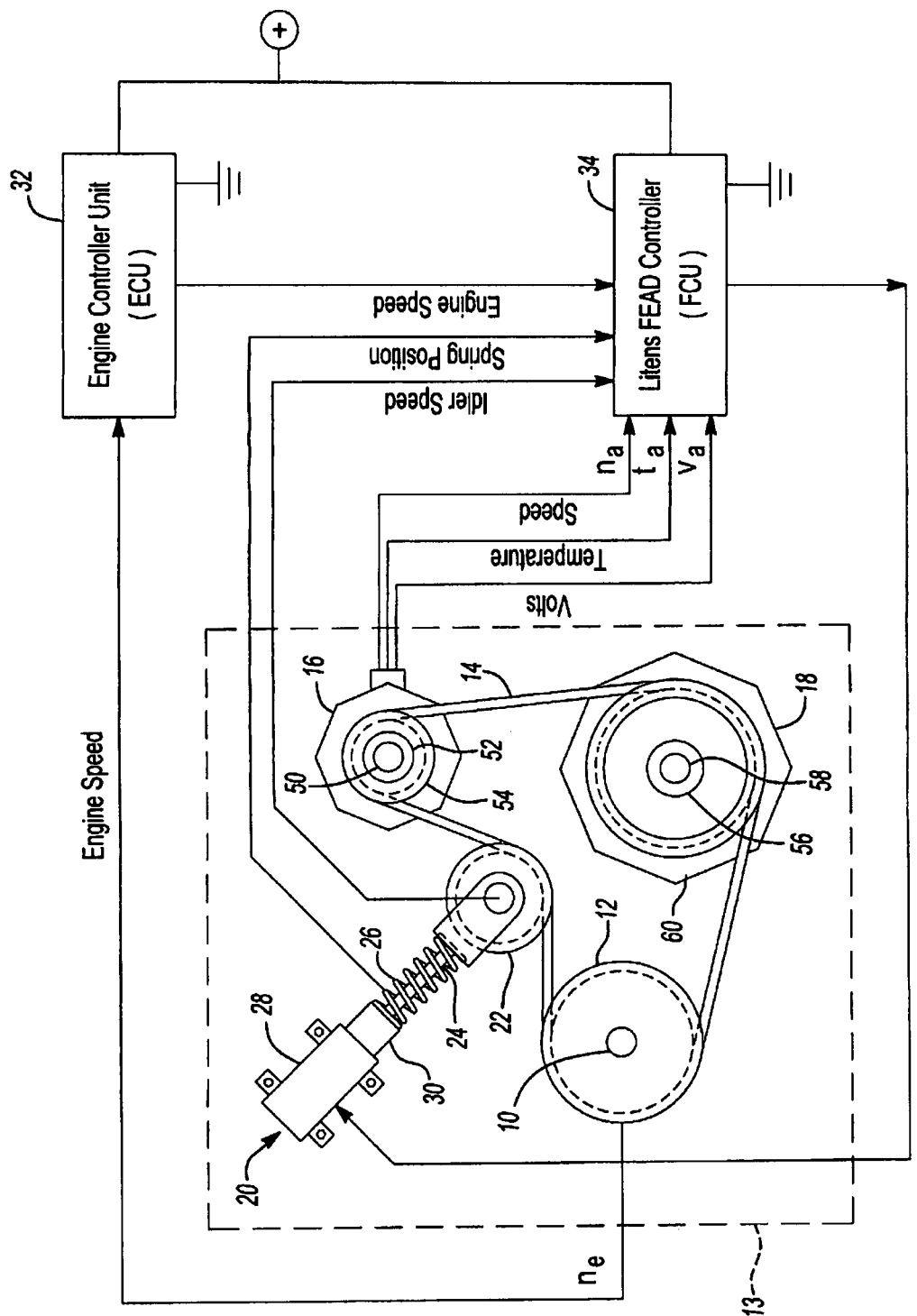
FIG. 1a is a plan view of an engine with a belt, a plurality of accessories and a tensioner, in accordance with an embodiment of the present disclosure.

Reference is made to FIG. 1*a*, which shows a crankshaft 10 from an engine 13 from a vehicle. The crankshaft 10 has a crankshaft pulley 12 thereon. The crankshaft pulley 12 drives one or more vehicle accessories via a belt 14. The accessories may include an alternator 16, an air conditioning compressor 18, a water pump (not shown), a power steering pump (not shown) and/or any other suitable accessory. Each of the driven accessories has a shaft, and a pulley that is connectable and disconnectable from the shaft via a clutch. The alternator shaft, clutch and pulley are shown at 50, 52 and 54 respectively. The air conditioning compressor shaft, clutch and pulley are shown at 56, 58 and 60 respectively. This permits each of the accessories to be shut off when not needed even though the belt 14 itself is still being driven by the crankshaft 10.

Providing at least a certain amount of tension in the belt 14 is beneficial in that it reduces the amount of slip that can occur between the belt 14 and the driven accessories or even between the belt and the crankshaft 10. However, providing an unnecessarily high tension in the belt 14 has many detrimental effects. For example, it causes more power from the engine 13 to be consumed in driving the accessories, leaving less power for use in driving the vehicle. Thus, to achieve a particular level of performance from the vehicle, a greater amount of fuel would be consumed than would be consumed if the power loss were smaller. Additionally, a high belt tension generates greater hub loads on the pulleys for the driven accessories, which necessitates the use of relatively larger shafts on the accessories, larger bearings to support the shafts, heavier brackets to hold the accessories in place, all of which add to the weight of the vehicle and thereby negatively impact fuel economy for the vehicle.

A belt tensioner 20 is shown which keeps the belt 14 tensioned so as to reduce belt slip, and to keep the belt on the pulleys of the crankshaft 10 and accessories. The tensioner 20 includes a tensioner pulley 22 which engages the belt 14, a tensioner arm 24 which holds the tensioner pulley 22, a tensioner biasing member 26 for biasing the tensioner arm 24 towards a free arm stop position (the position the arm 24 would reach if it was not pressing into the belt 14), which would represent the position of reduced stored mechanical potential energy within the elastomeric biasing spring within the tensioner travel range, and a load stop position (the position the arm 24 would reach if the arm 24 were pushed all the way throughout its range of travel away from the free arm stop position), which would represent the position of increased stored mechanical potential energy within the elastomeric biasing spring within the tensioner travel range. The tensioner 20 further includes a tensioner actuator 28 which is operatively connected to the tensioner pulley 22 and tensioner arm 24 to move the pulley 22 and arm 24 between the free arm stop and load stop positions. The tensioner 20 may include structure that dampens its motion.

The belt tensioner 20 may have any suitable structure that provides the aforementioned capabilities. For example, the arm 24 may telescope linearly and may be biased outwards by a compression spring, which may be the tensioner biasing member 26. The first end of the spring 26 engages the arm 24, and a second end of the spring 24 engages a base 30. The base 30 is movable along the arm 24 by the tensioner actuator 28. For example, the tensioner actuator 28 may include an electric motor that turns a lead screw (not shown), whose rotation drives a traveler (also not shown) forwards or backwards. The base 30 is connected to the traveler and moves therewith. The lead screw may be hollow and the arm 24 may telescope outwards from it. Thus, the arm 24 is movable independently from the base 30 and from the lead screw. The tensioner actuator 28 is controllable to drive the base 30 forwards or backwards. Driving the base 30 forwards increases the amount of compression in the spring 26 thereby increasing the biasing force exerted by the spring 26 on the arm 24 and in turn on the pulley 22 in the free arm stop direction, thereby increasing the tensioning force exerted by they pulley on the belt 14. Driving the base 30 backwards decreases the amount of compression in the spring 26, thereby reducing the tensioning force exerted by the pulley 22 in the free arm stop direction on the belt 14. The biasing force of the spring 26 may be referred to as an actuator force since the actuator 28 controls the magnitude of this force. The tensioner actuator 28 may have any suitable motive means with which to drive the movement of the base 30 instead of an electric motor, such as, for example, pneumatic or hydraulic pressure, a shape memory metal actuator, or some other means.

Figure 1B:
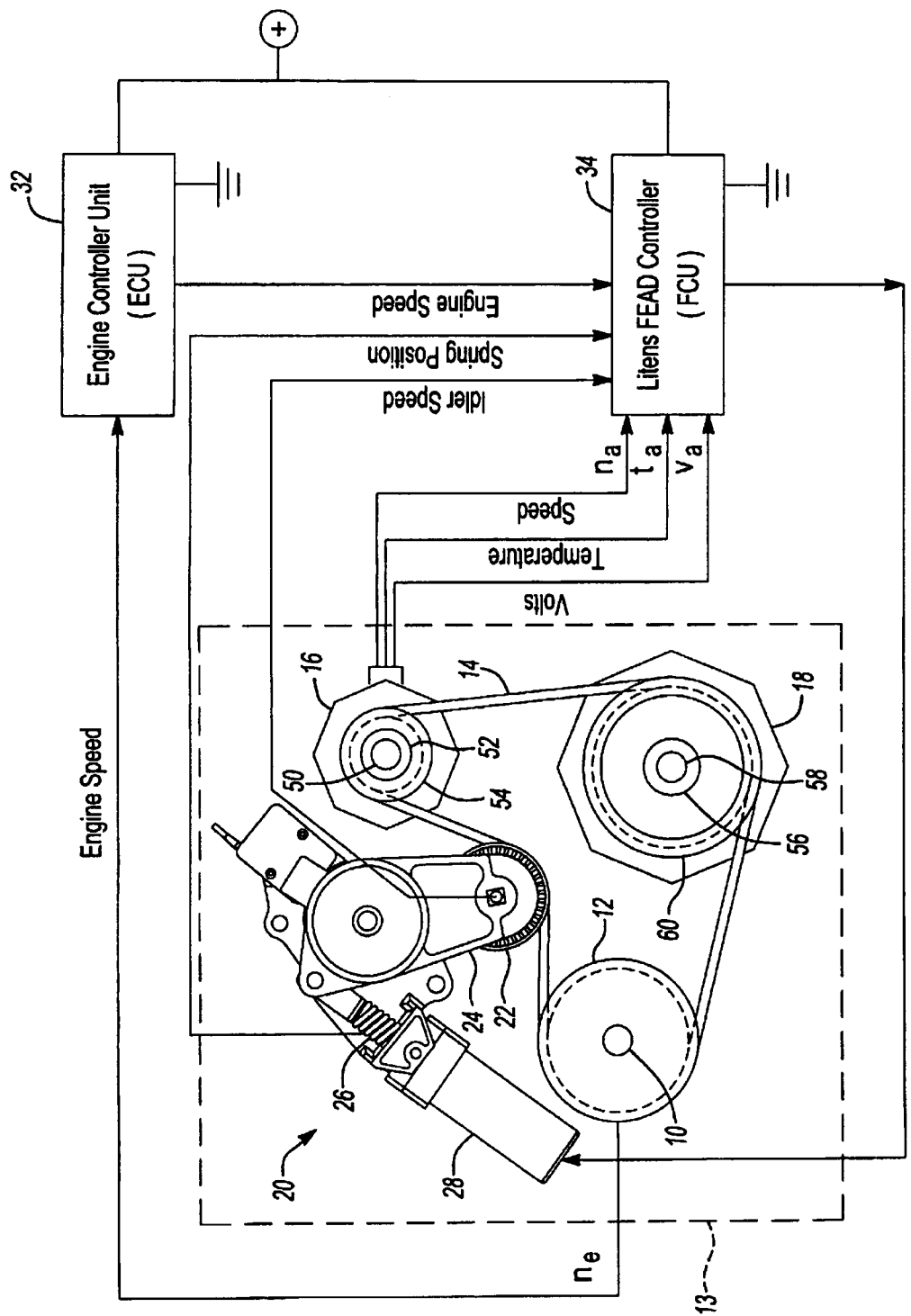
FIG. 1b is a plan view of an engine with a belt, a plurality of accessories and another tensioner, in accordance with another embodiment of the present disclosure.

In an alternative embodiment shown in FIG. 1*b*, the tensioner arm 24 is pivotable about a tensioner arm pivot axis. The tensioner biasing member may be a torsion spring which is engaged at a first end with the arm to bias the arm towards the free arm stop. The second end of the torsion spring may be engaged with the tensioner actuator 28 which moves the second end of the spring to increase or decrease the biasing force of the spring on the tensioner arm 24 and therefore the tensioning force of the pulley 22 on the belt 14.

Examples of suitable tensioner structures may be found in PCT publication number, WO2010/094127A1, and in US Provisional patent applications 61/382,892, 61/381,929, and 61/391,266, all of which are hereby incorporated by reference. Examples of suitable actuators that can be used to drive the second end of the torsion spring may be found in U.S. Pat. No. 3,954,016, U.S. Pat. No. 4,131,306, U.S. Pat. No. 4,674,781, U.S. Pat. No. 4,850,466, U.S. Pat. No. 4,885,954, U.S. Pat. No. 4,893,704, U.S. Pat. No. 5,338,076, U.S. Pat. No. 5,634,676, U.S. Pat. No. 5,862,903 and U.S. Pat. No. 5,983,739, all of which are hereby incorporated by reference.

Figure 1C:
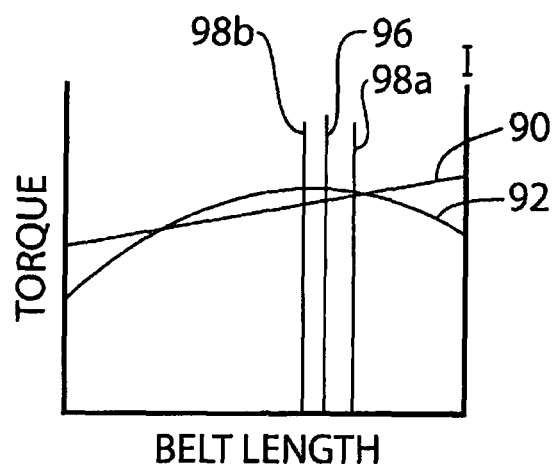
FIG. 1c is a graph showing a torque vs. belt length relationship.
Figure 1D:
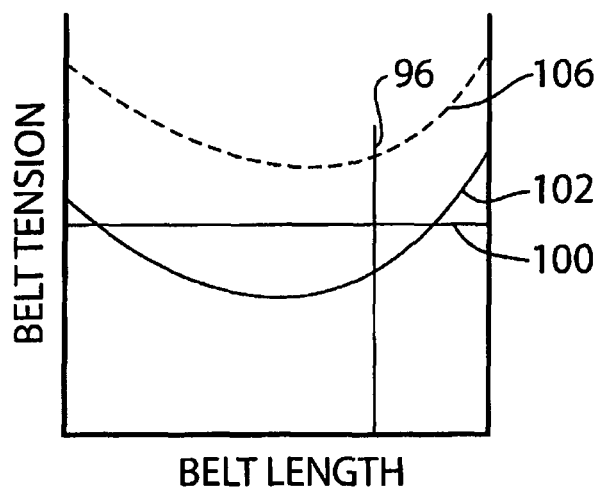
FIG. 1d is a graph showing a belt tension vs. belt length relationship.

In reference to the tensioner embodiment shown in FIG. 1b, the graph shown in FIG. 1c illustrates the relationship between the length of the belt 14, the force applied by the spring 26 on the tensioner arm 24 (shown at 90), and the resulting torque applied by the tensioner arm 24 on the belt 14 (shown at 92). The nominal belt length is shown at 96, and with plus and minus tolerances at 98a and 98b. In general throughout this disclosure, when it is stated that the tensioner arm is driven into the belt 14, is engaged with the belt 14, applies torque to the belt 14 or the like, it will be understood that it is actually acting on the belt 14 through the pulley. As the belt stretches, the arm 24 rotates progressively further as a result of the spring force acting on it. However, the spring force progressively decreases as the arm 24 rotates during belt stretch, since the spring 26 is progressively unwinding towards its rest position. Also, the rotation of the arm 24 changes the geometric (i.e. angular) relationship of the arm 24 to the applied hubload of the pulley 22 on the belt 14. As a result, even though the spring force may be decreasing linearly with rotation of the arm 24, the torque applied to the belt 14 varies non-linearly (sinusoidally in a typical configuration) with rotation of the arm 24. The result of these changes is shown in the graph in FIG. 1d, which illustrates the relationship between the belt tension generated by the tensioner, as a function of belt length. In theory it would be advantageous to be able to apply a certain target tension to the belt through the tensioner, which was constant regardless of belt length, and hence regardless of the angular position of the tensioner arm 24. This target tension is shown at 100 in FIG. 1d. However, when using a torsion spring such as spring 26, and a rotating tensioner arm 24, the curve shown at 102 is what results. A line indicating the nominal length of the belt 14 is shown at 96. The tensioner 20 is configured so that its response curve 102 to changes in belt length, even though non-linear, somewhat match up closely with the 'target' tension line 100.

In a typical tensioner of the prior art, the response curve applied by the tensioner is somewhat fixed in the sense that the tension applied by the tensioner on the belt 14 changes based on belt length only (ignoring dynamic issues relating to belt flutter and the like, which can temporarily affect the response of the tensioner). As a result, such tensioners are typically configured to apply a relatively high target tension to the belt because they must ensure that the belt has sufficient tension in it in the worst case scenarios (e.g. under harsh operating conditions where the belt is wet, where the load on the belt is high due to operation of all of the accessories driven by the belt, due to high rates of change of the engine rpm, and the like). However, in reality these worst-case scenarios are not the norm, and under most operating conditions, the belt tension that is applied by these prior art tensioners is needlessly high. This constant state of high tension in the belt unfortunately results in a needless consumption of power, overdesign of bearings and the like for pulleys that are engaged with the belt, potentially shortened operating life of the belt, increased emissions from the vehicle, and other disadvantages.

The tensioner 20 is capable, however, of adjusting the tension in the belt 14 so that when the need arises for high tension, the tensioner 20 is capable of increasing the tensioning force applied to the belt 14, thereby increasing the tension in the belt 14. This can result, in some embodiments in a shift upwards of the tension response curve shown in FIG. 1d, from the curve 102, to the dashed line curve shown at 106. The curve 106 need not match the shape of the curve 102. Moreover the effective spring constant applicable to the tensioner 20 when in a 'high tension' mode as represented by the curve 106 is not critical. Thus, the shape of the curve 106 is not particularly critical. It is important mainly that the tension applied to the belt 14 is sufficiently high to prevent belt slip under the particular conditions that triggered the tensioner 20 to raise the tension, while ensuring that the tension applied to the belt 14 is not so high as to damage the belt 14 or the components engaged with the belt 14 (e.g. the pulleys driving and driven by the belt 14).

A primary purpose of providing sufficient tension in the belt 14 is to prevent belt slip, which is a condition in which the linear speed of the belt on a pulley is different than the linear speed of the periphery of the pulley itself (that is where the slipping occurs). This slipping is problematic for many reasons. One reason is that the slipping is inefficient, in the sense that the movement of the belt is not resulting in as much rotation as would be desired of the accessory driven by the pulley. Another reason is that the slipping can be audible in some circumstances, which can result in the impression on the part of the vehicle owner or passersby that there is a quality issue with the vehicle.

Figure 2A:
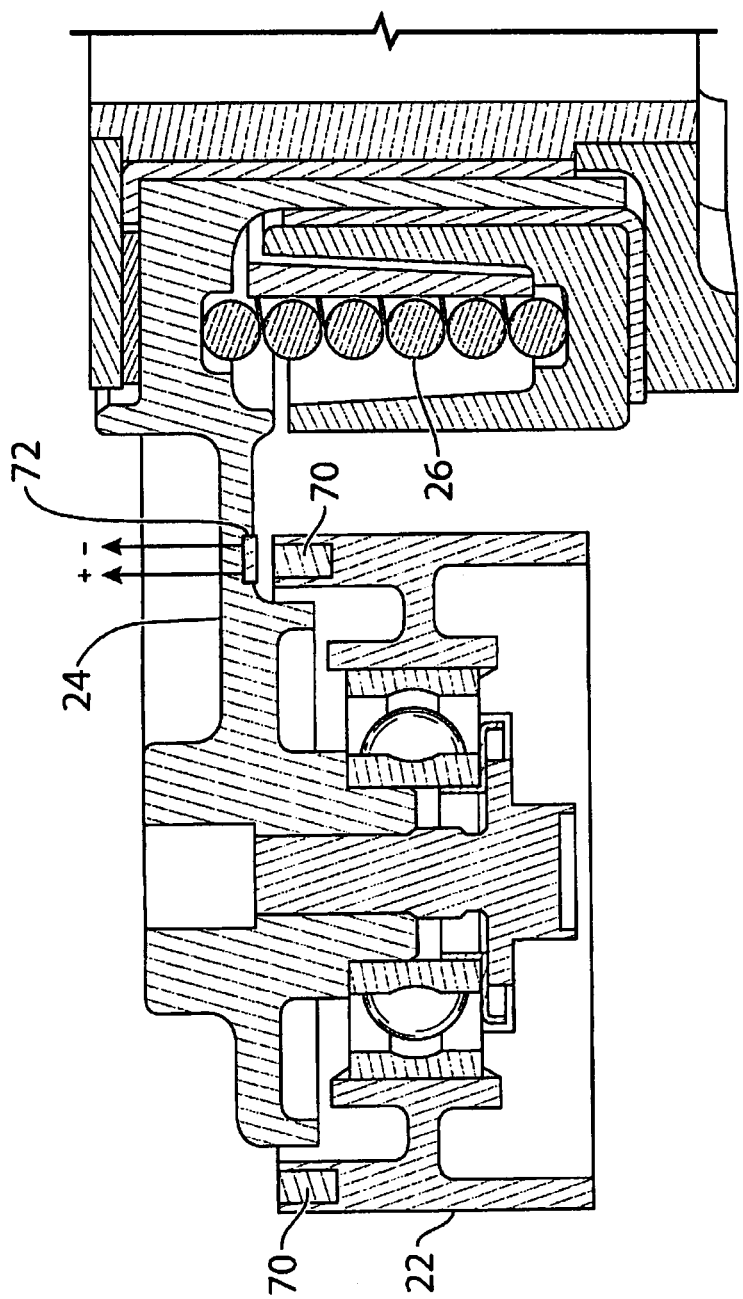
FIG. 2a is a sectional side view of the tensioner shown in FIG. 1B.
Figure 2B:
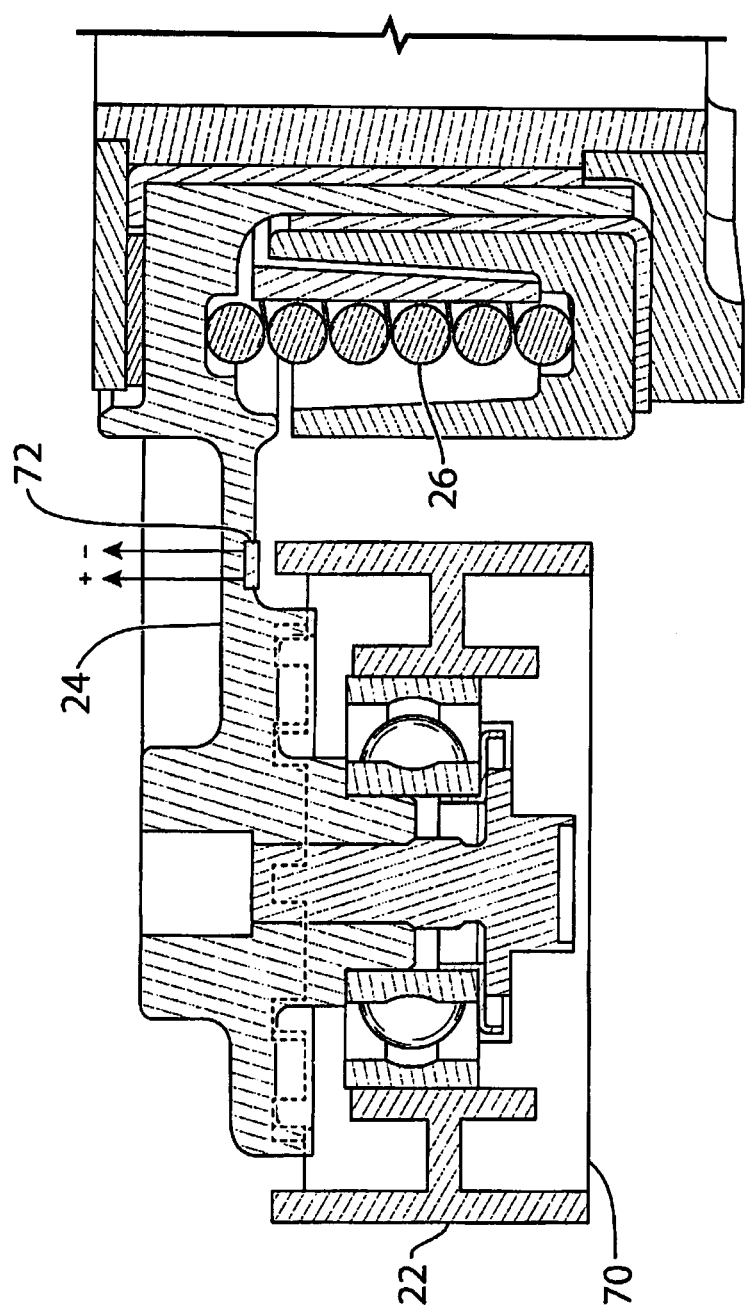

It is beneficial for the tensioner 20 to be able to determine if belt slip is taking place. To do this, the tensioner 20 may determine the linear speed of the belt 14, and the linear speed of one or more of the pulleys from accessories that are driven by the belt 14. The linear speed of the belt 14 may be determined by determining the linear speed of a pulley that is driven by the belt, but that relatively little rotational inertia or more broadly, resistance to rotation, associated with it. An example of such a pulley is the pulley 22 on the tensioner 20. Such a pulley typically has no belt slip associated with it and therefore provides a relatively accurate value for the speed of the belt 14 during operation of the belt tensioning system. To provide a value for the speed of rotation of the pulley 22 any suitable means may be used. For example, a sensor trigger, such as a magnet or a metal target, shown at 70, may be placed in the pulley as shown in FIG. 2a, and a suitable sensor 72, such as a Hall effect sensor may be positioned in the tensioner arm 24. A plurality of the magnets or metal targets 70 may be spaced equally from each other about a circle at some radius on the pulley 22. Alternatively, as shown in FIG. 2b, a plurality of sensor triggers, such as teeth, protrusions, or conversely, recesses, could be incorporated into the pulley 22 and a suitable sensor 72, such as a Hall effect sensor, could be mounted to a stationary element, such as a base mounting to sense the passage of the sensor triggers 70.

The pulley 22 may be machined from a suitable metal, or spun from metal sheet into a flanged configuration as shown. One or more teeth, recesses, protrusions, targets or other sensor triggers 70 may be machined into whichever edge of the pulley passes overtop of the sensor 72. As an example, the pulley may be machined from magnetic steel.

The sensor 72 is positioned to be able to detect the passing of the sensor triggers. For balance purposes, should the pulley be required to spin at very high RPM, it may be beneficial to have at least two sensor triggers 70 that are equally spaced apart on the pulley flange so as to balance the inertia of the targets when the pulley 22 spins at high speed.

As more sensor targets 70 are provided at equal spacings on the pulley edge the balance of the pulley 22 improves. Thus for applications where the pulley's RPM is high, it is more beneficial to configure the pulley 22 with an increased number of sensor triggers 70 to improve its dynamic balance. As the number of teeth (or more generally, sensor triggers 70) increases, the accuracy of the determined RPM increases in addition to the improvement in balance. As shown in FIG. 2b the pulley 22 may have any suitable number of sensor triggers 70, such as, 10 sensor triggers.

The sensor 72 may include a processor which counts the passage the sensor triggers 70 overhead, and thereby determine the instantaneous RPM of the pulley 22. Once the RPM of the pulley 22 is known, the belt speed can be determined with high accuracy.

The pulley 22 may be used for determining the belt speed as described above, provided that there is sufficient belt wrap on the pulley 22. Additionally, in some circumstances there may not be sufficient room to install the sensor 72 or the triggers 70 on the tensioner arm 24 or pulley 22. If any of these conditions exist such that the belt speed cannot be determined using the tensioner 20, a separate idler pulley can be installed in a separate location in engagement with the belt 14 wherein a sufficient amount of belt wrap is provided.

An engine controller shown at 32 is provided in the vehicle and controls the operation of the engine 13 and the accessories. The engine controller 32 may be referred to as the vehicle control unit 32. The vehicle control unit 32 may receive sensor data from several sources, including signals from a speed sensor on the crankshaft 10 that indicates the speed of rotation of the crankshaft 10. The belt tensioning system, which includes the tensioner 20, may further include a tensioning system controller shown at 34. The tensioning system controller 34 controls the operation of the tensioner actuator 28. The tensioning system controller 34 additionally may receive signals from one or more other components indicative of the states of those components. For example, the tensioning system controller 34 may receive signals indicative of the crankshaft speed, the alternator voltage output, the alternator speed, the alternator temperature, the position of the tensioner biasing member 24, and the speed of the tensioner pulley 22 (as described above, using one or more sensor triggers 70 and sensor 72). The controller 34 can determine if any slip is occurring at any of the pulleys for the crankshaft 10, the alternator 16 and the compressor 18 based on any detected differences between their actual measured speed and the speed they should be rotating at based on their pulley diameter as compared to that of the tensioner pulley 22. If any slip is detected, or if the slip detected on any pulley exceeds an upper threshold value, such as about 3% to about 4%, the controller 34 may increase the actuator force so as to increase belt tension, so as to reduce or completely eliminate the slip. The increase in the actuator force may be by a discrete amount such as 25N after which the slip is rechecked to determine if it is below the upper threshold value. Alternatively, the increase in the actuator force may be continuous with continuous determination of the slip being made by the controller 34. In either case the controller 34 may stop increasing the tension once it determines that the slip is below the threshold value for all pulleys. Conversely, if the slip detected on all the pulleys is below a lower threshold value (which may be, for example, about 2%), then the controller may decrease the actuator force so as to reduce belt tension in order to provide improved fuel economy and reduce power losses. The decrease may be continuous, or it may be in discrete amounts.

The tensioning system controller 34 may also receive signals from the vehicle control unit 32 indicating what action the vehicle control unit 32 is about to take. For example, the vehicle control unit 32 may indicate to the tensioning system controller 34 that it is about to turn on the air conditioning compressor 18. As a result, the tensioning system controller 34 may be capable of using the incoming signals to determine that belt slip is about to occur, or that the load on the belt 14 is about to increase. In case of one of these determinations the tensioning system controller 34 may pre-emptively increase the actuator force on the tensioner pulley 22 so as to increase the belt tension prior to these events occurring. As a result, the belt slip is reduced (or even prevented).

In another scenario, where the vehicle is off, as the driver of the vehicle approaches the vehicle, the tensioning system controller 34 may sense the presence of the key fob, similar to the systems that sense the presence of the key fob for the purpose of unlocking the vehicle's doors in some luxury cars today. Instead of the controller 34 directly sensing the presence of the key fob, the vehicle may communicate to the controller 34 that some other system (such as the system responsible for unlocking the vehicle doors when sensing the presence of the key fob in vehicle so equipped). Alternatively, the tensioning system controller 34 may detect that the key fob was used to unlock the driver's door (by a user pressing an 'unlock' button on the key fob). As a result, the tensioning system controller 34 may determine that the vehicle's engine 13 may be started imminently. Engine startup introduces a relatively high load on the belt 14, and can cause belt slip in a belt that is under too little tension. In order to reduce the likelihood of belt slip, the tensioning system controller 34 may increase the actuator force on the tensioner pulley 22 prior to engine startup so as to prevent belt slip from occurring.

Instead of sensing the key fob, a less expensive option may be for the controller 34 to be programmed to increase the belt tension at certain times of the day on certain days. For example, the controller 34 may be equipped with a clock or may be programmed to determine the time and date from some other subsystem in the vehicle such as a GPS receiver, and may be programmed to detect patterns in terms of the times of day that the vehicle is driven. For example, the controller 34 may determine that, over the previous 30 days (or over any other suitable number of days) the vehicle has been started up on weekdays (i.e. Monday to Friday) at between 7:45 am and 7:55 am over 90% of the time and never earlier than 7:37 am. The controller 34 may be further programmed to use this data to determine a time of day to increase the belt tension in anticipation that the engine will shortly be started. For example, the controller 34 may increase the belt tension at 7:43 am every weekday, or, for example, at 7:35 am every weekday. After increasing the tension in the belt 14, the controller 34 may enter, or return to, a sleep mode until it is awakened by some input, such as by the detection of the vehicle being started. In addition, time of day and date information can be used to predict the need for high tension in the belt 14 in other ways. For example, in embodiments where a humidity sensor or a moisture sensor are not present, the controller 34 may determine that, based on the time of day (e.g. early morning) and the date (e.g. early fall), there is an increased likelihood of belt slippage from dew on the belt 14. As a result, the controller 34 may be programmed to keep the belt 14 under high tension for a selected period of time after engine start up to allow the engine to warm up and the dew to evaporate. Conversely, in the mid-afternoon on a summer day, the controller 34 may be programmed to keep the belt 14 under high tension for a shorter selected period of time after engine start up due to an expectation that there is no dew on the belt 14.

Another example is where the controller 34 receives data from an ABS system and/or a traction control system to determine whether there is repeated pending wheel lockup or pending wheel slip during a particular use of the vehicle. This data, optionally in combination with temperature data and/or time and date data, can be used to infer that there is snow on the ground, or, depending on the sensed temperature, to infer that there may be slush or water on the ground. If snow, slush or water is inferred to be on the ground, then the controller 34 may determine that the belt tension should be increased due to the potential for the belt 14 to become wet from kickup or some other reason during driving, for example. If the temperature is below a selected level, the controller 34 may determine that the belt 14 is likely to be relatively stiff, and possibly loose. Also, at low temperature, grease or other lubricants used to facilitate the rotation of bearings and the like tends to 'stiffen' thereby increasing the resistance to turning of any rotating components. As a result, below a certain temperature, the controller 34 may therefore increase belt tension.

In another example, the tensioning system controller 34 may receive a signal that the humidity is high from a sensor such as a humidity sensor. This can be an indication that it is raining, or that the vehicle is in some sort of situation where the belt 14 is potentially wet. When the belt 14 is wet, it will be understood that there is an increased likelihood of belt slip at any given belt tension, as compared to a dry belt 14. When the tensioning system controller 34 determines that the humidity is high, the tensioning system controller 34 may automatically increase the actuator force on the pulley 34 so as to reduce the potential for belt slip. In a scenario where the tensioning system controller 34 has determined that a particular level belt tension is suitable for a particular situation, the tensioning system controller 34 may augment the belt tension to a higher level in a situation where it detects high humidity. An example of a suitable humidity sensor is an HIH series humidity sensor provided by Honeywell International Inc. Instead of, or in addition to, a humidity sensor, the belt tensioning system may include some other sensing means to detect a wet belt 14 or the potential for a wet belt 14, to trigger it to increase the belt tension. For example, a temperature sensor positioned to detect the temperature in the engine bay may be used, in conjunction with an ambient temperature sensor and a humidity sensor, to detect the potential for a wet belt in certain situations. A humidity sensor that is configured to determine relative humidity in the engine bay, would include a temperature sensor that would be positioned to detect the temperature in the engine bay. For example, when a vehicle is kept in a cool location such as in a garage or an underground parking lot, and is then started up and taken out on a hot day, there is the potential for water vapour in the air to condense on many components of the relatively cool vehicle including the accessory drive belt and the pulleys it engages, which can lead to belt slip or belt chirp. To handle this, the tensioning system controller 34 may be programmed to sense when the temperature in the engine bay is lower than the ambient temperature by more than a selected amount while the humidity is above a selected level, and if so, to increase the belt tension to a selected high tension setting. After the engine bay has warmed up (e.g. by operation of the engine) the controller 34 may determine that there is no longer the potential for belt slip or belt chirp and may accordingly reduce the belt tension.

In order to determine whether it is raining, the controller 34 may receive signals from both the humidity sensor, and from the windshield wiper system. If the humidity is high and the windshield wipers are on, then the controller 34 may determine that it is raining. If the humidity is high but the windshield wipers are off, then the controller 34 may determine that it is not raining. If the humidity is not high but the windshield wipers are on, the controller may determine that it is not raining. As an example, the windshield wipers may have been put on for some other reason, such as to clean the windshield of dirt, snow or frost for example.

In yet another example, the tensioning system controller 34 may receive signals from the throttle sensor or from the vehicle control unit 32 that the driver is driving aggressively, and is repeatedly accelerating rapidly and/or is repeatedly letting off the throttle rapidly. In a less sophisticated embodiment, each time the driver accelerates (particularly if they accelerate hard), the tensioning system controller 34 will drive the actuator force up to increase the belt tension to prevent slip, and each time the driver suddenly releases the throttle, the tensioning system controller 34 will drive the actuator force down to decrease the belt tension since high tension may be considered not necessary. It will be understood that driving the actuator 28 consumes energy. Repeatedly driving the actuator force up and down can in some situations consume as much or more power than is saved by the overall reduction in average belt tension, and can shorten the life of the tensioner actuator 28 and other components. In a more sophisticated embodiment, after a sufficient number of repetitions of these actions, the tensioning system controller 34 may determine that this driving behaviour is likely to continue and as a result, the tensioning system controller 34 may simply leave the tensioning force at a high setting, so as to prevent hunting of the actuator 28 to reduce and increase the tensioning force in an attempt to achieve a constantly moving or oscillating target. Once the tensioning system controller 34 detects that the driver's driving behavior has changed and he/she is no longer driving as aggressively for a sufficient period of time, the tensioning system controller 34 may decide to permit the reduction of the belt tension. There are several ways of determining whether the driver of the vehicle is driving aggressively. One way is to receive signals relating to the engine rpm. If the controller 34 determines that the engine rpm cycles between a level that is above a first, 'high' level and a level that is below a second, 'low' level then the controller may determine that the vehicle is being driven aggressively. A parameter that may also be used by the controller 34 for this determination is the cycle time. In other words, if the engine rpm reaches into the 'high' range (i.e. above the 'high' level) and then falls into the 'low' range (i.e. below the 'low' level) sufficiently slowly, the controller 34 may determine that the engine is not 'cycling' and that this does not constitute sufficiently aggressive driving to warrant leaving the tensioning force in a high tension setting. However, if the engine rpm cycles between the 'high' range and the 'low' range in relatively short periods of time, then the controller 34 may determine that the engine is cycling and that this does constitute a situation where leaving the tensioner in a high tension setting is warranted. It will be noted that even if the controller 34 uses signals from the throttle sensor, the controller 34 can still be said to be basing the determination of whether the engine is cycling on engine rpm since the signals from the throttle sensor can have a rough correlation to engine rpm.

Another way of using the engine rpm is for the controller 34 to use the rate of change of the engine rpm to determine whether or not to leave the tensioner at a high tension setting.

If the rate of change of the engine rpm repeatedly exceeds a particular 'high' level then the controller 34 may determine that the engine is cycling and may leave the tensioner at a high tension setting regardless of the actual engine rpm reached.

The controller 34 may be programmed to store events where it has determined that the vehicle is being driven aggressively in a database and may additionally store other information related to the event, such as, for example, the time of day, or some type of identification information that identifies which driver is driving the vehicle. For example, upon entry into the vehicle, the driver may have pushed one of the seat position memory buttons. This seat position button identifies the driver of the vehicle as Driver #2. The controller 34 may store the driver identification in memory. In the event that the controller 34 determines that a cycling event occurred (or in general that an aggressive driving event occurred), the controller 34 may store that in its memory along with the driver identification information. If the controller 34 determines that this particular driver has too many instances of aggressive driving, the controller 34 may make changes to the criteria that would trigger the controller 34 to put the tensioner in a high tension setting whenever it senses that that driver is driving the vehicle. Another way that the vehicle may identify the driver is by the key fob. In some luxury vehicles today, the vehicle's controller is capable of distinguishing one key fob from another. The vehicle's controller uses this information to adjust the seats, mirrors and the like to each driver's preferences based on which key fob is sensed. Thus the controller 34 may be able to determine which driver is driving the vehicle based on which key fob is being sensed by the vehicle's sensors.

Further with respect to reducing the tendency of the tensioner actuator 28 to hunt continuously, the tensioning system controller 34 may be programmed to may raise or drop the belt tension by discrete amounts as opposed to continuously adjusting it to achieve the optimal belt tension for dynamic (i.e. continuously changing) conditions. The tensioning system controller 34 may be programmed for this to occur always, or alternatively it may be programmed for this to occur only under certain conditions, while permitting hunting (i.e. continuous adjustment of the belt tension) under other conditions. An example of the use of a discrete change in belt tension is in a situation where the tensioning system controller 34 detects a constantly increasing required belt tension. In such a scenario the tensioning system controller 34 may decide to increase the belt tension to a selected high setting and to leave it there for a period of time, (unless it becomes necessary to increase it further), instead of continuously adjusting the belt tension to just match the necessary tension for each instant of time.

In another scenario, the tensioning system controller 34 may detect a situation where the engine speed is low (i.e. below a selected threshold). Resonance can occur in the belt 14 depending on certain factors, such as the engine speed, the load on the belt 14 and the belt tension. Resonance can cause the belt 14 to flutter and can in some situations cause damage to or failure of the belt 14. In particular, some belts that are proposed for use or are in use in vehicles today are relatively thinner than some belts previously used, which makes them even more prone to flutter. To inhibit this from occurring the tensioning system controller 34 may be programmed to detect situations where the engine speed and belt load would lead to an increased risk of resonance at a given belt tension, and to increase the belt tension so as to reduce the risk of belt flutter.

As shown in the examples described above, the tensioning system controller 34 may thus be capable of predicting situations in which belt slip may be imminent, or in which increased belt load may be imminent and may be able to control the belt tension before these events take place.

As described above, the tensioning system controller 34 can control the tensioning force by the pulley 22 on the belt 14 so as to reduce the belt tension where possible and to increase the belt tension when needed. This provides an overall improvement in fuel economy for the vehicle, as compared to a tensioner that is not controllable. However, this is, in some ways, a passive approach to reducing belt tension to improve fuel economy (which may be referred to as fuel efficiency). In some embodiments, the tensioning system controller 34 may take an active approach to reducing belt tension to improve fuel economy.

For example, the tensioning system controller 34 may be operatively connected to one or more of the alternator 16, the air conditioning compressor 18 and any other accessories driven by the belt 14. It will be understood that each of these accessories represents a load on the belt 14, and each requires a certain amount of belt tension to operate without belt slip. By having two of these loads operate at the same time, as can commonly occur, the belt tension must be increased further in order to reduce the likelihood of slip. In an effort to reduce the maximum belt tension required to be applied by the tensioner, the tensioning system controller 34 may in some situations cause a reduction in the load associated with one of the accessories, when permitting another of the accessories to operate. For example, the tensioning system controller 34 may determine that the alternator 16 need not operate at its highest voltage (which increases the amount of magnetic drag is associated with the alternator 16) when the air conditioning compressor 18 is on. Thus, the tensioning system controller 34 may reduce the voltage of the alternator 16 at those times if possible, and may possibly shut off the alternator altogether. Similarly, the tensioning system controller 34 may reduce the refrigerant flow to the air conditioning compressor 18 (or may shut if off entirely) when it determines that the alternator 16 needs to run at high voltage. It will be noted that some alternator types (e.g. some modern high efficiency alternators) have a relatively high amount of drag associated with them in cold weather. This is due, at least in part, in some circumstances to the close tolerances that exist between the rotating and stationary components of such alternators. In cold weather, differential amounts of shrinkage of some components relative to each other can increase the amount of rotational friction that exists until the alternator warms up. Furthermore, when the vehicle sits idle (i.e. when the vehicle is off) for any period of time (even overnight) during cold weather, the vehicle's battery can lose charge relatively quickly, thereby causing the alternator 16 to operate at high load at vehicle startup as it attempts to charge the battery. As such, the tensioning system controller 34 may prevent the alternator 16 from operating during startup of the engine 13 in cold weather since engine startup already introduces a high belt load which implies a raised belt tension. Once the engine 13 has started up and the belt tension necessary to prevent slip is reduced, the tensioning system controller 34 may permit the alternator 16 to start up. In some embodiments, the controller 34 may prevent alternator 16 from operating until the temperature of the alternator 16 reaches above a selected temperature. A temperature sensor that is directly responsible for sensing the temperature of the alternator 16 may be provided for informing the controller 34 of the alternator temperature. If it is determined that the alternator 16 is needed to operate but is below a selected temperature, the controller 34 may put the tensioner at a high tension setting prior to start up of the alternator. The selected temperature below which the alternator 16 may be considered to be cold may be for example, less than or equal to about −20 degrees C. Optionally, this condition (the low alternator temperature) may override other logic used by the controller 34 to modify belt tension. In other words, the controller 34 may be programmed to generate a high belt tension whenever it detects that the alternator temperature is below the threshold value (assuming that alternator operation itself is needed), and to hold the high belt tension until the alternator temperature rises above a second threshold value, such as, for example, +20 degrees C.

With respect to the alternator 16, it is beneficial for the controller 34 to be able to estimate the torque needed to drive the alternator 16 in order to determine whether to change the belt tension. The alternator torque depends on several factors, including voltage, current and speed. These values can be mapped to estimate torque quickly and easily without significant computational requirements. The controller 34 can use this estimate to determine what belt tension is suitable.

It will be noted that the operative connection between the tensioning system controller 34 and the accessories may not be a direct one. For example, the tensioning system controller 34 may send instructions to the vehicle control unit 32 to stop or prevent operation of the alternator 16, and the vehicle control unit 32 may determine whether this is possible. For example, the vehicle control unit 32 may determine that it is not possible due to a critically low state of charge of the vehicle battery (not shown). In such an instance, the vehicle control unit 32 may send a signal back to the tensioning system controller 34 that it cannot stop, slow down or prevent operation of the alternator 16, in which case the tensioning system controller 34 may drive up the tensioning force accordingly. Overall, however, by providing some control over the accessories, the tensioning system controller 34 may be able to reduce the number of times the tensioning force needs to be driven up to high levels. The number of times that the tensioning force reaches high levels directly impacts the size of the shafts, bearings and brackets required for the various components associated with the accessories, so that they are sufficiently robust to resist deformation and fatigue. Reducing the number of times that the tensioning force reaches high levels can therefore result in the use of relatively smaller shafts, smaller and/or lighter-duty bearings, and lighter brackets. This reduction in weight of the components in turn results in an increase in fuel efficiency for the vehicle, and reduces rotational drag associated with the accessories which can result in a further increase in fuel efficiency for the vehicle.

Instead of sending instructions to the vehicle control unit 32, it is alternatively possible for the tensioning system controller 34 to directly send commands to one or more of the accessories. However, the vehicle control unit 32 may also be directly or indirectly operatively connected to the accessories, and it may issue overriding commands to the tensioning system controller 34 under certain conditions which prevent the tensioning system controller 34 from interfering with the vehicle control unit's operation of the accessories.

The tensioning system controller 34 may receive signals from one or more components that are indicative of the current belt tension so that the tensioning system controller 34 can determine if the current belt tension is suitable or not for the current set of conditions. The signals may be from a position sensor that indicates the position of the second end of the tensioner spring, which gives an indication of the tensioning force exerted by the pulley 22 on the belt 14. The position sensor could be a simple Hall-effect sensor which would send a signal proportionate to the distance between the sensor and the end of the spring. A suitable Hall-effect sensor could be a Honeywell SS 520 sensor, supplied by Honeywell International, whose headquarters are in Morristown, N.J., USA. Alternatively other more precise position sensing devices could be used, albeit at greater cost. Alternatively, the belt tensioning system may include other, more sophisticated devices, such as, for example, a strain gauge on one or more accessory shafts along with associated electronics for conditioning and signal amplification. Such devices are typically relatively high cost however. Such a device is described in U.S. Pat. No. 6,216,547 which is hereby incorporated by reference.

While the tensioning system controller 34 is shown as a separate device from the vehicle control unit 32, it is possible to provide the equivalent of the tensioning system controller 34 within the vehicle control unit 32 itself. In other words the tensioning system controller 34 could be a program module that resides in memory along with the program module that makes up the vehicle control unit 32. For the purposes of the claims provided below, however, the tensioning system controller 34 and the vehicle control unit 32 may nonetheless be considered to be separate elements regardless of whether they share hardware or even some software elements.

Figure 3A:
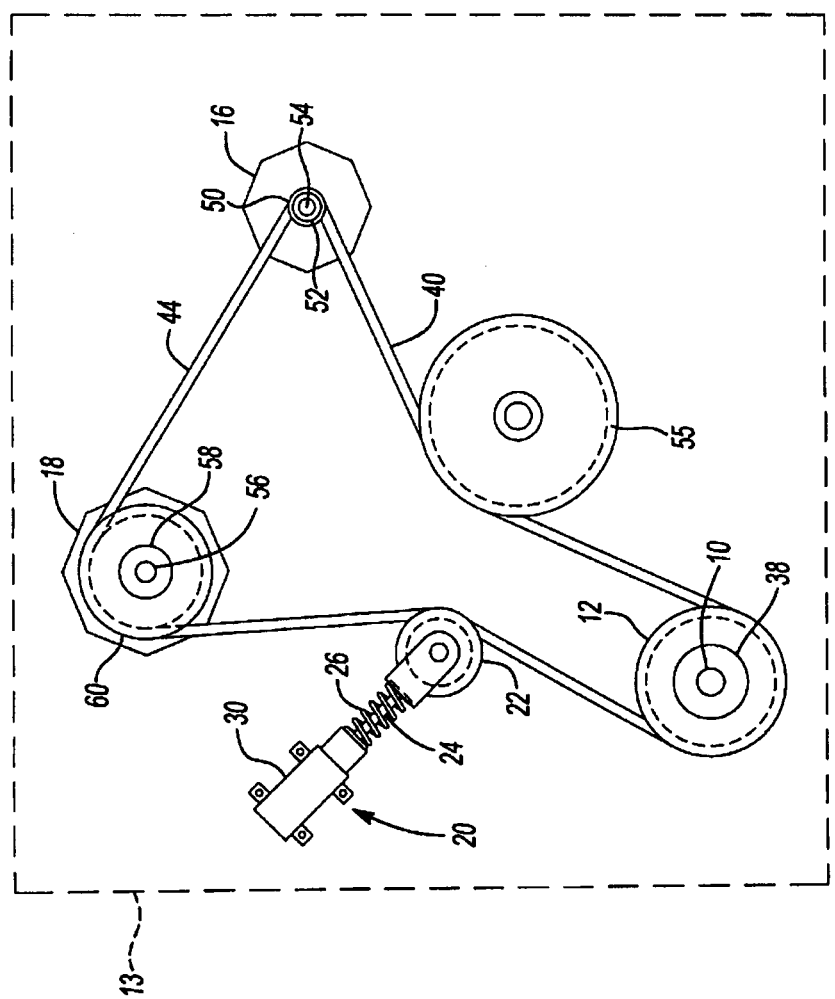
Figure 3B:
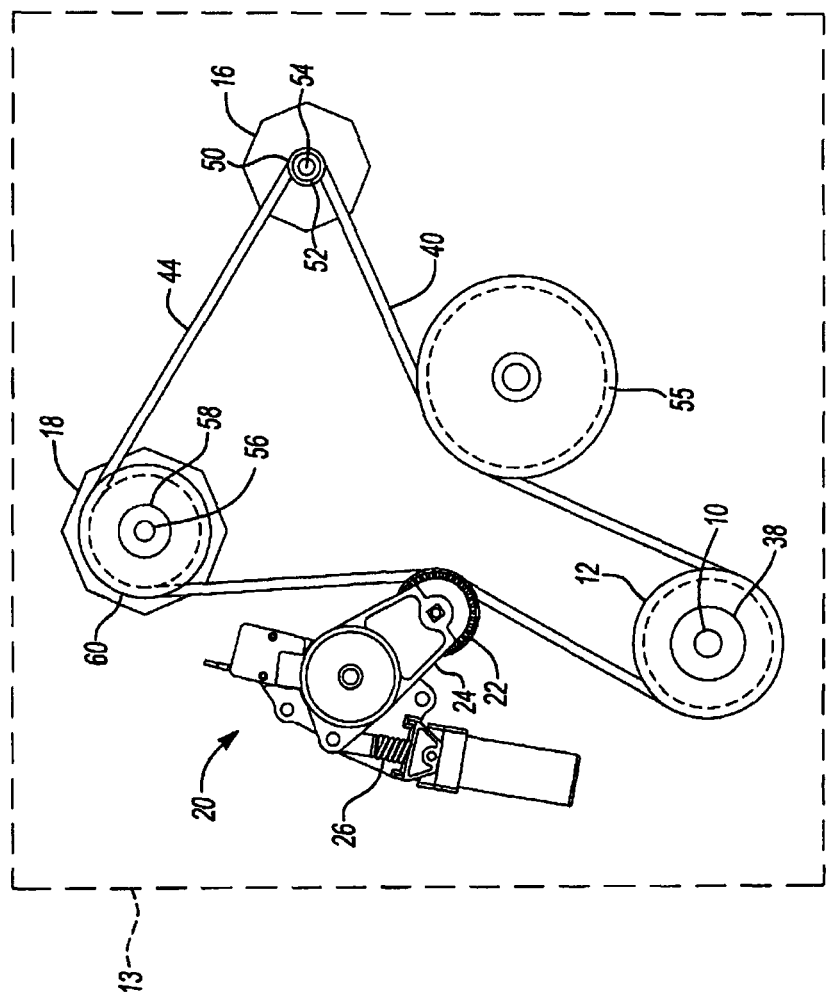

In a particular embodiment shown in FIGS. 3a and 3b, the vehicle may be equipped with technology that shuts off the engine 13 temporarily in certain situations to reduce emissions and increase fuel efficiency. For example the vehicle control unit 32 may shut off the engine 13 when the vehicle stops at a stoplight. When this occurs it may still be desirable to continue operation of one or more of the belt driven accessories, such as the air conditioning compressor, for example. To achieve this, the crankshaft 10 may be equipped with a crankshaft clutch 38 through which it connects to the crankshaft pulley 12. By disengaging the clutch 38 the belt 14 can now be driven without the engine 13 turning. The vehicle control unit 32 may be programmed to run the alternator 16 as a motor, which draws power from an electrical source such as the vehicle battery (not shown). The motor 16 can then drive the belt and the other belt-driven accessories. Such a system is described in WO2008/113186A1, which is hereby incorporated by reference. It will be noted that in FIGS. 3a and 3b, only the components directly engaged with the belt 14 are shown, such as the crankshaft 10 and related components, the accessories and related components and the tensioner 20. Also, a water pump is shown at 55 in FIGS. 3a and 3b as one of the accessories. The difference between the embodiments shown in FIG. 3a and the embodiment shown in FIG. 3b is that the tensioner 20 in FIG. 3a is a linear tensioner (as shown in FIG. 1a), and the tensioner 20 shown in FIG. 3b is a rotary tensioner (as shown in FIG. 1b).

In such an embodiment, the tensioning system controller 34 may receive a signal from the vehicle control unit 32 indicating that the engine 13 is being shut off and may be programmed to reduce the belt tension to a low level so as to reduce the belt load, thereby increasing the amount of time the battery can support rotation of the motor 16. As a further step to reducing the belt load the tensioning system controller 34 may also reduce the refrigerant flow to the air conditioning compressor 18 to a relatively low level so as to reduce the belt load associated with the compressor 18.

Alternatively, if flow reduction is not possible, the tensioning system controller 34 may attempt to mimic the reduction or the throttling of the flow of fluid by intermittently cycling the air conditioning compressor clutch on and off in a controlled fashion via a PWM pulse width modulation control strategy, or PPM, whereby the cycle time off and the cycle time on may be varied to optimize both the power savings potential as well as the cooling potential within the passenger compartment.

In such an embodiment, the motor 16 may also be used to start the engine 13. To carry this out, the crankshaft clutch is engaged so that the crankshaft pulley 12 and the crankshaft 10 rotate together, and the motor 16 drives the belt 14 in order to drive the crankshaft 10, thereby replacing a traditional starter motor. However, it will be noted that the crankshaft pulley 12 is positioned on a first side (shown at 40) of the motor pulley 54. When the motor pulley 54 drives the belt 14, the first side of the motor pulley 54 is the slack side. Thus the belt tension on the first side 40 is relatively lower than the belt tension on the second side (shown at 44) of the motor pulley 54. The lower belt tension introduces some potential for slip to occur between the belt 14 and the crankshaft pulley 12. It is possible to add a tensioner for the belt span between the motor pulley 54 and the crankshaft pulley 12, however this is an expensive solution. In order to reduce the risk of slip when only one tensioner is provided (i.e. tensioner 20) the tensioning system controller 34 may use the tensioner 20, which, as can be seen is positioned between the crankshaft pulley 12 and the air conditioning compressor pulley 60, to increase the belt tension to a very high level so as to drive up the tension in the belt span (or belt spans) between the crankshaft pulley 12 and the motor pulley 54 so as to reduce the likelihood of slip during starting of the engine 13 using the motor 16. To assist in distributing the tension applied by the tensioner 20 throughout the belt 14 more evenly, one or more of the accessories may be shut off by the tensioning system controller 34 when the motor 16 is used to start the engine 13. Once the engine 13 has been started, the motor 16 may revert back to an alternator, the belt tension may be reduced and whatever accessories were shut off may be started up again. Increasing the belt tension has been described as being applicable during startup of the engine 13 by the motor 16, while the tension has been described as being reduced by the controller 34 when the motor 16 is driving the accessories. However, in a case where an accessory that is on the slack side of the motor pulley 54 (e.g. the water pump 55) is determined to be necessary to operate without slip, the tension in the belt 14 may be increased by the controller 34 to facilitate it.

While the alternator 16 has been described as being the motor that drives the belt 14 to drive the other accessories or to start the engine 13, it is alternatively possible for a motor to be provided that is separate from the alternator 16 for this purpose.

Many of the scenarios described above relate to the controller 34 detecting a situation where increased belt tension may be required to prevent slippage from occurring, it may be possible for the controller 34 to detect upcoming situations where low belt tension may be permitted. For example, after detecting that the belt 14 potentially had dew on it and increasing the belt tension accordingly to prevent slip, the controller 34 may set a fixed period of time for the increased belt tension to occur, and, in the absence of other reasons to keep the belt tension up, the controller 34 may be programmed to reduce the belt tension automatically at the end of the fixed period on the assumption that the belt 14 is dry at that point.

Some systems of the prior art may adjust belt tension based on a determination that the current conditions are conducive to belt slip. However, this inherently means that there is a period of time during which the conditions exist and where belt slippage could occur prior to the system increasing belt tension. By detecting the potential for such situations before they occur (i.e. precognitively), the controller 34 is able to increase the belt tension before the need for increased belt tension arises, thereby avoiding a situation where slippage has already occurred before the tensioning system has had a chance to react.

Many parameters have been described herein as being useful for use by the controller 34 to determine the appropriate tension setting for the tensioner. All of these parameters may be combined into a map that may be stored in the controller memory. The controller 34 would then determine all the necessary inputs based on signals from sensors, from the vehicle ECU, and/or from other sources, and may then use those inputs with the map to determine a tension to apply to the belt 14, and/or a tensioner mode for the controller 34. An example of a tensioner mode would be a situation where the controller 34 has determined that the tensioner is hunting and then holds the tensioner at a particular tension setting for a set period of time to prevent it from hunting. Another example of a tensioner mode would be a situation such as during startup of the vehicle, whereby the tensioner may simply leave the tensioner at a high tension setting for a selected period of time, regardless of what signals are coming from the various sources.

While the term 'belt' has been used in the description herein, it will be understood that the tensioning system of the present invention can apply to many different kinds of endless drive element, both synchronous (e.g. toothed) and asynchronous (e.g. non-toothed), including accessory drive belts, timing belts, timing chains and the like.

Reference is made to FIGS. 4a-4c and 5a-5c, which show a tensioner 200 with an example of a tension adjustment system in accordance with another embodiment of the present invention.

The tensioner 200 includes a hub 221 that mounts to the engine 13, a tensioner arm 224 that is rotatably supported by an arm bushing 225 on the hub 221 for rotation about a hub axis between a free arm stop position and a load stop position, and which holds a tensioner pulley 222 for rotation about a pulley axis Ap, a tensioner biasing member 226 (which may be referred to as a spring 226 or a torsion spring 226, but which could be any suitable type of biasing member) for biasing the tensioner arm 224 towards the free arm stop position, and a tensioner actuator 228 which is operatively connected to the tensioner pulley 222 and tensioner arm 224 to change the tensioning force applied by the tensioner arm 224 on the belt 14 through the pulley 222.

Figure 4A:
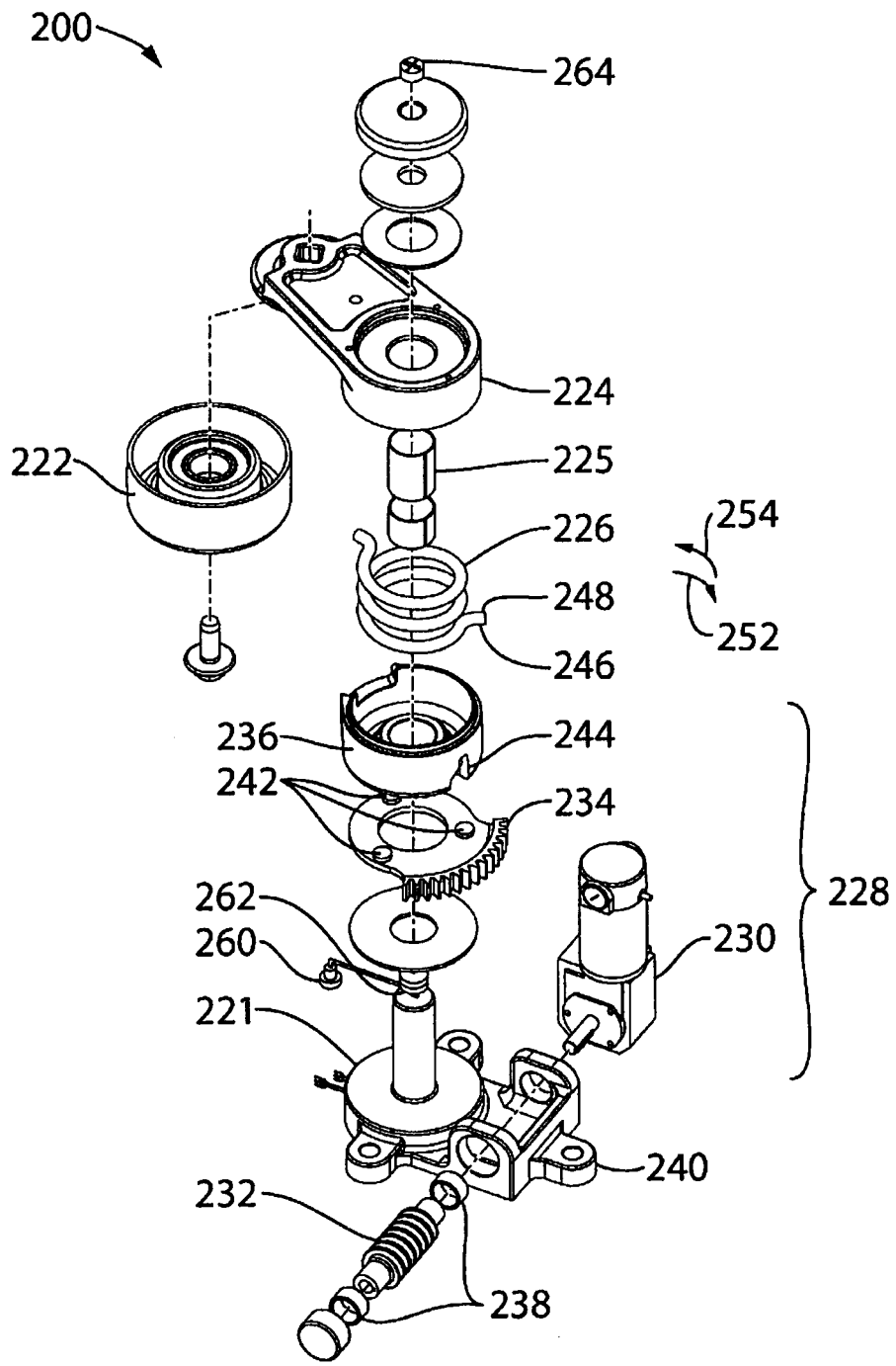
FIG. 4a is a perspective exploded view of another tensioner in accordance with another embodiment of the present invention.
Figure 4B:
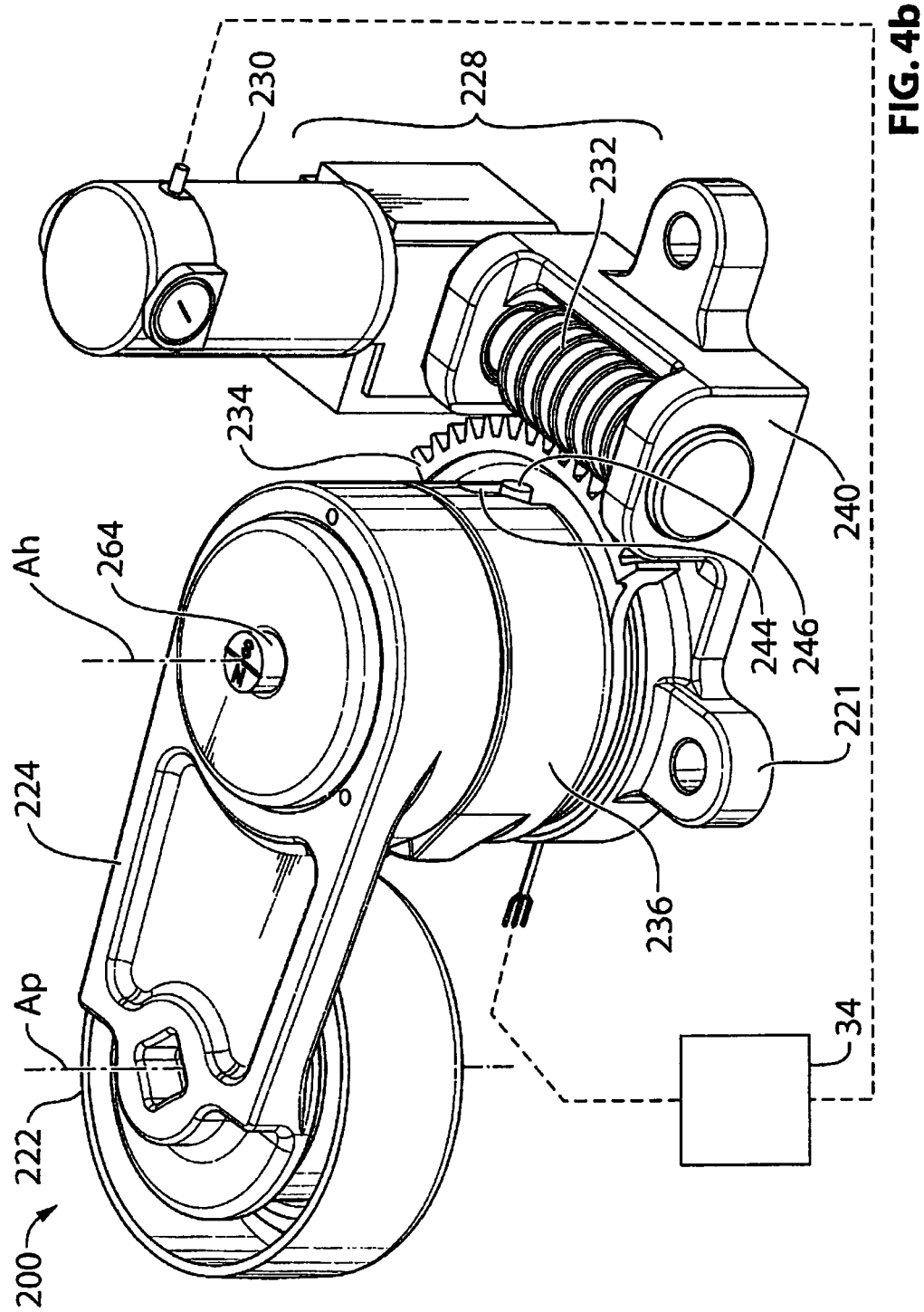
Figure 4C:
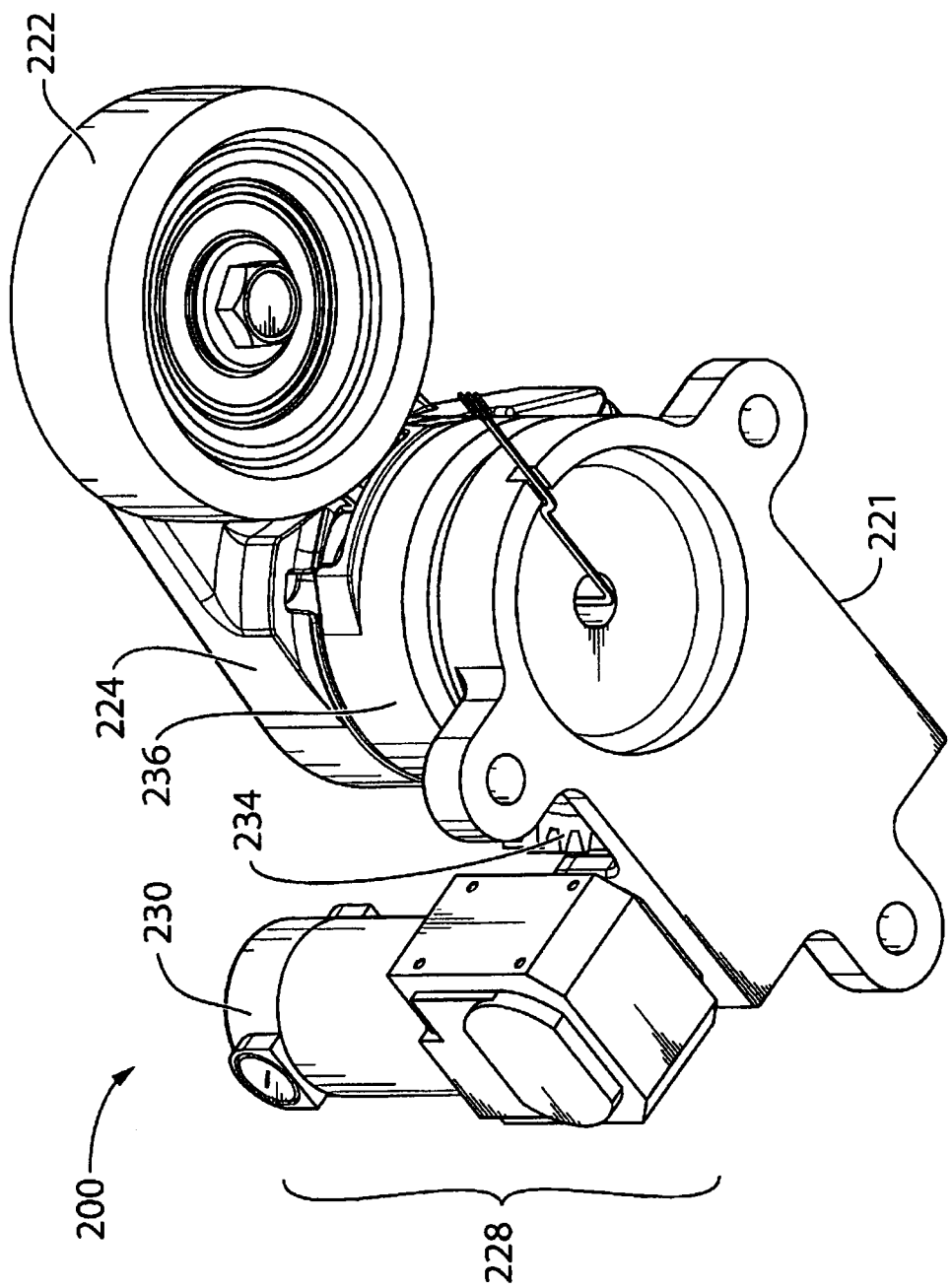
Figure 5A:
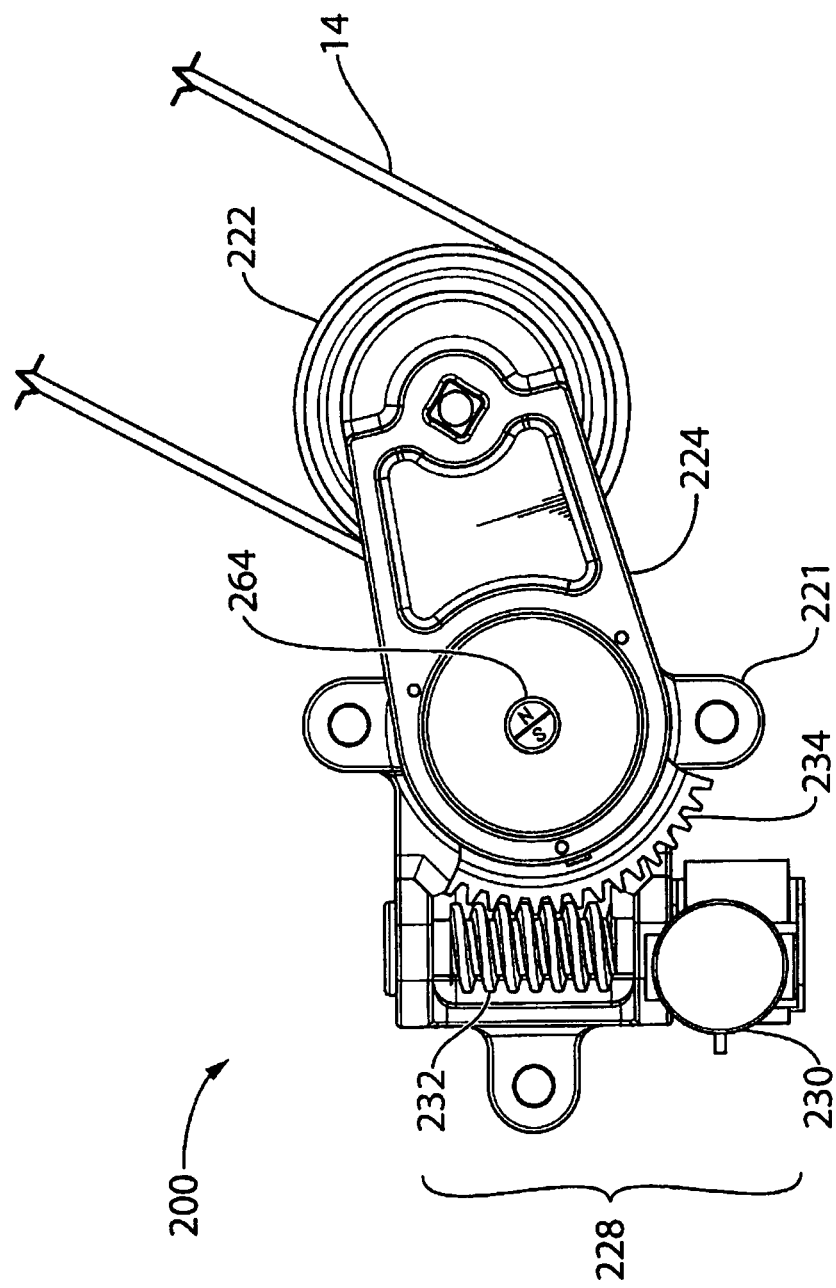
FIG. 5a is a plan view of the tensioner shown in FIG. 4a in a first position.
Figure 5B:
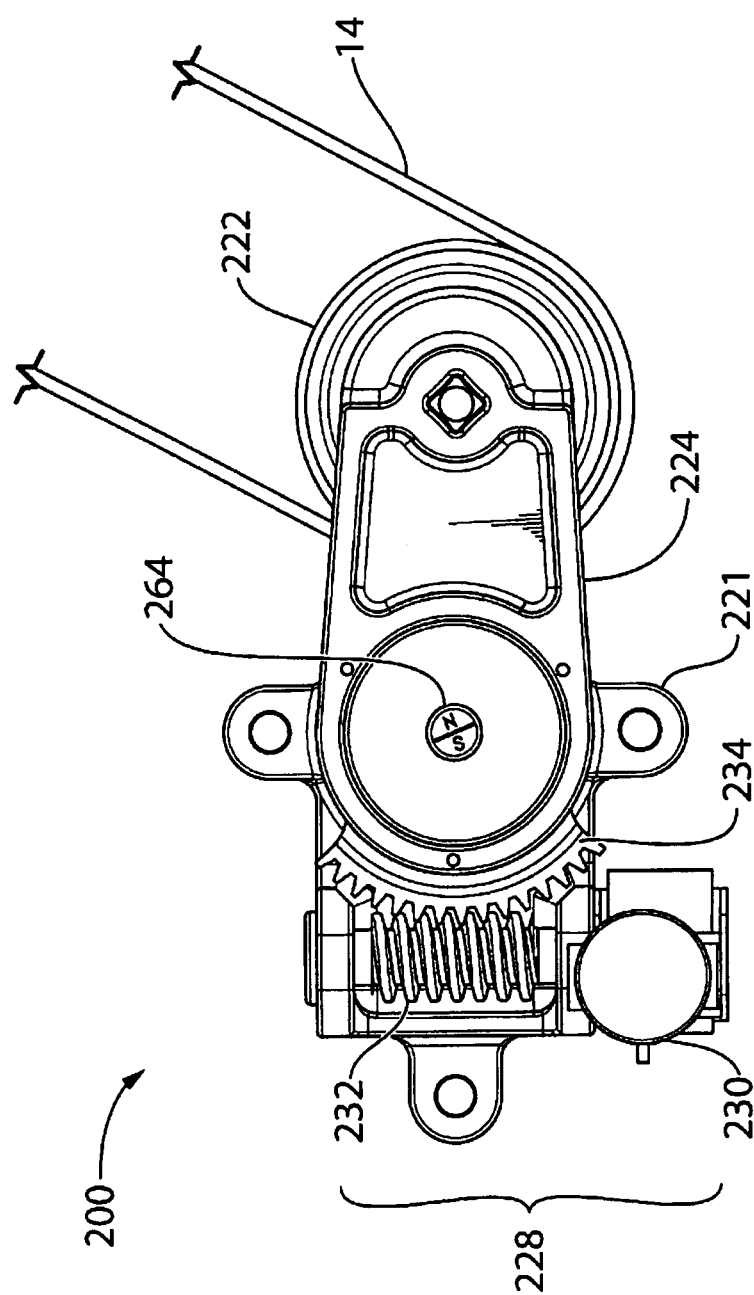
FIG. 5b is a plan view of the tensioner shown in FIG. 4a in a second position.
Figure 5C:
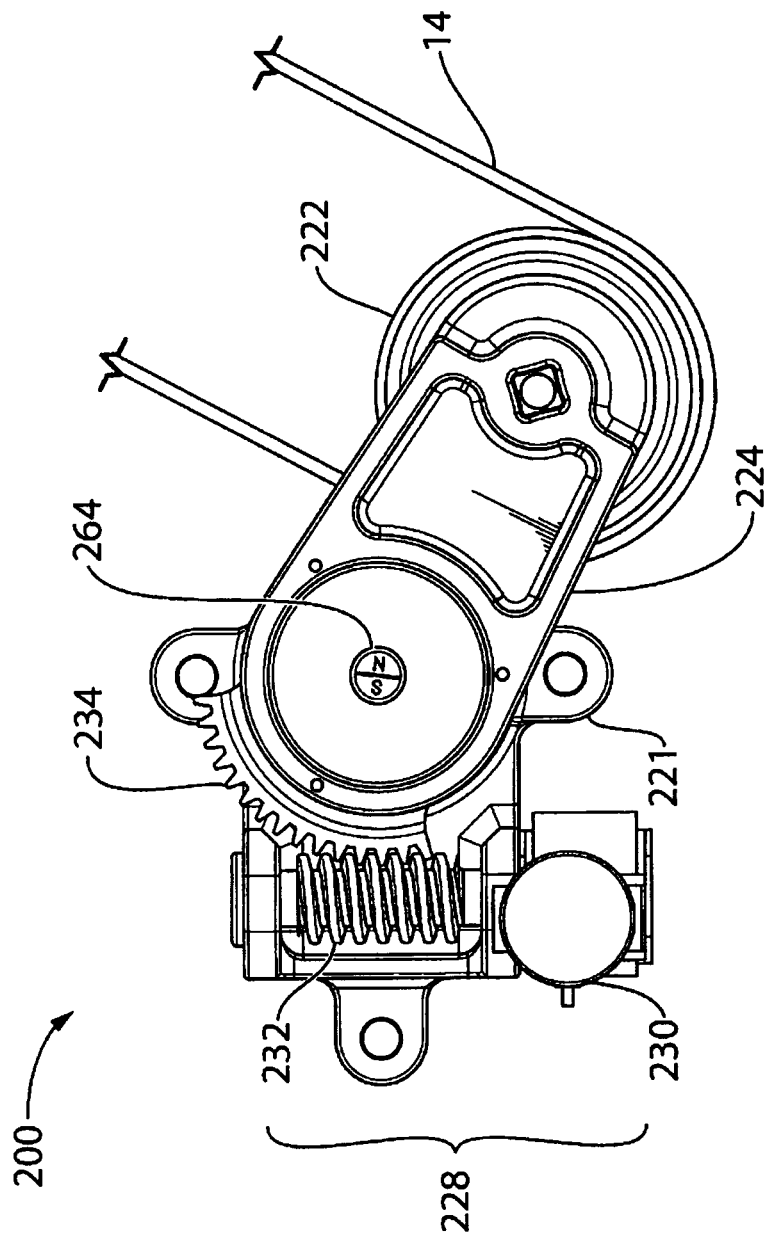
FIG. 5c is a plan view of the tensioner shown in FIG. 4a in a third position.

In the embodiment shown in FIGS. 4a-4c and 5a-5c, the tensioner actuator 228 is made up of a motor 230, in this instance with an integral gearbox, a worm 232, a sector gear 234 driven by the worm 232, and a spindle 236. The worm 232 is supported on bushings 238 in a bracket 240 that is part of the hub 221, and is driven by the motor 230, which is controlled by the controller 34. The worm 232 causes rotation of the sector gear 234, which is connected to the spindle 236 via projections 242. The spindle 236 includes a driver slot 244 in it through which a spring tang 246 formed at the first end 248 of the spring 226. The second end of the spring 226 is shown at 250 and engages the tensioner arm 224. Rotation of the spindle 236 therefore causes rotation of the first end 248 of the spring 226. In a low tension situation, the tensioner 200 may engage the belt 14 with the arm 224 positioned as shown in FIG. 5a. Rotation of the first end 248 in a first direction 252 causes the biasing force of the spring 226 on the tensioner arm 224 to increase progressively, thereby increasing the tensioning force of the tensioner arm 224, or more specifically the pulley 222, on the belt 14. Increasing the tensioning force causes rotation of the arm 224 in the clockwise direction in the views shown in FIG. 5a-5c, until the tension in the belt 14 increases sufficiently that an equilibrium is reached between the tensioner arm 224 and the belt 14. FIGS. 5b and 5c show the tensioner 200 when the tensioning force has been increased from the low tension setting in FIG. 5a, to midlevel tension setting (FIG. 5b), and to a high tension setting (FIG. 5c) respectively. It will be noted that the flights of the worm 232 are preferably configured to prevent the worm from being backdriven by the sector gear 234 so that when there is high tension in the belt 14, the biasing member 326 cannot relieve itself by backdriving the worm 232. If the rotation is in a second direction shown by arrow 254 in FIG. 4a, the tensioning force applied to the belt 14 is reduced progressively.

The tensioner 200 is provided with two sensors shown at 260 and 262 respectively. The sensor 260 is provided for measuring the speed of the pulley 222 and may be similar to the sensor 72 shown in FIG. 2a. The sensor 262 is provided for measuring the position of the tensioner arm 224. The sensor 262 may be any suitable type of sensor. For example it may be an angular position sensor, which is stationary and which can detect changes in the angular position of a circular magnet 264 which is connected for rotation with the tensioner arm 224 and is aligned with the hub axis Ah (FIG. 4b). The magnet 264 has a north pole that makes up 180 degrees of the magnet, and a south pole that makes up the other 180 degrees. The position sensor 262 may be any suitable type of sensor that can detect the change in the position of the north and south poles of the magnet 264 as the arm 224 pivots about the hub axis Ah. An example of a suitable sensor is a model 2SA-10 Sentron sensor provided by Sentron AG, of Zug, Switzerland. A suitable position sensing system (made up of a sensor like sensor 262 and a circular magnet like magnet 264) is shown and described in U.S. Pat. No. 7,188,021, which is incorporated herein in its entirety. Instead of providing two sensors 260 and 262 in the tensioner 200, it would be possible to omit one of the sensors 260 or 262, or to provide the tensioner 200 with neither of the sensors 260 or 262.

Another sensor (not shown) may be provided to determine the position of the first end 248 of the biasing member 226.

The information from the sensors may be sent to the controller 34 which may be programmed to use the pulley speed information from sensor 260 to determine the speed of the belt 14, which the controller 34 can use when determining if there is any belt slip at one or more of the accessory pulleys or crankshaft pulley engaged with the belt 14. The information from sensor 262 may be used by the controller 34 to determine the precise position of the tensioner arm 24 which the controller 34 can use to determine the tensioning force being applied to the belt 14 and therefore the tension in the belt 14. The controller 34 can use this information as feedback to assist it in controlling the actuator 222 in order to apply a selected amount of tension in the belt 14 using any of the algorithms described herein.

Figure 6:
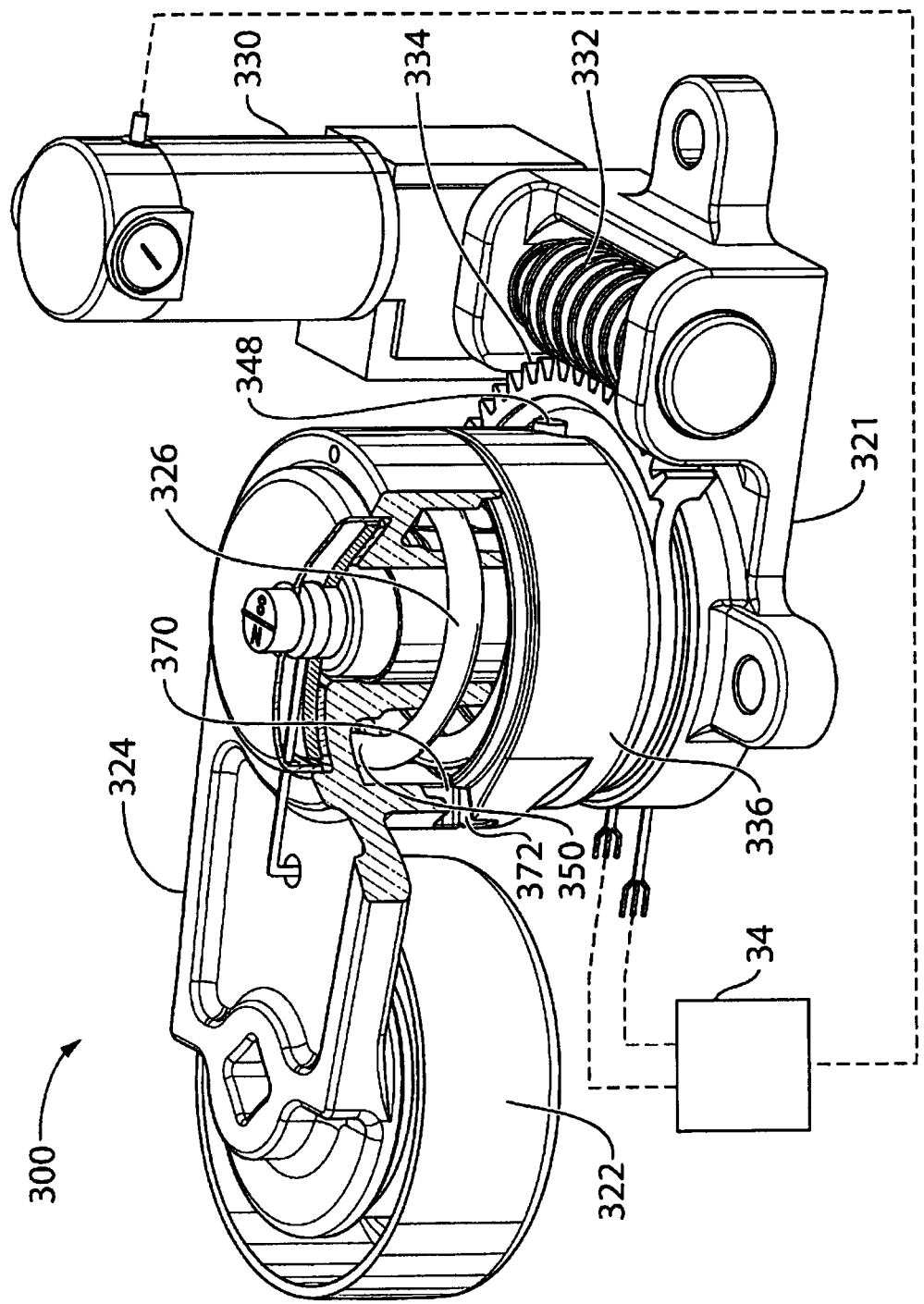
FIG. 6 is a cutaway perspective view of another tensioner in accordance with yet another embodiment of the present invention.
Figure 7A:
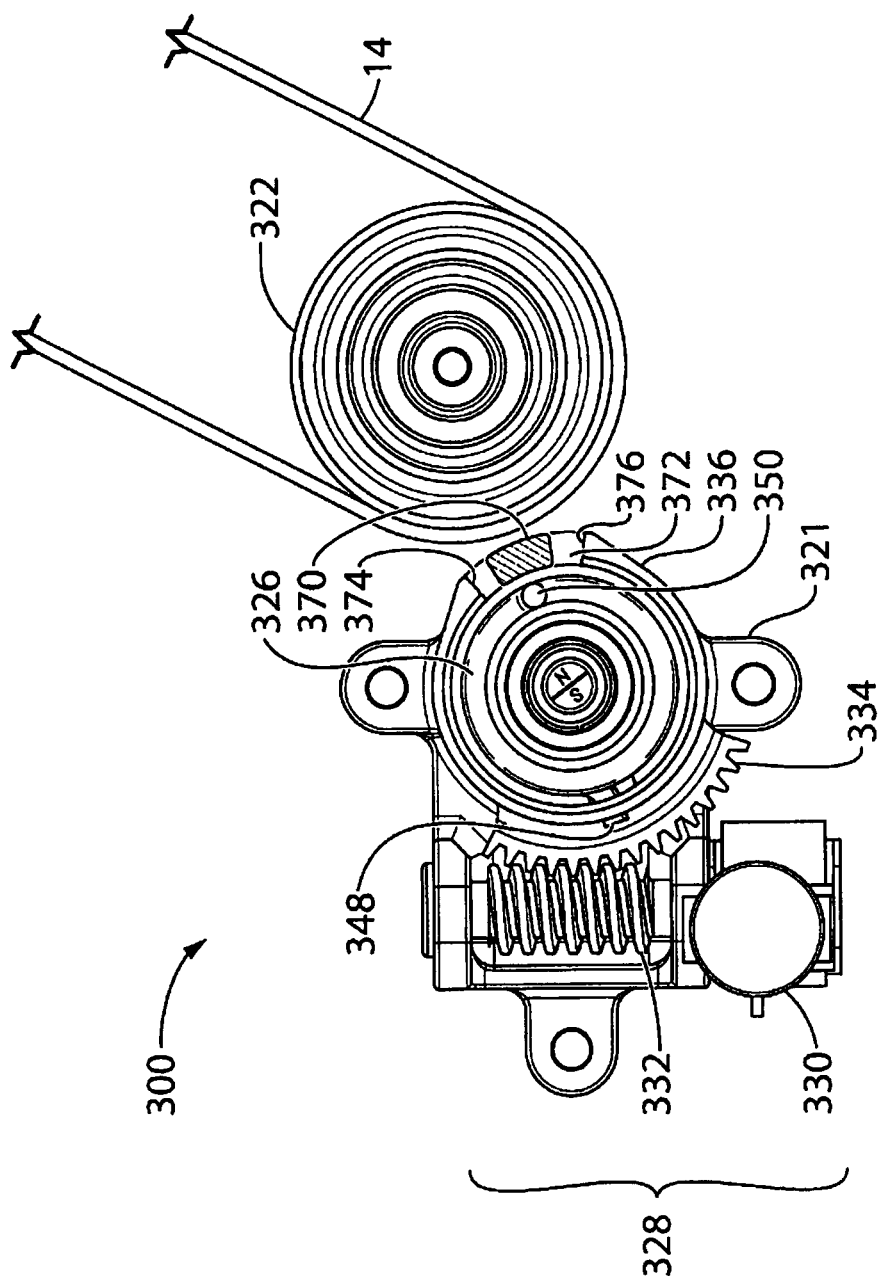
FIG. 7a is a plan view of the tensioner shown in FIG. 6 in a first position.
Figure 7B:
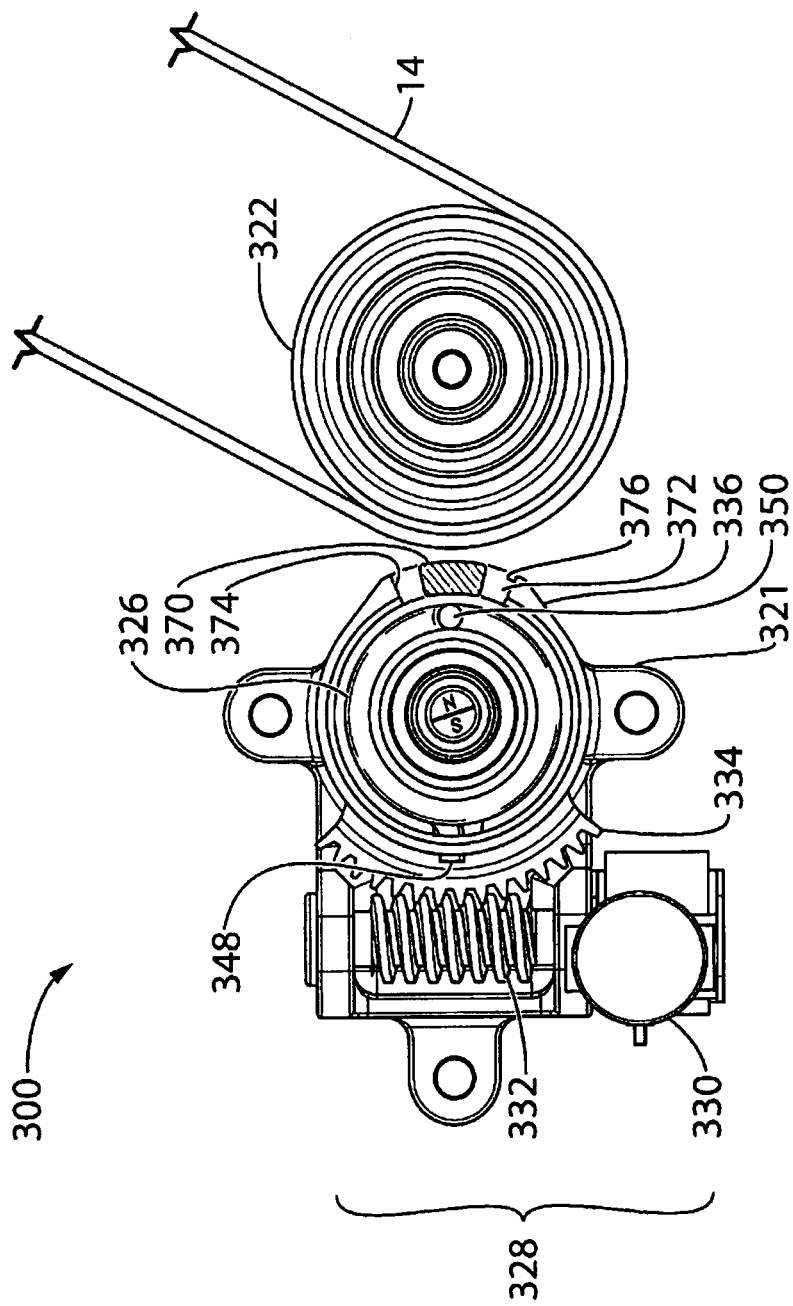
FIG. 7b is a plan view of the tensioner shown in FIG. 6 in a second position.
Figure 7C:
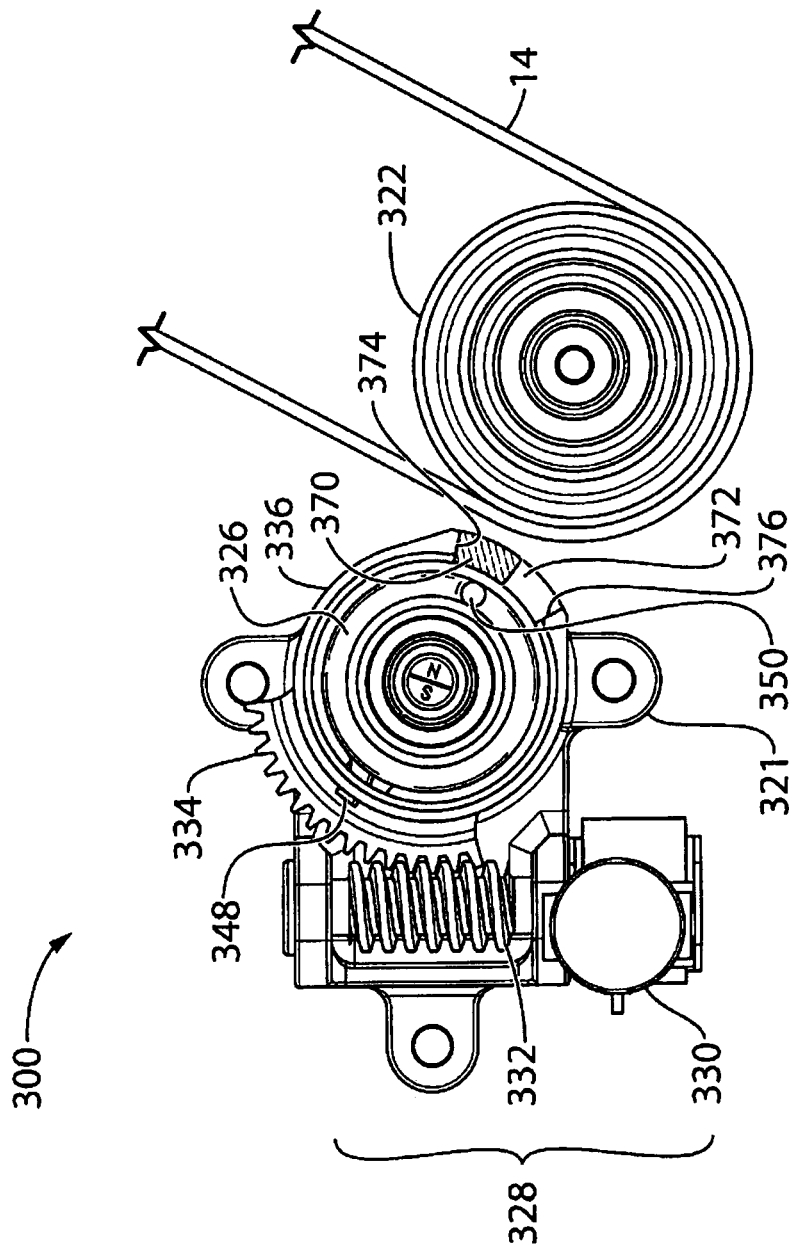
FIG. 7c is a plan view of the tensioner shown in FIG. 6 in a third position.

Reference is made to FIGS. 6 and 7a-7c, which describes a tensioner 300 in accordance with another embodiment of the present invention. The tensioner 300 may have a hub 321, a tensioner arm 324 that has a pulley 322, a biasing member 326 that drives the arm 324 towards the free arm stop position, and an actuator 328 that drives a spindle 336 that drives one end of the biasing member 326 to control the biasing force, and therefore the tensioning force, and therefore the belt tension. All of these components may be similar to their counterparts, 221, 222, 224, 226, 228 and 236 shown in FIGS. 4a-4c, except that the tensioner arm 324 has a projection 370 that extends downwards into a slot 372 on the spindle, shown at 336. Referring to FIGS. 7a-7c, FIG. 7a shows the tensioner 300 at a low tension setting. It will be noted that all of the tensioner arm 324, except for the projection 370 has been omitted from FIGS. 7a-7c so as to show the projection 370 and the slot 372 more clearly. As can be seen in FIG. 7a, at this setting, the projection 370 is roughly in the middle of the slot 372, spaced from both ends, shown at 374 and 376 of the slot When the controller 34 determines that the belt tension should be raised, the motor shown at 330 drives the worm 332, which drives the sector gear 334, which drives the spindle 336, which drives the first end 348 of the biasing member 326 thereby increasing the biasing force of the biasing member 326 on the tensioner arm 324. This causes the tensioner arm 324 to rotate as it presses with more tensioning force into the belt 14. FIG. 7b shows the tensioner arm 324 at a midlevel tension setting. It will be noted that in FIG. 7b, the projection remains spaced from both ends 374 and 376 of the slot 372. As the controller 34 continues to drive the first end 348 of the biasing member 326, the first end 348 of the biasing member 326 will rotate angularly towards the second end shown at 350. If there is too much angular rotation of the first end 348 towards the second end 350, it may be possible that the biasing member 326 could become damaged. To prevent this, as the first end 348 rotates towards the second end 350, the first end 374 of the slot 372 on the spindle 336 rotates towards the projection 370. If the first end 348 of the biasing member 326 rotates by a selected angular amount towards the second end 350, the first end 374 of the slot 372 engages the projection 370. At this point, if the actuator 328 continues to drive the rotation of the first end 348 of the biasing member 326, the projection 370 (and therefore the tensioner arm 324) will be driven to rotate by the first end 374 of the slot 372 so that the relative angle between the first and second ends 348 and 350 of the biasing member 326 cannot decrease any further. Because the relative angle between the first end 348 and second end 350 of the biasing member 326 no longer decreases with further rotation of the sector gear 334, the biasing force applied by the biasing member 326 to the tensioner arm 324 no longer increases. However, because the tensioner arm 324 continues to be driven further and further into the belt 14 with further rotation of the sector gear 334 (by the motor 330), the tension in the belt 14 continues to increase. FIG. 7c shows the tensioner arm 324 at a high tension setting where the projection 370 engages the first end 374 of the slot 372.

It will be noted that the projection 370 could instead be on the spindle 336 and the slot 372 could instead be on the tensioner arm 324. It will be further noted that there need not be a slot at all for engaging the projection 370. For example, a first projection could be provided on the spindle 336 that extends radially outwards and upwards. A second projection could be provided on the tensioner arm 324 and could extend radially outwards, or optionally radially outwards and downwards. A first engagement surface on the first projection would engage a second engagement surface on the second projection if the relative angle between the first and second ends of the biasing member decreases below a selected angle, thereby preventing any further decrease in the relative angle.

The tensioner 300 may includes sensors similar to sensors 260 and 262 in the embodiment shown in FIGS. 4a-4c.

Figure 8A:
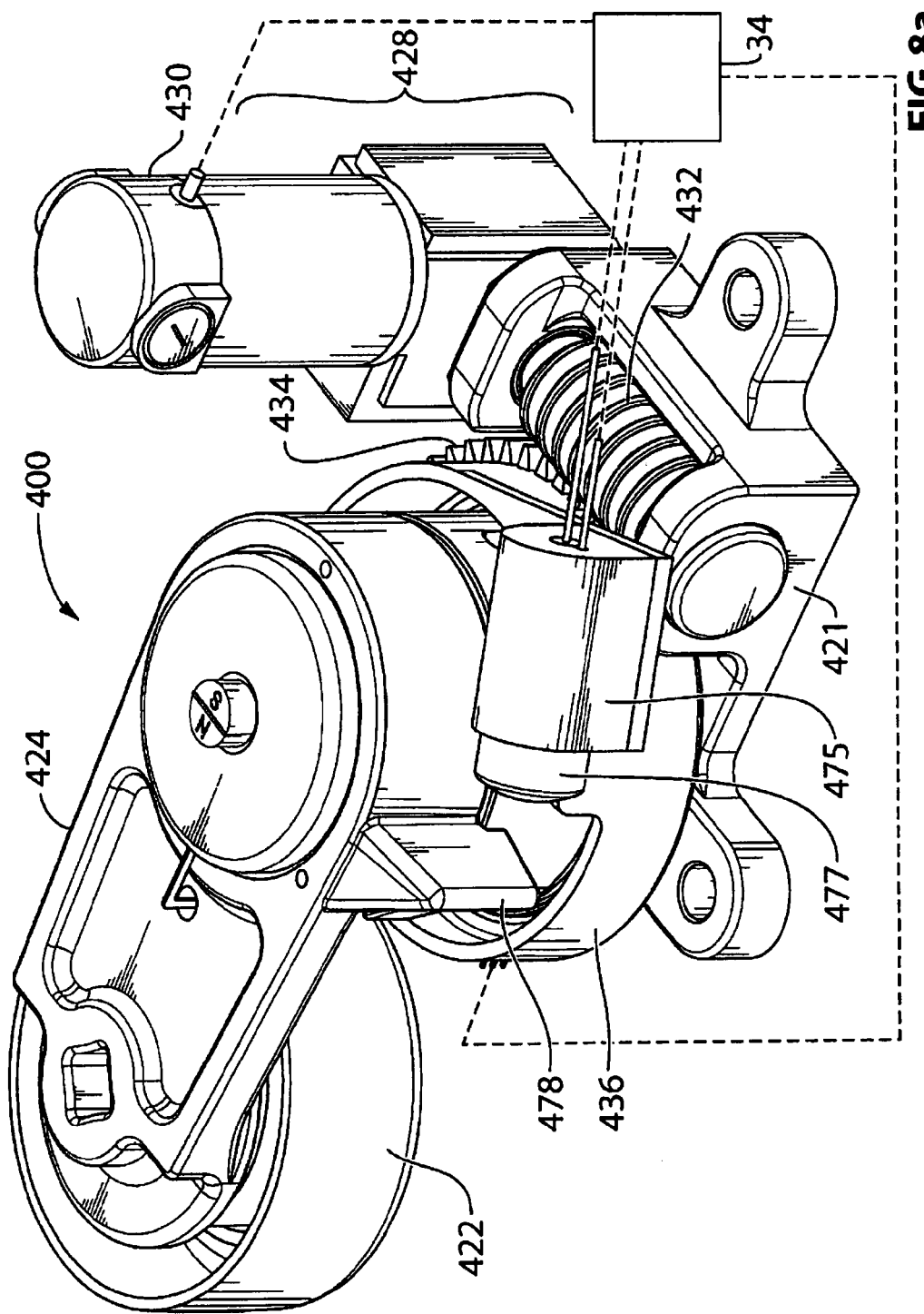
FIG. 8a is a perspective view of another tensioner in accordance with yet another embodiment of the present invention.
Figure 8B:
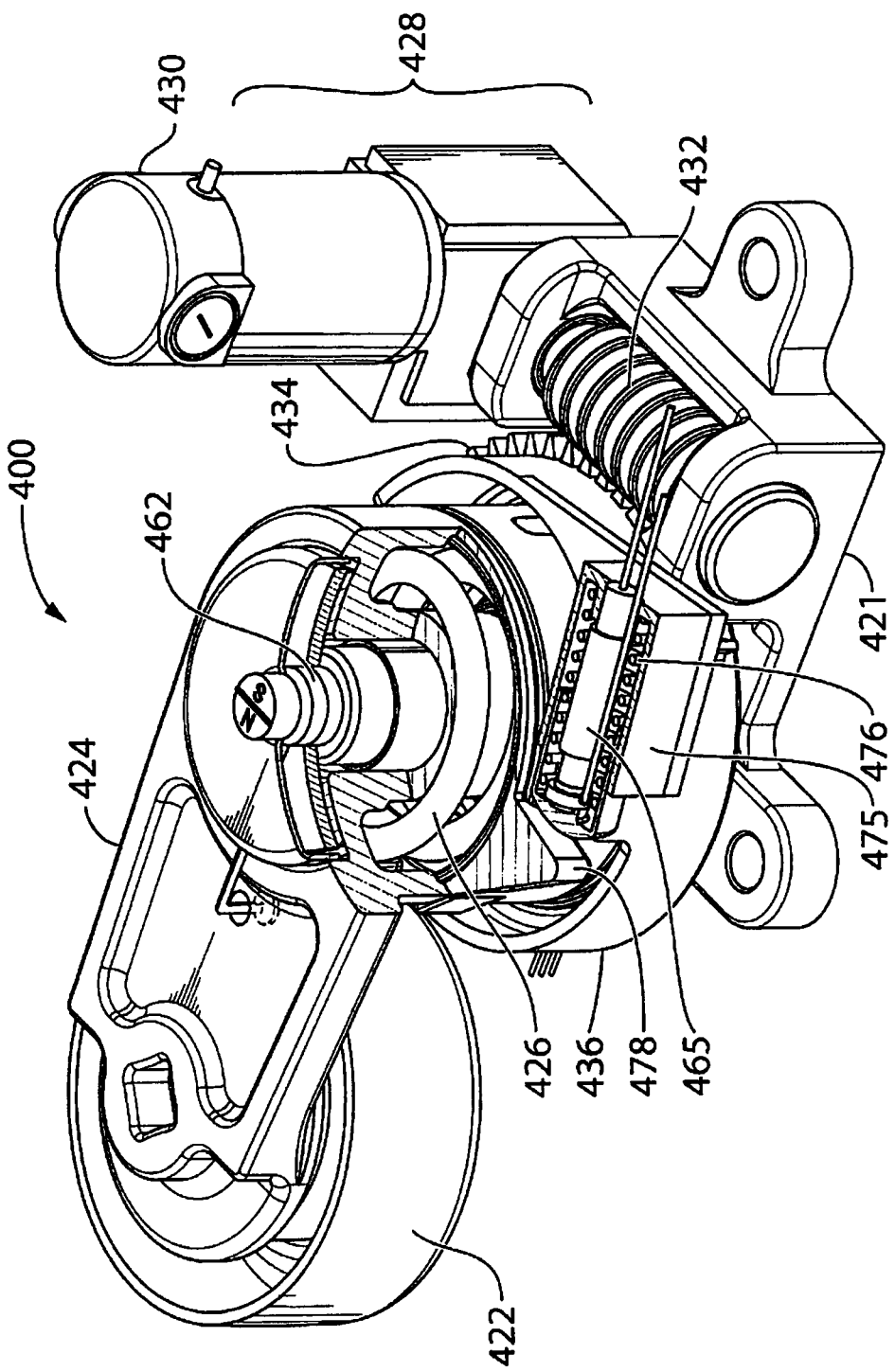
Figure 9A:
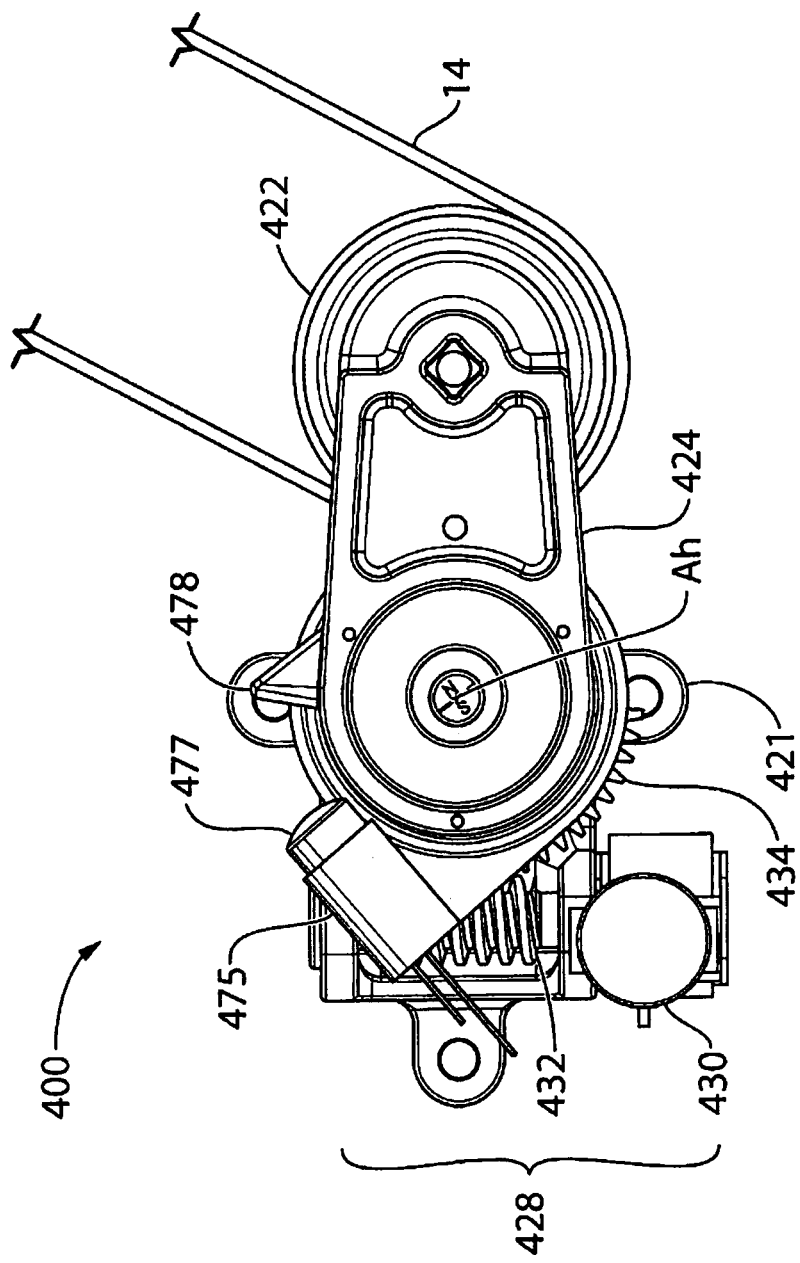
FIG. 9a is a plan view of the tensioner shown in FIG. 8a in a first position.

Reference is made to FIGS. 8a, 8b, 9a and 9b, which shows a tensioner 400 in accordance with another embodiment of the present invention. The tensioner 400 may have a hub 421, a tensioner arm 424 that has a pulley 422, a biasing member 426 (FIG. 8b) that drives the arm 424 towards the free arm stop position, and an actuator 428 that may all be similar to the components 221, 224, 222, 226 and 228 shown in FIG. 4a-4c, except that the actuator 428 does not drive the first end shown at 448 of the biasing member 426, and instead drives a spindle 436 that drives a bumper arm 475 that includes a second biasing member 476 and a cover 477, into a projection 478 on the tensioner arm 424 to drive the tensioner arm 424 (more specifically the pulley 422 on the tensioner arm 424) into the belt 14, thereby controlling the tensioning force, and therefore the belt tension. FIG. 9a shows the tensioner in an unboosted state. This may be considered a low tension setting, and the first biasing member 426 may be selected to have a spring constant that is relatively low for this purpose and may be configured to exert a relatively low biasing force on the tensioner arm 424 for this purpose. In this state the bumper arm 475 is unengaged with the projection 478 on the tensioner arm 424 and so the tensioner 424 operates as a typical tensioner according to the response curve 102 shown in FIG. 1c. It will be noted that in this state, the bumper arm 475 is sufficiently out of the way that the tensioner arm 424 can pivot throughout a desired range of motion without engagement between it and the bumper arm 475.

When it is desired to boost the tension in the belt 14, the motor shown at 430 drives worm 432, which drives sector gear 434, which drives spindle 436 to bring the bumper arm 475 into engagement with the projection 478 on the tensioner arm 424 (shown in FIG. 9b), so as to urge the tensioner arm 424 into the belt 14 to increase the tension in the belt 14. Once engagement between the bumper arm 475 and the tensioner arm 424 occurs, further rotation of the motor 430 results in a progressively greater amount of compression of the second biasing member 476, which increases the amount of force it applies to the tensioner arm 424. This in turn increases the tensioning force applied by the tensioner arm 424 on the belt 14 which in turn increases the belt tension. Because the motor 430 is only engaged with the tensioner arm 424 through the second biasing member 476, the tensioner arm 424 can still pivot to accommodate dynamic fluctuations in belt tension even when the tension is being boosted, or more broadly, even when the tensioner arm 424 is engaged by the bumper arm 475.

Figure 9B:
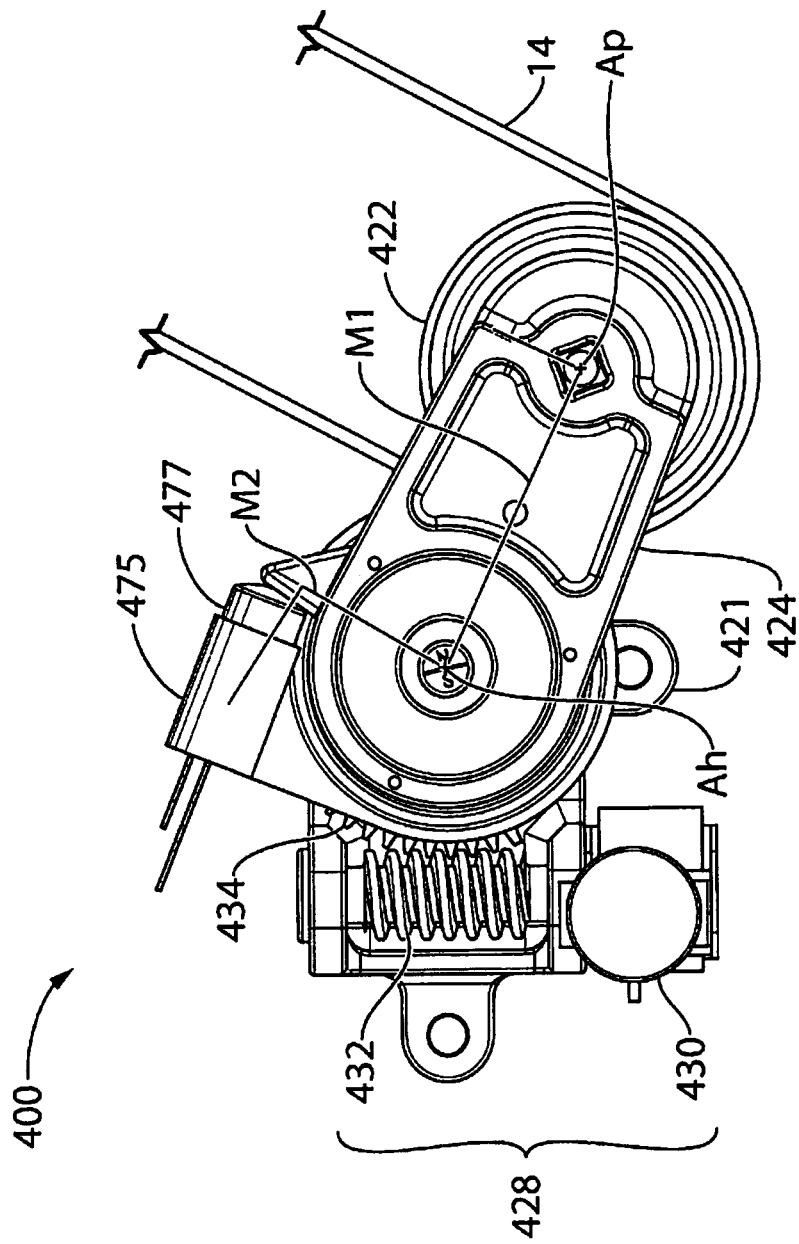
FIG. 9b is a plan view of the tensioner shown in FIG. 8a in a second position.

Referring to FIG. 9b, a moment arm M1 exists between the line of action through the pulley axis Ap of the pulley 422 and the pivot axis Ah of the tensioner arm 424. A moment arm M2 exists between the line of action of the bumper arm 475 on the projection 478 and the pivot axis Ah. It is optionally possible to configure the tensioner 400 so that the moment arm M2 is greater than the moment arm M1 so as to facilitate driving the pulley 422 into the belt 14 against the force exerted by the belt 14 on the pulley 422.

The tensioner 400 may include one or more sensors. A sensor shown at 460 may be similar to sensor 260 and is used for determining the speed of the pulley 422. A sensor shown at 462 may be similar to sensor 262 and is used for determining the position of the tensioner arm 424. A sensor shown at 465 is provided for determining the force applied by the second biasing member 476 on the tensioner arm 424, which is used in addition to the information from the sensor 462 which provides tensioner arm position information and therefore information regarding the force applied on the arm 424 by the first biasing member 426, so as to determine the tensioning force being applied to the belt 14. This can be used as feedback for the controller 34 while driving the motor 430 to boost the belt tension, in order to determine at what position to stop the motor 430. The sensor 465 may be, for example, a button load cell mounted to the cover 477. Instead of the sensor 465, the bumper arm 475 may contain a displacement measurement sensor 466, which can be used to measure the length of the bumper arm 475, thereby indicating the amount of compression there is in the second biasing member 476. This can be used by the controller 34 to determine the force exerted by the second biasing member 476 on the projection 478, which can be used to determine the overall tensioning force applied by the tensioner 400 on the belt 14 and thereby determine the belt tension. The displacement measurement sensor 466 may be configured to signal the controller only when in extended and retracted positions, or may be configured to signal to the controller 34 when it reaches any of three or more positions.

When it is desired to position the tensioner 400 in a low tension setting, the motor 430 may be rotated in the opposite direction as when boosting tension. When the controller 34 detects that the sensor 465 no longer senses any engagement between the bumper arm 475 and the projection 478, the controller 34 may be programmed to rotate the motor 430 by a selected number of revolutions to bring the bumper arm 475 sufficiently out of the way to accommodate the pivoting of the tensioner arm 424 when operating at the low tension setting.

It will be noted that, in the embodiment shown in FIGS. 8a, 8b, 9a and 9b, the element that holds the first end of the biasing member 426 is fixedly mounted to the hub 421 so that the first end of the biasing member 426 remains stationary and is not rotated with the spindle 436.

Figure 11A:
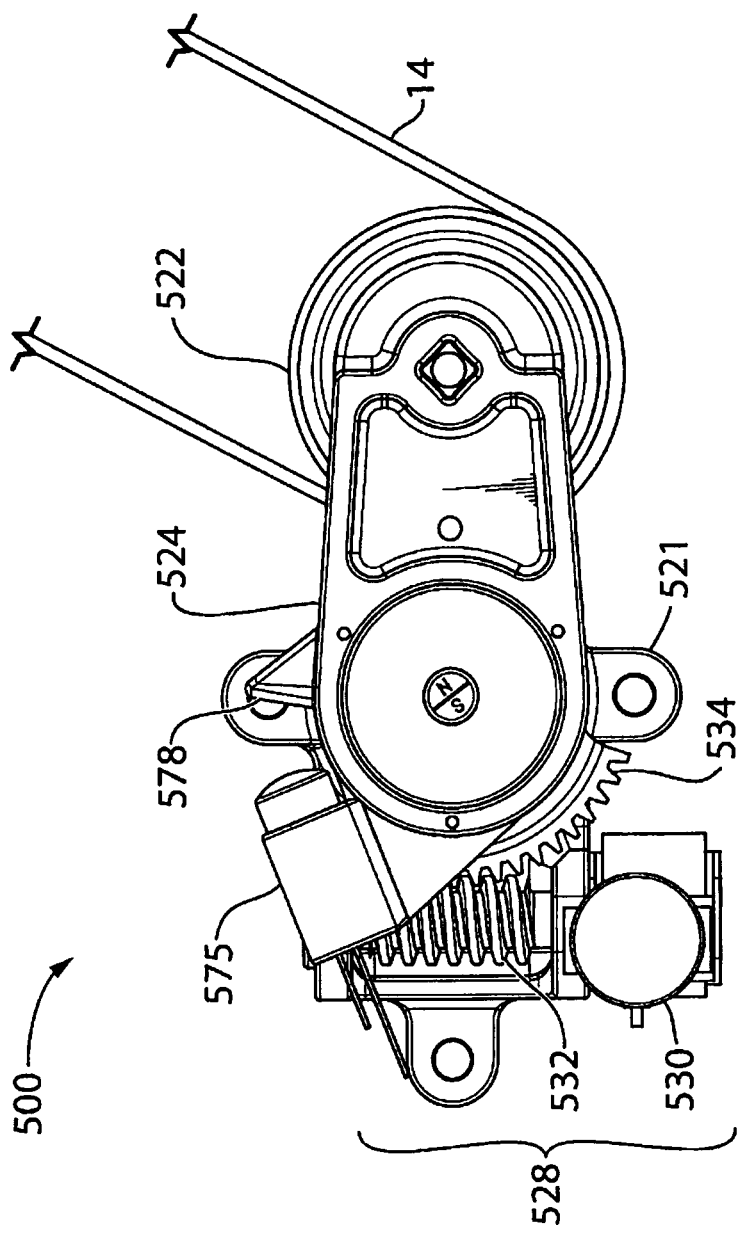
FIG. 11a is a plan view of the tensioner shown in FIG. 10 in a first position.
Figure 11B:
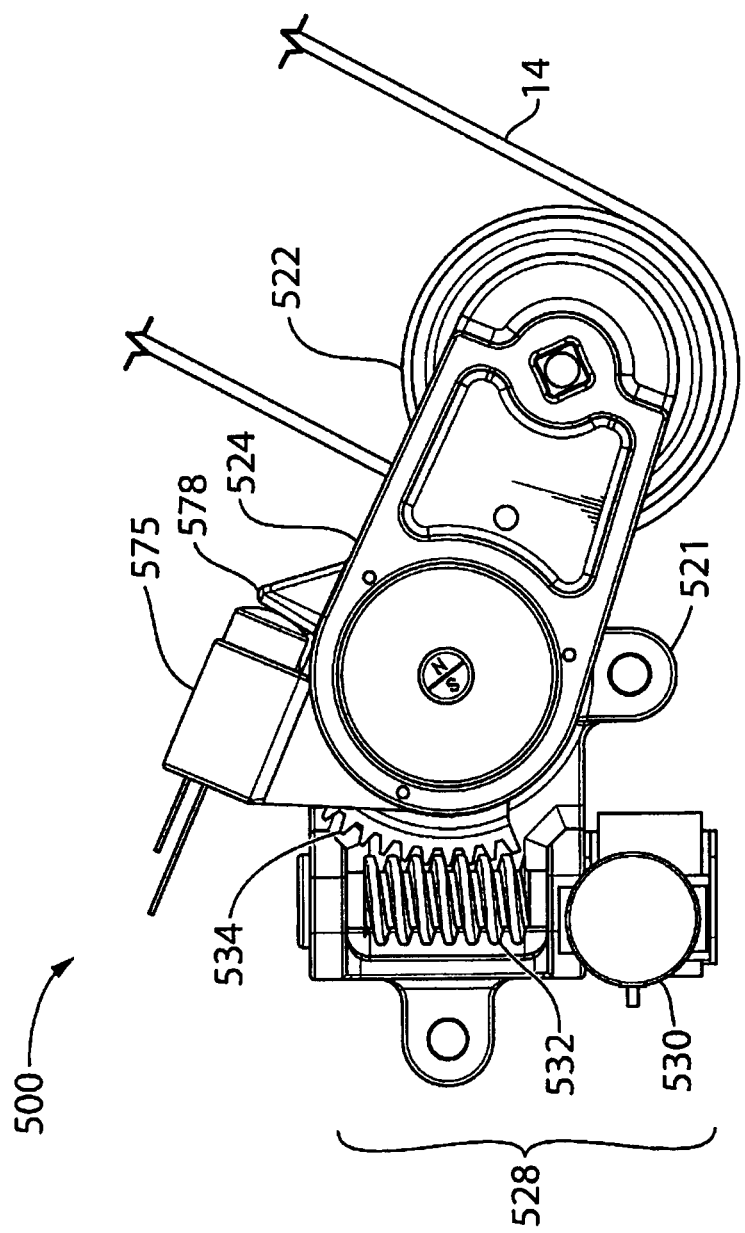
FIG. 11b is a plan view of the tensioner shown in FIG. 10 in a second position.

Reference is made to FIG. 10, which shows a tensioner 500 in accordance with another embodiment of the present invention, which includes a hub 521, a pulley 522, a tensioner arm 524, a biasing member 526 and an actuator 528, which is controlled by controller 34. The actuator 528 includes, among other things, a motor 530, a worm 532, a sector 534 that is connected for rotation with a spindle 536. The tensioner 500 may be similar to the tensioner 400 except that in the tensioner 500, the element that holds the first end of the biasing member shown at 526 is part of the spindle (shown at 536). FIG. 11a shows the tensioner 500 at a low tension setting. In this state, the bumper arm shown at 575, which may be similar to bumper arm 475, is out of the way of the projection shown at 578 on the tensioner arm 524 so that the tensioner arm 524 can pivot throughout some range of motion as a result of engagement with the belt 14 without contacting the bumper arm 575. FIG. 11b shows the tensioner 500 at a high tension setting. To boost the tension in the belt 14, the bumper arm 575 is driven by the motor shown at 530 toward the projection 578. This drives the first end 548 of the biasing member 526 however, which increases the torsion in the biasing member 526, and therefore drives the tensioner arm 524 to rotate further into the belt 14, increasing the belt tension. At some point, the spindle 536 is rotated sufficiently relative to the tensioner arm 524 that the bumper arm 575 engages the projection 578. At that point, further driving of the spindle 536 drives the bumper arm 575 further into engagement with the projection 578 which increases the biasing force applied by the biasing member 526, and which also increases the biasing force applied by the second biasing member shown at 576 which is part of the bumper arm 575. This assists in preventing damage to the first biasing member 526 resulting from overrotation of the first end 548, because the presence of the bumper arm 575 provides assistance so that a selected belt tension can be reached without all of the force having to be generated through the first biasing member 526. The remote drive arrangement shown for the tensioner 500 may be applied to any of the tensioners shown and described herein where a motor is utilized and would benefit from being positioned away from the engine block.

The tensioner 500 may includes sensors similar to the sensors 460, 462 and 465 shown in FIGS. 8a and 8b and a displacement measurement sensor similar to displacement measurement sensor 466.

Figure 12:
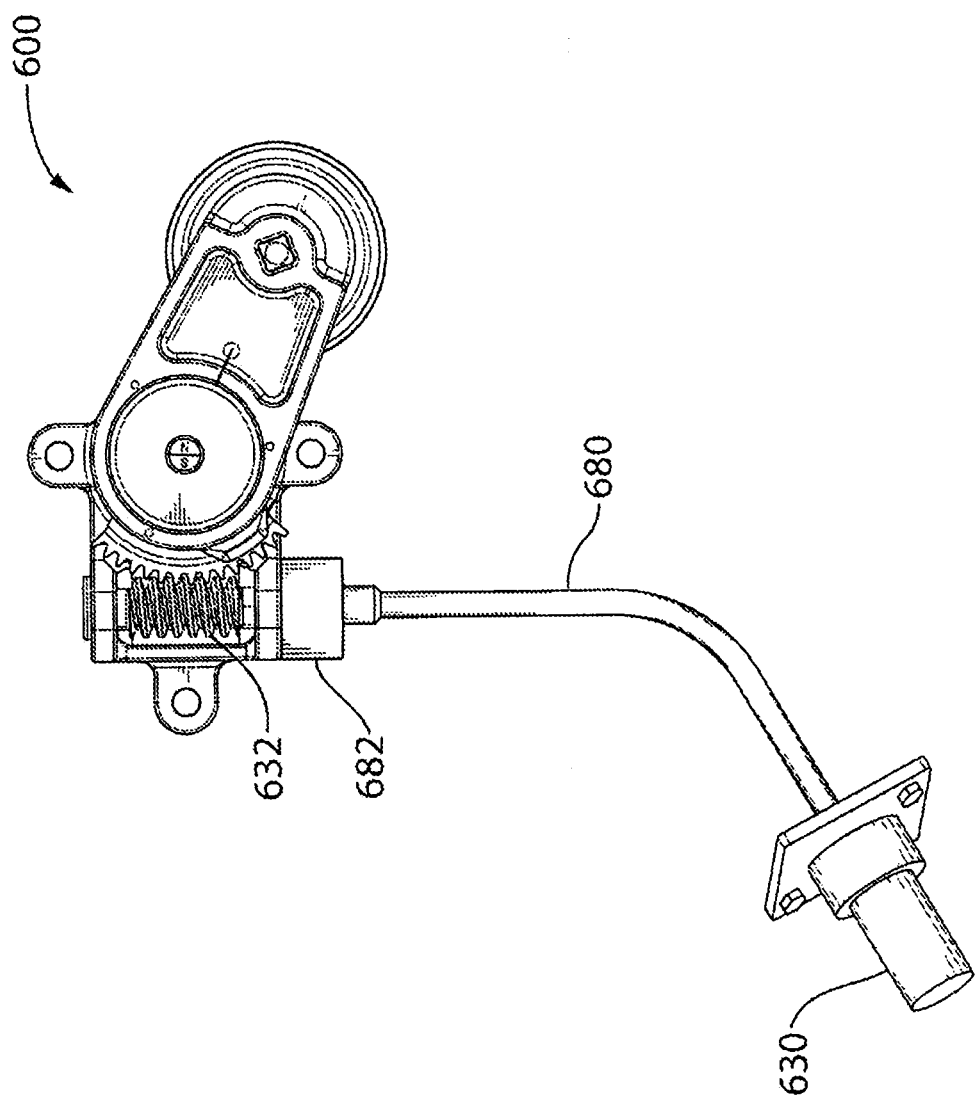
FIG. 12 is a plan view of another tensioner in accordance with yet another embodiment of the present invention.

Reference is made to FIG. 12, which shows a tensioner 600 in accordance with another embodiment of the present invention. In a situation where the temperature in the immediate environment of the motor is high, the operating efficiency of the motor decreases, sometimes significantly. This is due to several factors, including the fact that the resistance of the copper wire in the motor increases with temperature. Thus at 60 degrees Celsius or at 80 degrees Celsius, the wire has a higher resistance than it does at 25 degrees Celsius. As a result, the torque capability of the motor is reduced at high temperature. To compensate for this the motor may have to be upsized significantly in order to be assured of being able to handle a given torque requirement. To assist in keeping the cost of the motor shown at 630 low, the tensioner 600 may be similar to the tensioner 200 except that the tensioner 600 includes a remote drive arrangement in that the motor 630 is operatively connected to the worm 632 through a flexible shaft 680. The flexible shaft 680 permits mounting the motor 630 away from the engine block, which means it may be possible to keep the motor 630 at a lower temperature than one that is mounted to or proximate to the engine block. The motor 40 may be positioned in a particularly cool part of the engine bay, such as near the grill or at some other cool air inlet. This would permit a less expensive motor to be used since it would not need to be oversized to compensate for a reduction in efficiency resulting from operating temperature.

Also, in any of the embodiments wherein a motor drives either the tang of the biasing member or drives a bumper arm, a locking mechanism (not shown) can be brought into provided to lock the spindle in a particular position. The locking mechanism may include a pawl or the like that engages an aperture or a detent or the like in the spindle. The spindle may include only a single aperture or detent, and is thus only held when it reaches a certain position, or it may have a plurality of plurality of apertures or detents about its circumference so that it can be held in a plurality of different positions. An actuator, such as a solenoid, would be provided to withdraw the pawl from the aperture/detent to permit the spindle to move to a different position or to return to a home position. Instead of this, the locking mechanism could include a cam that engages the tensioner arm, a wrap spring or any other suitable means.

If a gearbox is provided (as shown at 682) to reduce the speed and increase the effective torque provided by the motor 630, it is preferable that the gearbox be provided at the outlet end of the flexible shaft 680 (i.e. between the flexible shaft 680 and the worm shown at 632), as opposed to providing the gearbox between the motor 630 and the flexible shaft 680. As a result, the flexible shaft 680 is not relied upon to transmit high torque, which can result in its premature wear and/or windup in the flexible shaft 680. The remote mounting of the motor 630 permits the motor 630 to be positioned in a particularly cool part of the engine bay, such as near the grill or at some other cool air inlet.

Figures 13A, 13B:
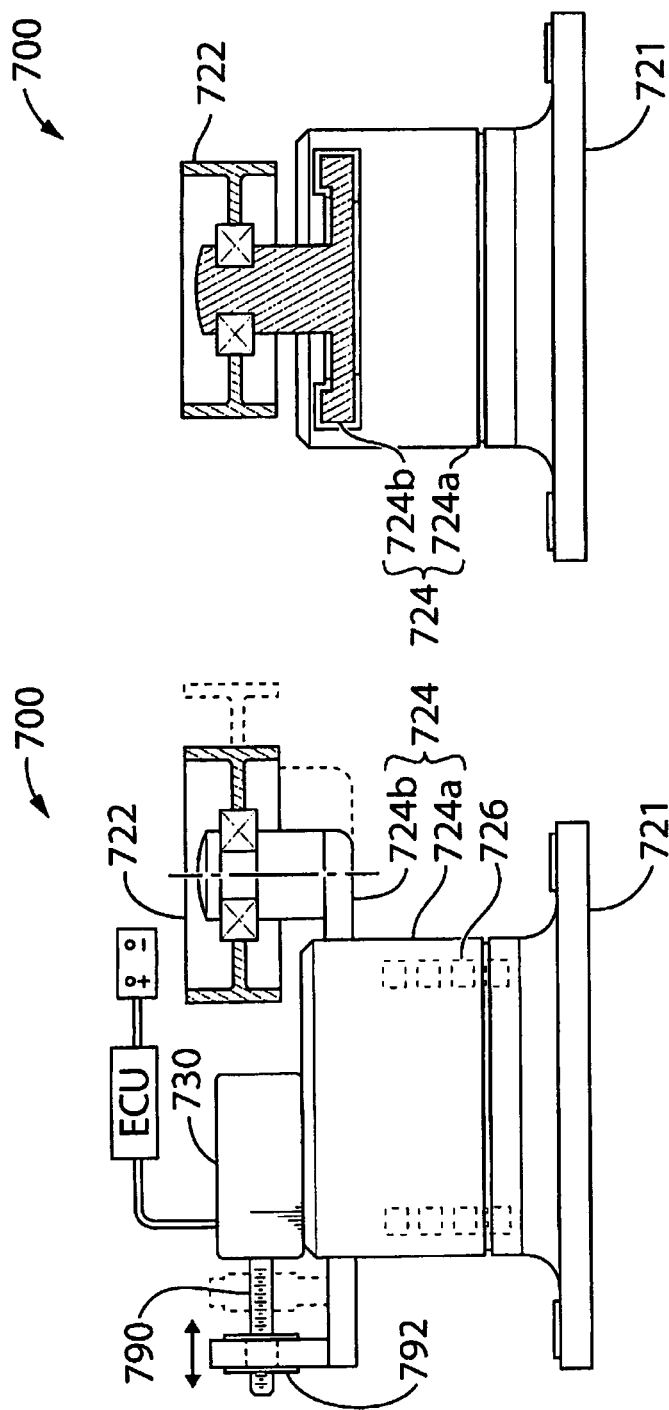
FIG. 13a is a side view of the tensioner shown in FIG. 12 in a first position.
FIG. 13b is a side view of the tensioner shown in FIG. 12 in a second position.
Figure 13C:
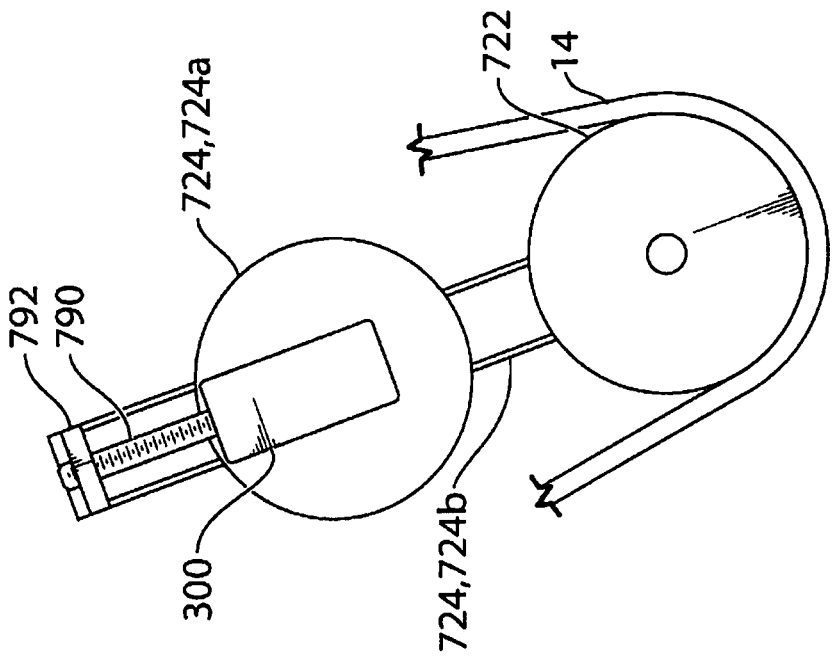
FIG. 13c is a plan view of the tensioner shown in FIG. 12 in a first position.
Figure 13D:
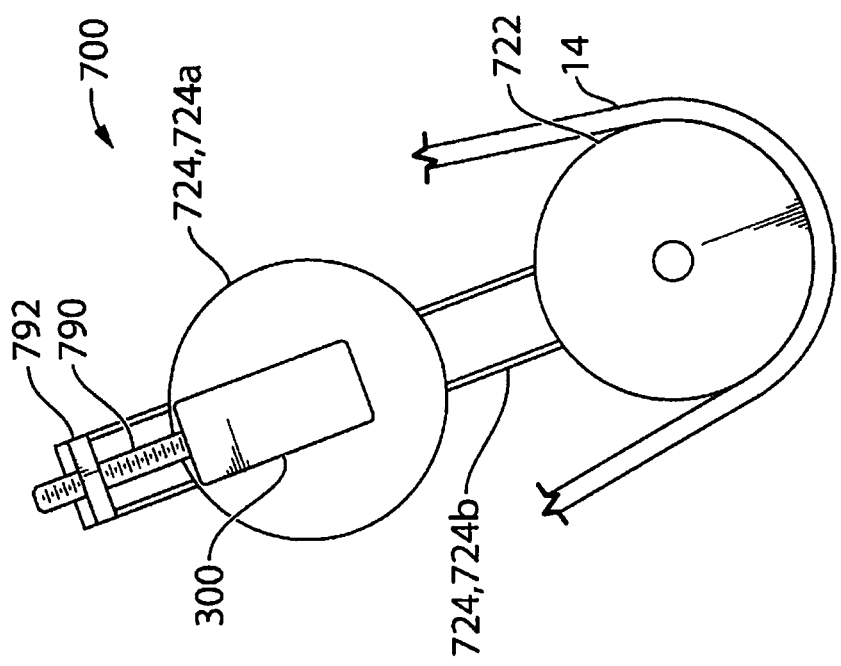
FIG. 13*d* is a plan view of the tensioner shown in FIG. 12 in a second position.

Reference is made to FIG. 13a, which shows a tensioner 700 in accordance with another embodiment of the present invention. The tensioner 700 includes a hub 721, a tensioner arm 724 that is pivotable about a hub axis Ah, a pulley 722 mounted on the tensioner arm 724 for rotation about a pulley axis Ap, a biasing member 726 engaged between the hub 721 and the tensioner arm 724 to bias the tensioner arm 724 towards the free arm stop position, and a tensioner actuator 728. The tensioner arm 724 shown in FIG. 13a includes a central portion 724a and an extendable portion 724b that is extendable from the central portion 724a by the actuator 728. A motor 730 that is mounted on the central portion 724a and drives a lead screw 790, which in turn causes linear movement of a traveler 792 mounted at one end of the tensioner arm 724. This linear movement causes extension or retraction of the tensioner arm 724 depending on the direction of rotation of the motor 730. Referring to FIGS. 13c and 13d, changing the length of the tensioner arm 724 (shown at L) changes the moment arm between the pulley 722 and the hub axis Ah, and also changes the hubload angle. Changing these properties changes the tensioning force applied by the pulley 722 on the belt 14, which depends at least in part on the moment arm M2 of the pulley 722 as compared to the moment arm M1 of the biasing member 726. Thus, when the moment arm of the biasing member 726 is constant as shown in FIG. 13a, reducing the length L of the tensioner arm 724 increases the tension in the belt 14 because it increases the force of the pulley 722 acting on the belt 14. Similarly, extension of the tensioner arm 724 decreases the moment arm of the tensioner arm 724 on the belt 14, which decreases the tension in the belt 14. The length of the tensioner arm 724 may be determined using any suitable type of sensor, such as a Hall effect sensor that counts revolutions of the leadscrew 790. In order to stabilize the arm 724 during use, the extendable portion 724b may be generally U-shaped (albeit with a very shallow U in the embodiment shown in FIG. 13b). To further stabilize the arm 724, a clamping mechanism (not shown) may be provided which removes any play that exists between the extendable portion 724b and the central portion 724a. It will be noted that any of the tensioners shown and described may include a damping member as is known in the art to dampen oscillations of the tensioner arm. The damping force from the damping member is preferably proportional to the torque applied.

Figure 14A:
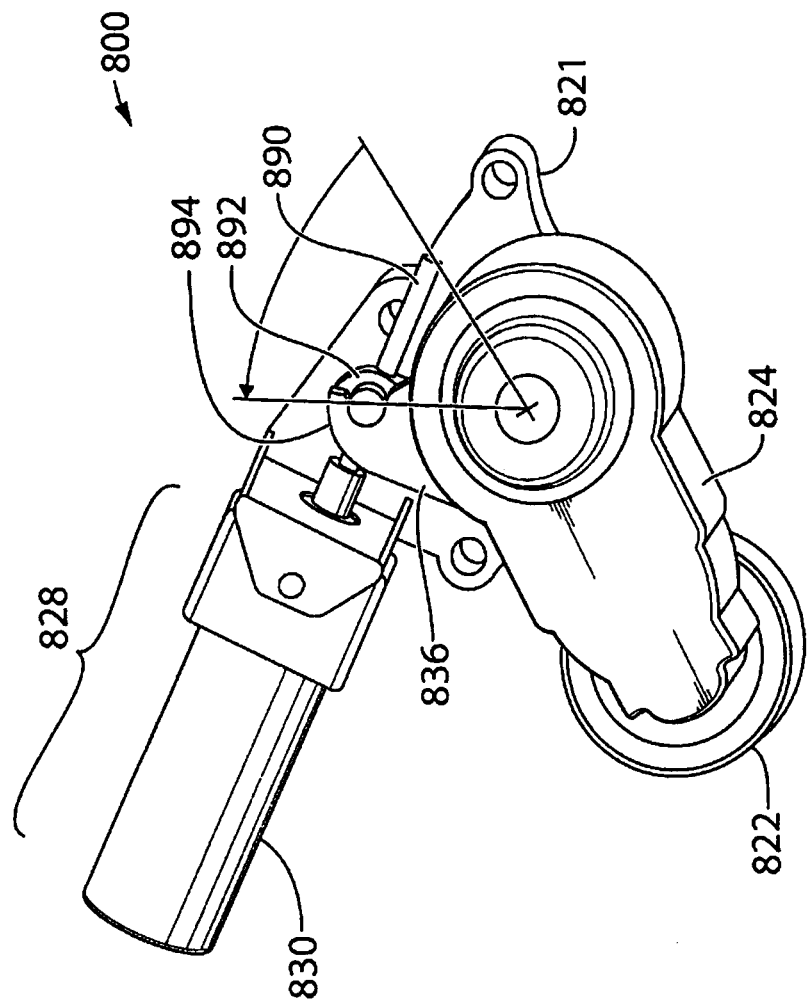
FIG. 14*a* is a perspective view of another tensioner in accordance with yet another embodiment of the present invention.
Figure 14B:
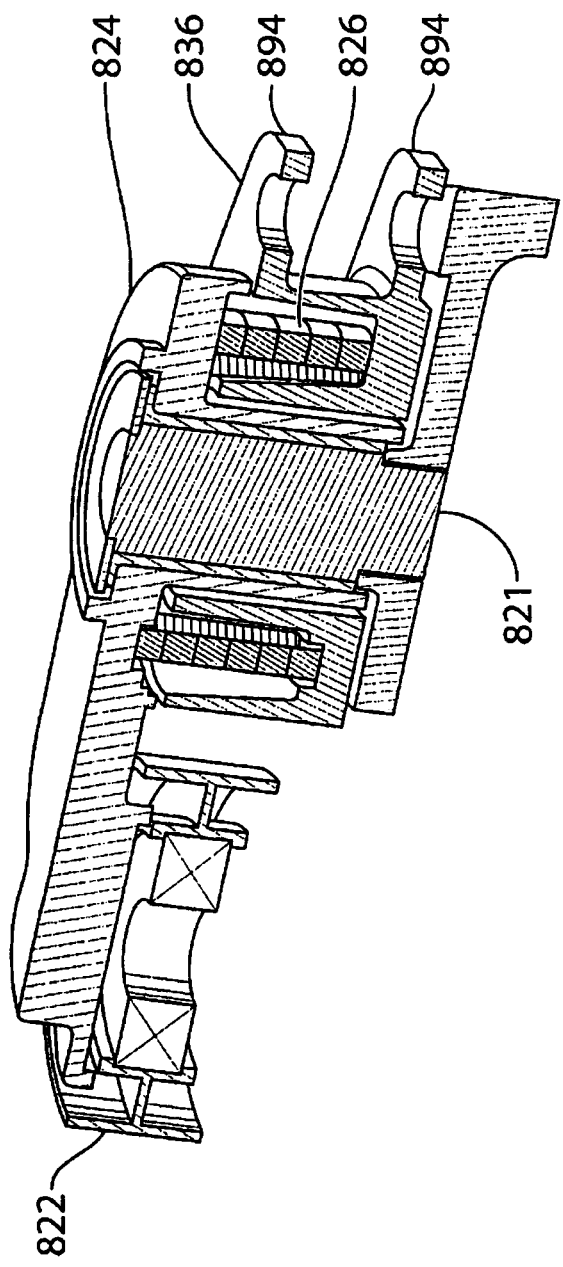
FIG. 14*b* is a sectional perspective view of the tensioner shown in FIG. 14*a*.
Figure 15:
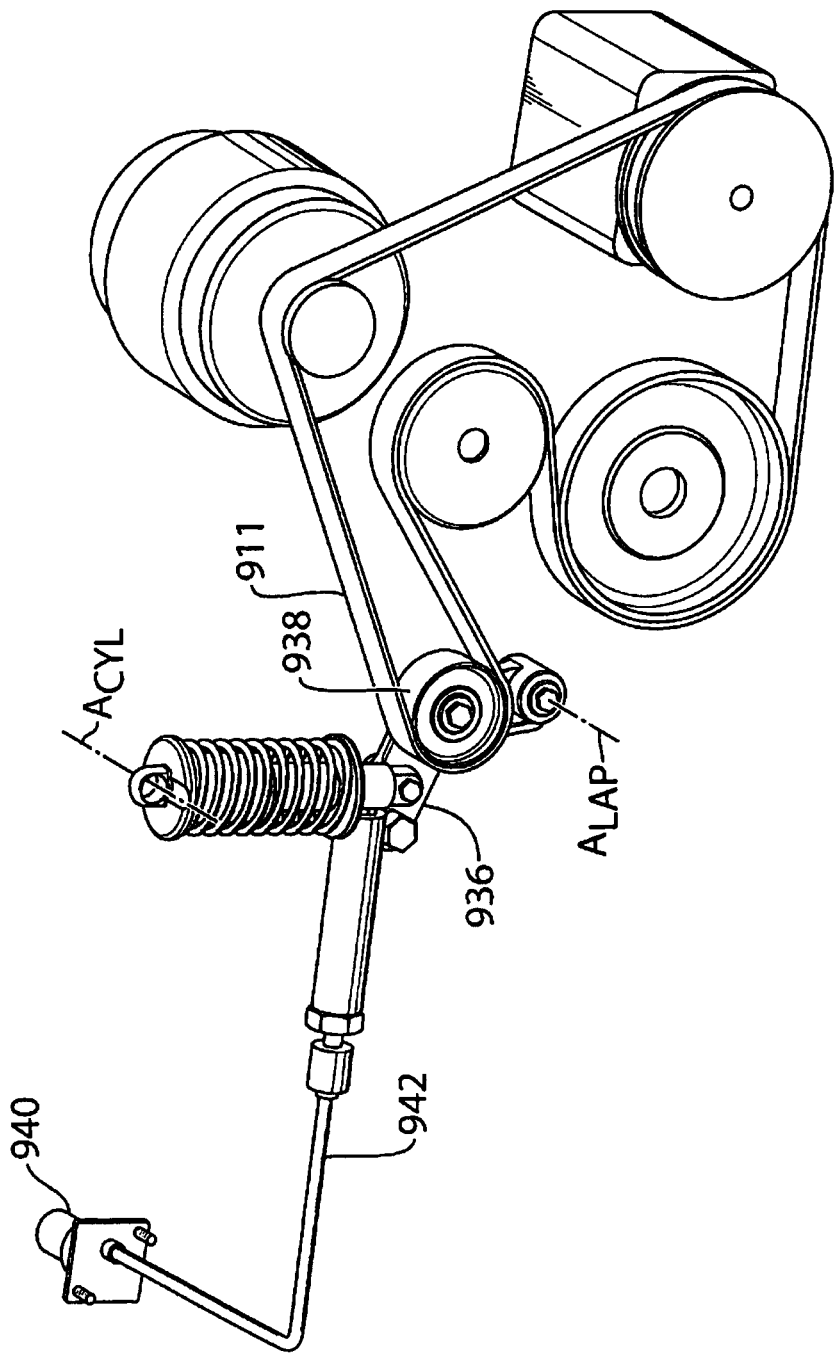
FIG. 15 is a perspective view of a belt drive with another tensioner in accordance with another embodiment of the present invention.
Figure 16:
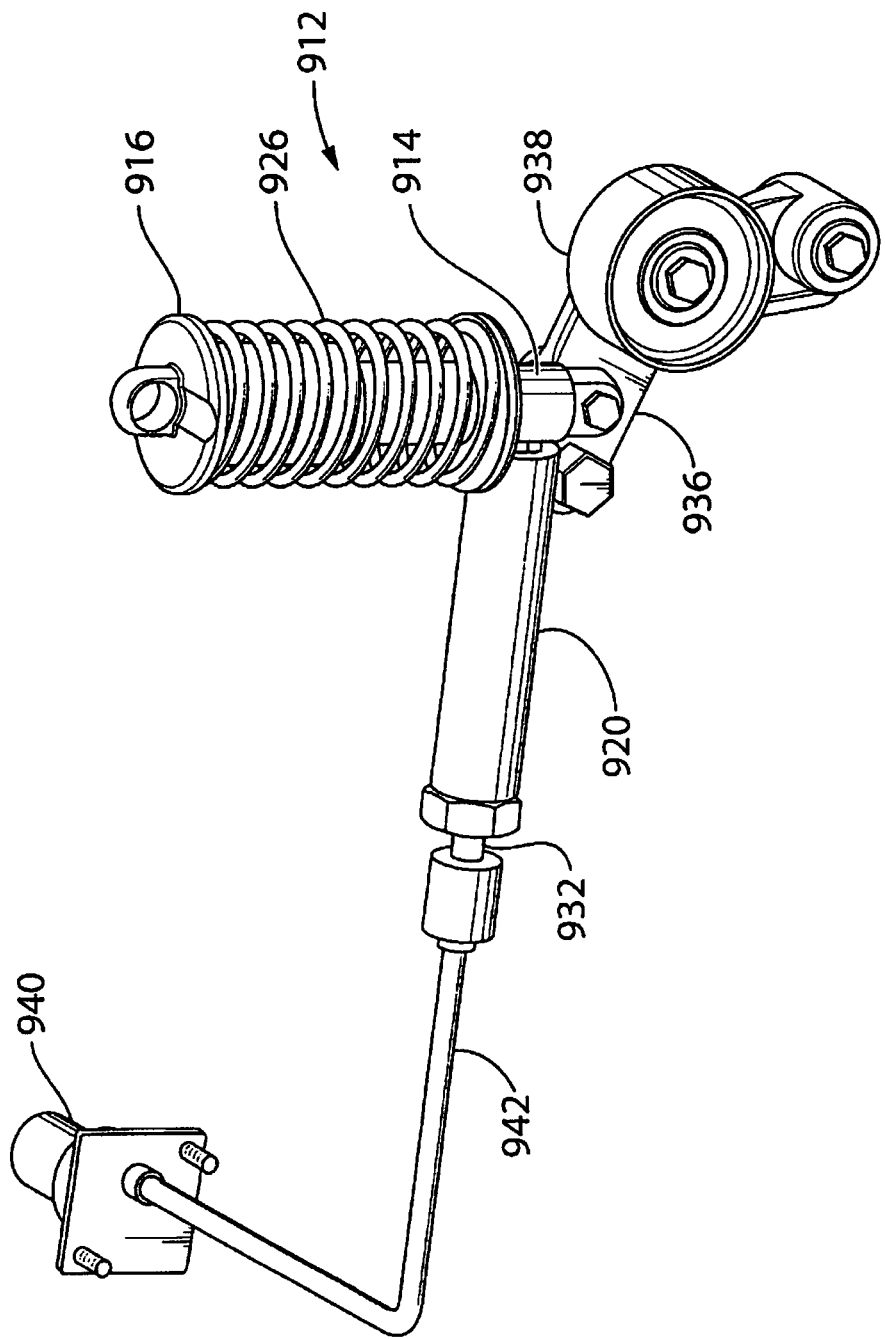
FIG. 16 is a perspective view of the tensioner shown in FIG. 15.
Figure 17:
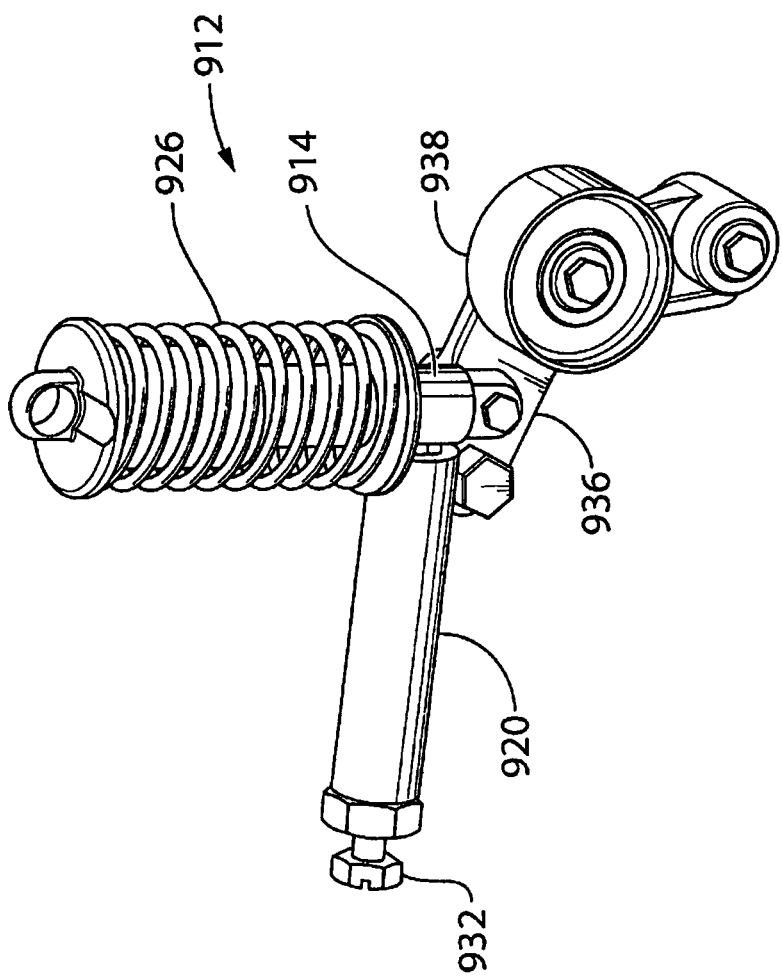
FIG. 17 is a perspective view of a portion of the tensioner shown in FIG. 15.
Figure 18:
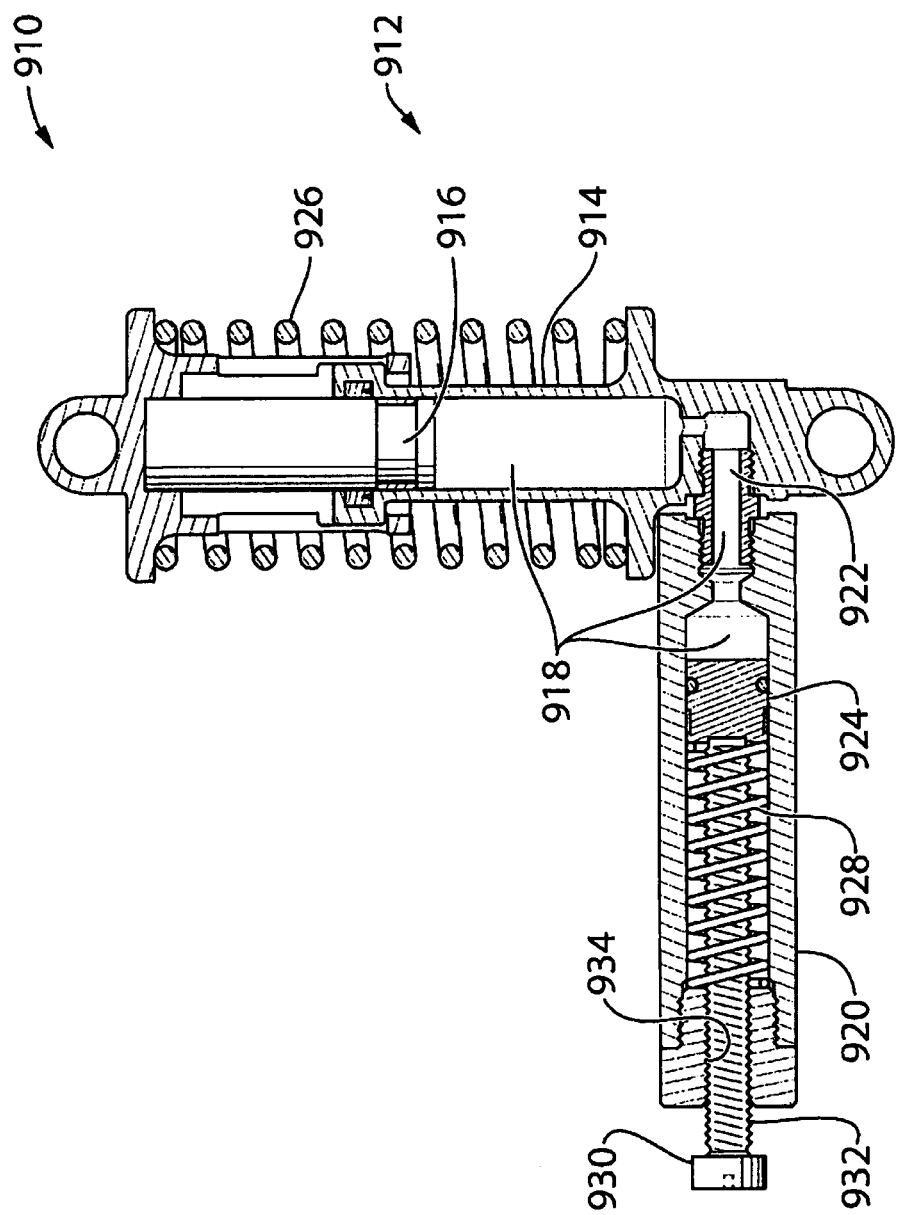
FIGS. 18 and 19 are sectional side views of the portion of the tensioner shown in FIG. 17, locked in a first position.
Figure 19:
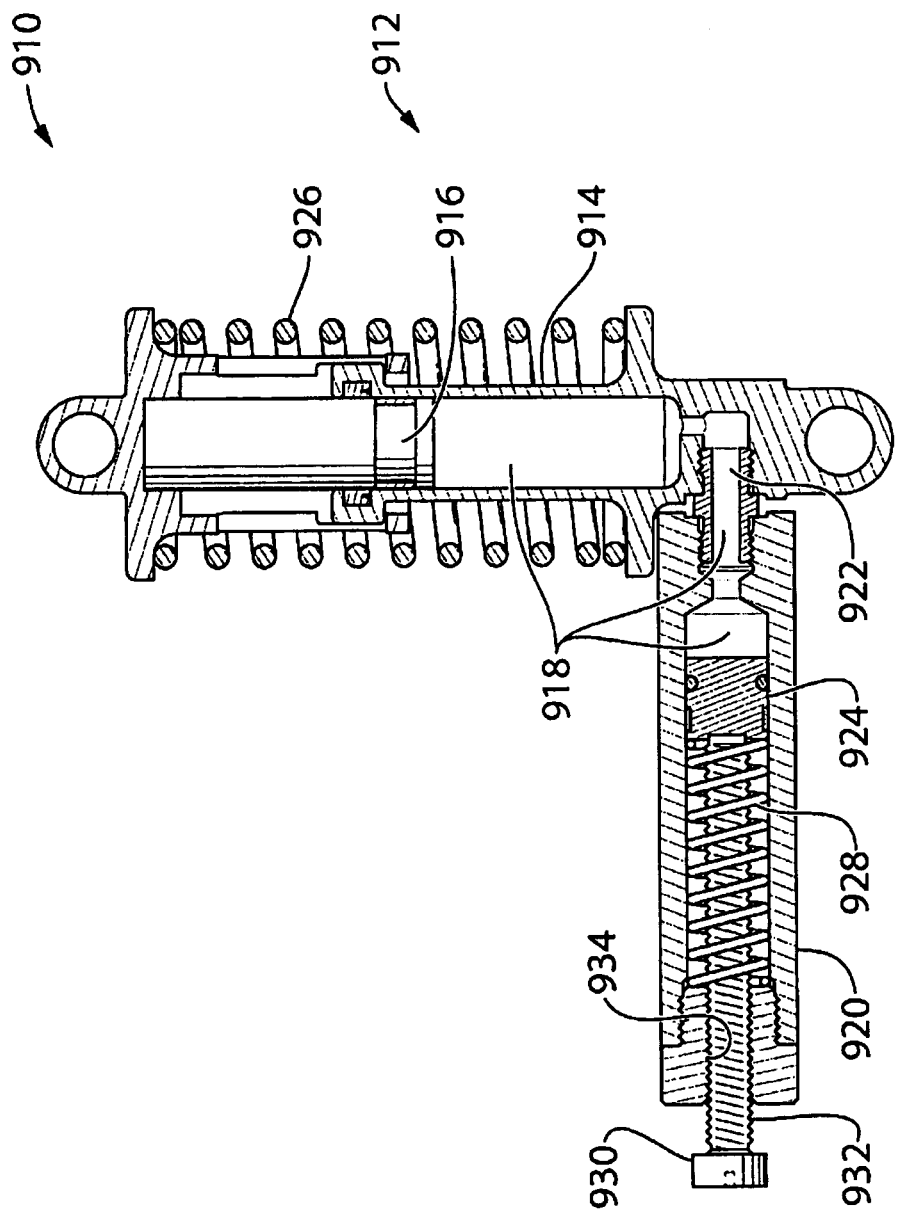
Figure 20:
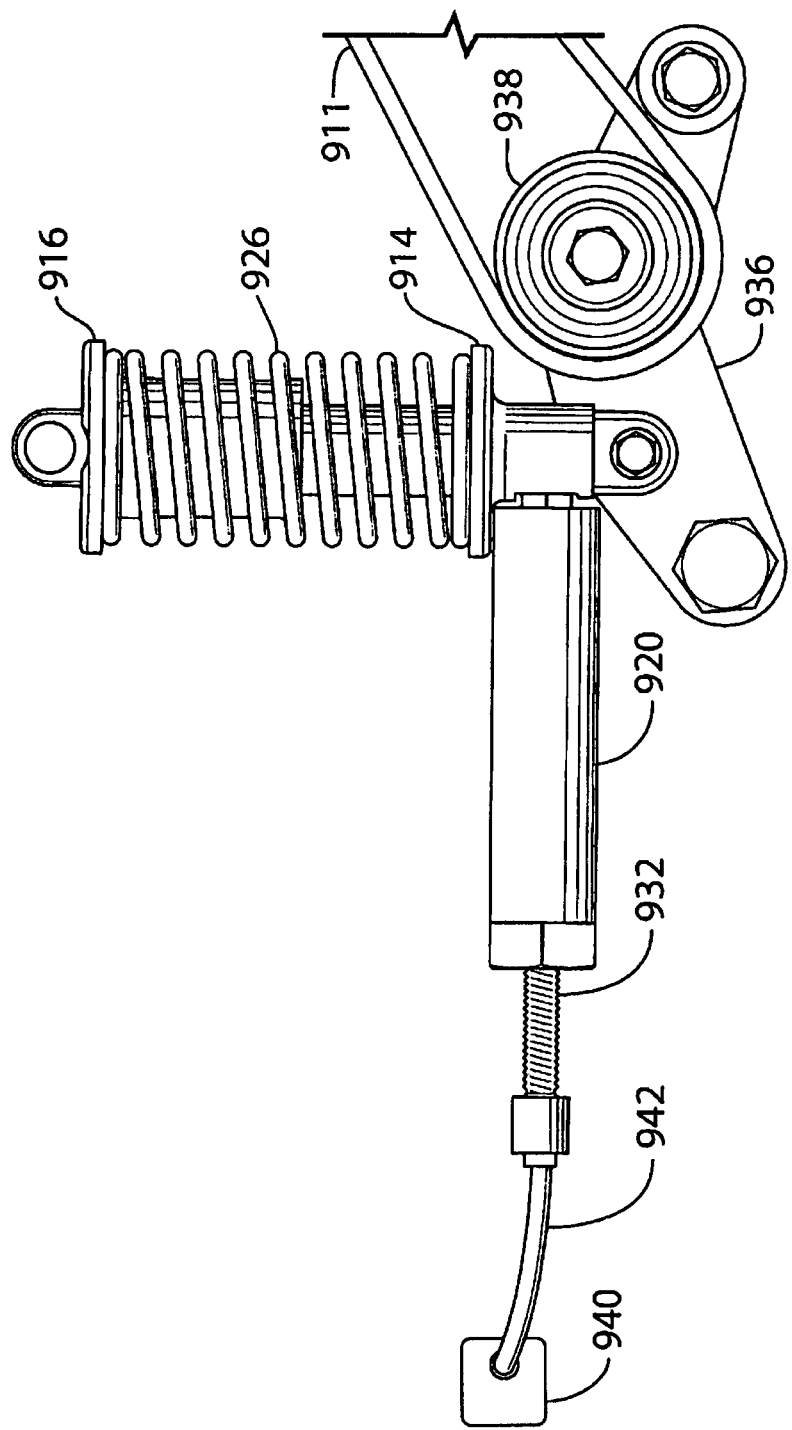
FIG. 20 is a side view of the tensioner shown in FIG. 15 in the first position.
Figure 21:
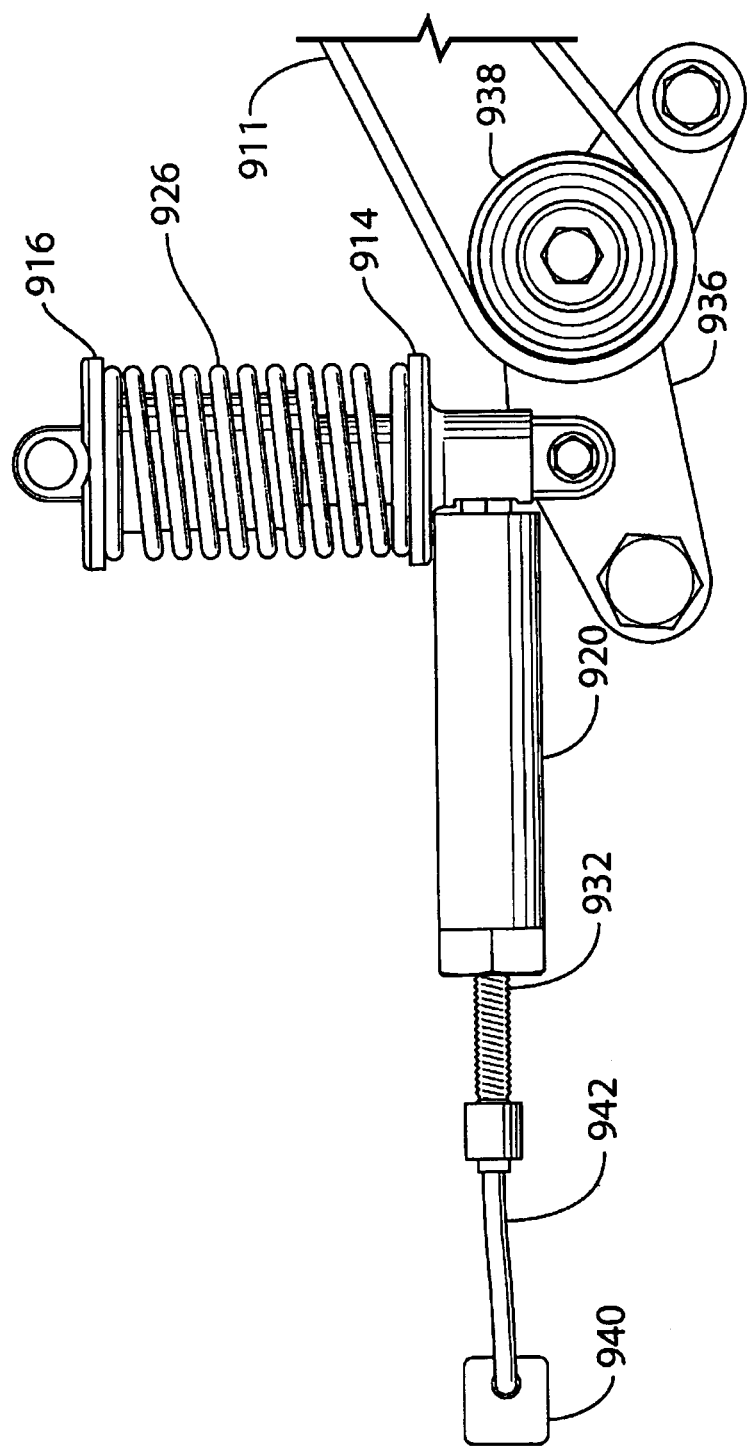
FIG. 21 is a side view of the tensioner shown in FIG. 15 in a second position.
Figure 22:
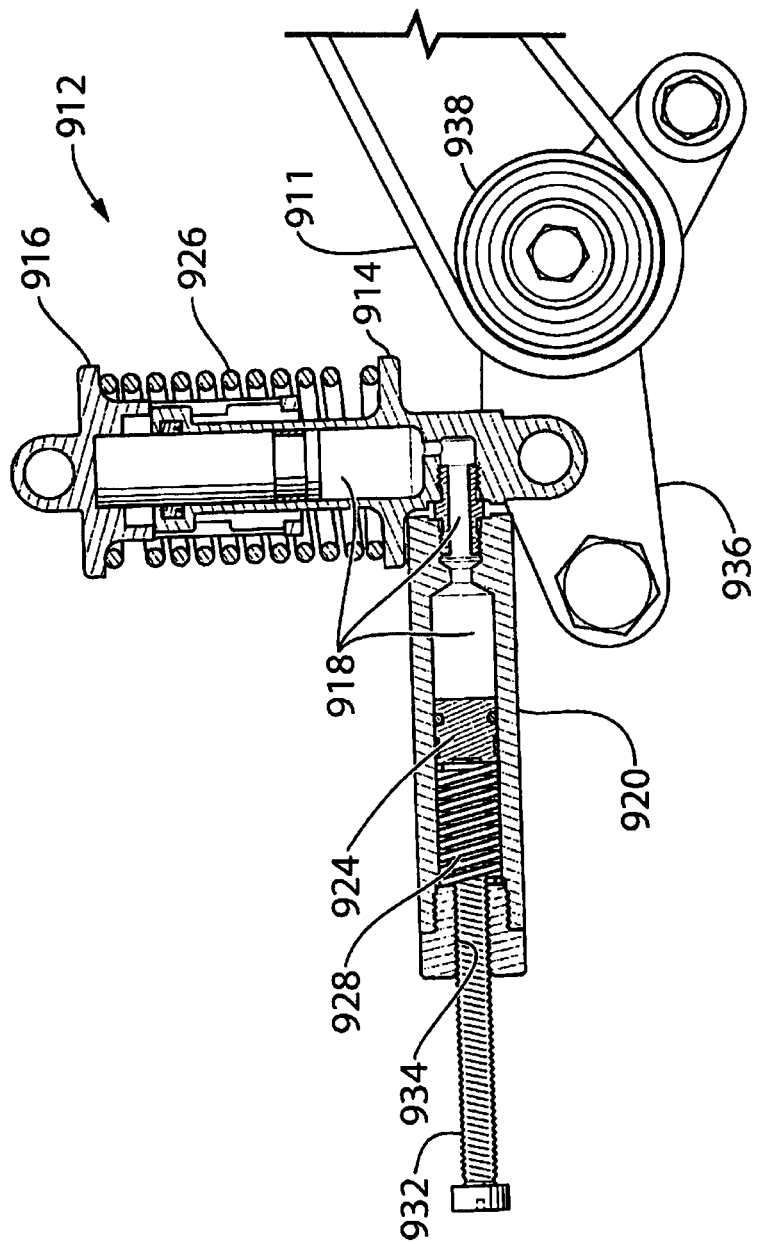
FIG. 22 is a sectional side view of the portion of the tensioner shown in FIG. 17 in the second position but not locked.
Figure 23:
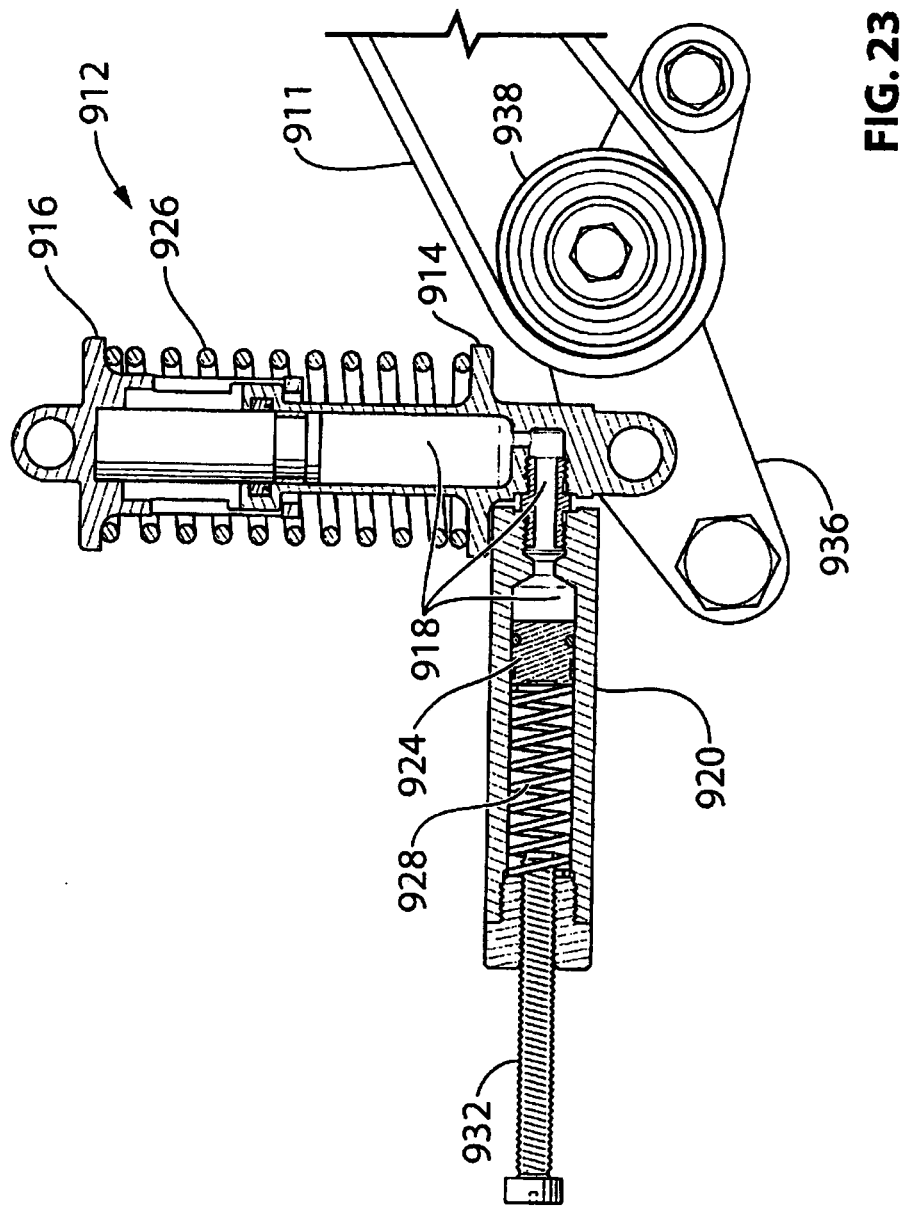
FIG. 23 is a sectional side view of the portion of the tensioner shown in FIG. 17 in the first position but not locked.
Figure 24:
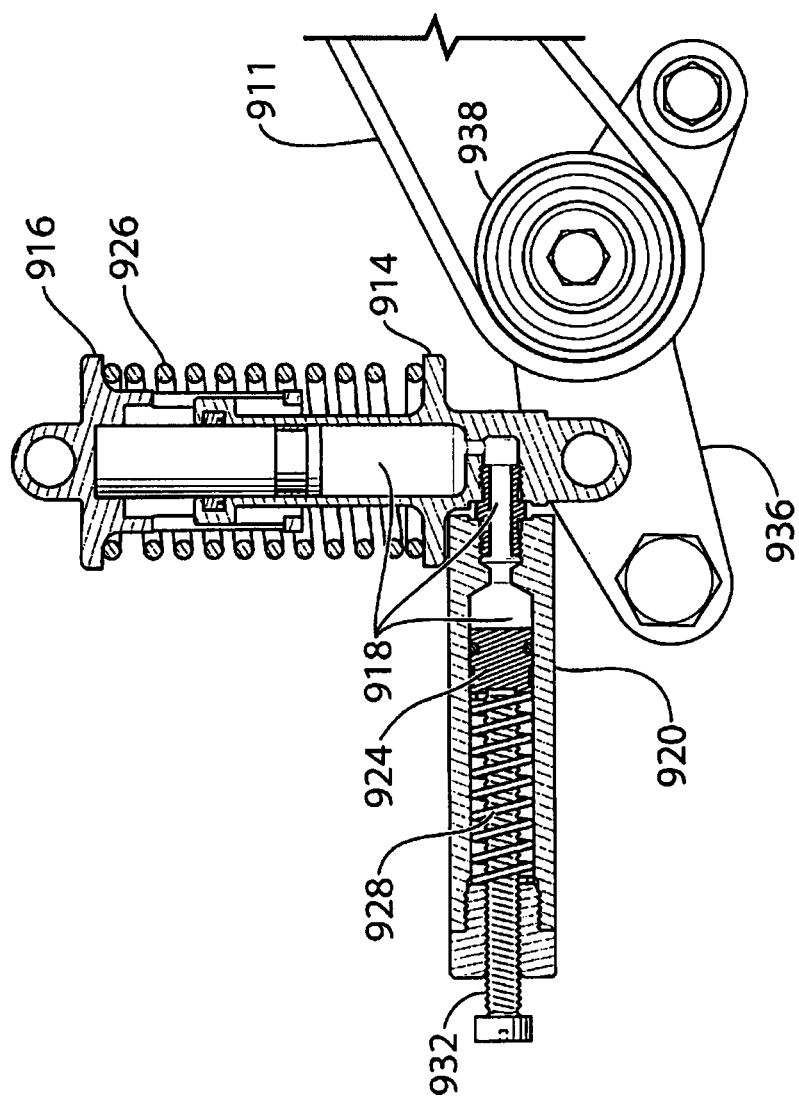
FIG. 24 is a sectional side view of the portion of the tensioner shown in FIG. 17 locked in the first position.

Reference is made to FIGS. 14a and 14b, which shows a tensioner 800 in accordance with another embodiment of the present invention. The tensioner 800 may be similar to the tensioner 200 except that the tensioner 800 includes an actuator 828 that includes a motor 830 that turns a lead screw 890 which has a traveler 892 thereon. The traveler 892 engages projections 894 on the spindle, shown at 836. The spindle 836 engages the first end 848 of the biasing member 826 so as to control the biasing force of the biasing member 826 on the tensioner arm shown at 824. The tensioner 800 further includes a hub 821 that mounts to the engine. A pulley 822 is mounted for rotation on the tensioner arm 824.

Referring to FIGS. 15-28, a tensioner 910 for an endless drive member 911 includes a cylinder 912 which includes a first housing 914 and a first piston 916. The main cylinder 912 at least partially defines a fluid chamber 918. The first piston 916 defines a first end of the fluid chamber 918. In the embodiment shown, a second housing 920 (which may be referred to as a reservoir) is provided that is connected to the first housing 914 via a fluid passageway 922 having a selected resistance to fluid flow. The second housing 920 defines part of the fluid chamber 918. A second piston 924 is movable in the second housing 920 and defines a second end of the fluid chamber 918. The fluid in the fluid chamber 918 (during use) is preferably a substantially incompressible fluid such as hydraulic oil. A first piston biasing member 926 is positioned to bias the first piston 916 towards the extended position (FIG. 6). A second piston biasing member 928 such as a spring is optionally provided, to assist in urging the second piston 924 into engagement with the fluid in the fluid chamber 918, even though this could be accomplished with a gas in the second housing 920 instead of the spring. A second piston position control device 930 is provided to control the position of the second piston. The control device 930 may include a threaded rod 932 that engages a threaded portion 934 at the end of the second housing 920. The threaded rod 932 may be rotated in one direction to drive it in towards the second piston 924 or in another direction to drive it away from the second piston 924. The threaded rod 932 may be used to set a limit position for the second piston 924. This limit position may be chosen so that the second piston 924 can be pushed by the fluid in the fluid chamber 918 by some selected amount. Alternatively, the threaded rod 932 could be brought right up into abutment with the second piston 924 (FIG. 4) so as to prevent the fluid from pushing the second piston 924 at all. Alternatively, the threaded rod 932 could be rotated to drive the second piston 924 forward by some selected amount, thereby forcing the first piston 916 towards the extended position.

The first piston 916 is pivotally mounted at an external end to a base structure such as the engine block (not shown) about a cylinder pivot axis ACYL. The external end of the housing 914 is pivotally connected to a lever arm 936 about a lever arm engagement axis ALAE. The lever arm 936 is pivotally connected to the base structure (e.g. the engine block) about a lever arm pivot axis ALAP. A pulley 938 is rotatably mounted to the lever arm 936. The pulley is engaged with the endless drive member 911 to tension the endless drive member 911. In an alternative embodiment, it is possible for the pulley 938 to be directly mounted to the external end of the housing 914 and to omit the lever arm 936. In such an embodiment, the movement of the housing 914 would be constrained in some way, such as by guides that force it to travel linearly.

The threaded rod 932 may be driven to rotate by a motor shown at 940 optionally via a flexible shaft shown at 942. The motor 940 may be fixedly mounted (e.g. to a base structure that is spaced from the engine block) and the flexible shaft 942 may permit operative connection of the motor 940 to the threaded rod 932 even though the threaded rod 932 moves during operation of the tensioner 910. By mounting the motor remotely from the engine block it may be possible to keep the motor 940 at a lower temperature than one that is mounted to or proximate to the engine block. This would permit a less expensive motor to be used. Alternatively as shown in FIG. 14, the motor 940 may be mounted to the second housing 920, in which case a shaft that is flexible is not necessary.

If a gearbox is provided to reduce the speed and increase the effective torque provided by the motor, it is preferable that the gearbox be provided at the outlet end of the flexible shaft (i.e. between the flexible shaft 942 and the threaded rod 932), as opposed to providing the gearbox between the motor and the flexible shaft 942. As a result, the flexible shaft is not relied upon to transmit high torque, which can result in its premature wear and/or windup in the flexible shaft.

Where the motor 940 is positioned remotely from the second housing 920, the motor 940 may be positioned in a particularly cool part of the engine bay, such as near the grill or at some other cool air inlet.

The operation of the motor 940 may be controlled by any suitable control system. A generic control system is shown at 43 in FIG. 15. The control system 943 may be made up of one or more individual components (e.g. one or more controllers). The control system 943 may include the main ECU of the vehicle, or it may be separate from the main ECU of the vehicle. In an embodiment, the control system 943 may be a separate controller that communicates with the ECU of the vehicle via a wiring harness or via a CAN bus. A number of suitable types of relationship may exist between the ECU and any other controllers that together form the control system 943. For example, the ECU may sometimes or may all the time be a master to the other controllers in the control system 943.

The control system 943 may set the position of the threaded rod 932 using the motor 940 based on any suitable set of parameters. The control system 943 may, for example, drive the threaded rod 932 inwards to move the second piston 924 so as to move the first piston 916 to provide a selected high tension in the belt 911 in some situations where the control system 943 determines that the belt 911 is determined to be at risk of slippage or if slippage has been detected. An example of such a situation is upon startup of the vehicle, particularly on a cold day. Another example of such a situation is upon startup during a BAS (Belt Alternator Starter) belt starting sequence, where high belt tension is required only during the initial motor/alternator belt starting sequence, to spin the engine crankshaft by the belt. Another example of such a situation is during moments where there is high engine acceleration or deceleration.

The control system 943 may also drive the threaded rod 932 outwards to a position where it permits the second piston 924 to travel freely in the second housing 920 where, for example, a lower tension is acceptable for the belt 911 without risk of belt slippage. In some situations, the control system 943 may drive the belt inwards so as to simply abut the second piston 924 so as to prevent the second piston from permitting compression of the cylinder 912. This can be used during periods of belt flutter or belt resonance, during periods of high belt drive rotation torsional acceleration (engine torsionals), or, for example, during situations where a system disturbance (e.g. belt flutter) is anticipated based on inputs from one or more sensors, in order to prevent tension loss/reduction due to the tensioner being forced back out of the belt during such periods of instability.

The control of the motor 940 by the control system 943 may be open-loop or may be closed loop whereby the control system 943 receives inputs from one or more sensors that indicate whether the position of the threaded rod 932 is as intended. Additionally the control system 943 may receive inputs from one or more other sensors which it uses to determine where to position the threaded rod 932. Such sensors may include, for example, temperature sensor, a rain sensor, a sensor related to belt slip, and the like. Suitable algorithms for the control system 943 are described in copending application 61/486,189, the contents of which are incorporated herein by reference.

The L-shaped configuration between the cylinder 912 and the second housing 920 facilitates rapid tuning using take apart components which can be switched out as required. However, an in-line configuration may alternatively be provided. Furthermore, a monotube configuration may be provided in which the entire fluid chamber and both the first and second pistons are contained in a single cylinder housing. In a monotube configuration, the connector at the external end of the housing could be shifted to the side so as to make room for the threaded rod to enter into the housing through the end of the housing.

In an alternative embodiment, the piston 916 and housing 914 could be reversed, whereby the piston 916 is connected to the lever arm 936 and the housing 914 is pivotally connected to the engine block.

In one aspect, the novel concept here is to block the return of the second piston to induce hydraulic lockout (piston lockout) thereby preventing, on demand, any retraction of the first piston 916 (i.e. compression of the cylinder 912) in response to a specific FEAD belt drive system requirement.

In another aspect, the novel concept here is to drive the small reservoir position in power mode, to extend (or retract) the strut to amplify the force by driving the first piston which may be larger than the second piston.

Different travel rates and load outputs can be achieved by manipulating the piston diameter ratios between the diameter of the first piston 916 and the diameter of the second piston 924.

In some embodiments the connection between the first housing 914 and the second housing 920 could be separated by a flexible hose—a stiff flex steel braided hose, for example, would probably be employed in such a case so as to minimize unwanted expansion of the hose under pressure, resulting in unwanted diametral elastic growth of the hose/tubing, which would ultimately result in adding an unwanted lag, or delayed response, to the final spring rate. Unwanted elasticity on the high pressure oil side is preferably eliminated in order to prevent force response lags, hence the use of non-elastic hoses where practical.

In the exemplary embodiment presented in the illustrations, the majority of damping comes from the seals and damping rings installed within the first piston 916, as well as whatever damping comes from the flow of fluid.

Extra damping can be added to the tensioner by introducing such devices as a small orifice restriction and a blow off ball valve in the oil flow between the two housings, to induce restrictive orifice damping and steady blow off damping.

In HYDRAULIC LOCKOUT MODE, the rod 932 merely stops the backward motion of the floating reservoir piston, which ultimately hydraulically locks the larger piston 916 and prevents further insertion of the piston rod into the cylinder housing 914, effectively locking the tensioner arm 936.

In POWERED DRIVE MODE, the rod 932 is used to push the smaller floating piston 924, in order to force the larger tensioner cylinder piston 916 to move in response to the flow of oil from the reservoir 20. The technique, for example, may be used to push the pulley 938 harder into the belt under conditions where belt slip would otherwise be imminent, such as during a BAS start (in hybrid vehicles), or during wet or extremely cold conditions.

The rod 932 used to lock out or drive the reservoir piston 924 can be driven via a fine lead screw arrangement, as depicted in the figures, or it could be driven linearly (as opposed to the rotational actuation required by a lead screw arrangement) by a powerful linear solenoid—any actuator device which is capable of blocking movement of the smaller reservoir piston 924 or of driving the reservoir piston 924 (in powered drive mode described below) could be employed. The solenoid may actuate the rod 932 linearly via a flexible cable (e.g. a Bowden cable). This would permit the solenoid to be mounted remotely in a cooler spot in the engine bay, (e.g. near the grill) in similar manner to the remote mounting of the motor 940, described above. An example of a suitable solenoid with a flexible cable arrangement that may be used in some embodiments is provided by Trombetta, which is owned by Fulham & Company, and is located at Menomonee Falls, Wis., USA.

It will be understood that, under typical conditions where temperature is not an issue, it is preferred to mount the motor 940 or solenoid in substantially direct engagement with the rod 932 (as opposed to a remote mounting with a flexible shaft or push/pull cable between them) so as to reduce the number of components between the motor 940 or solenoid and the rod 932, so as to increase the torque transfer efficiency between the motor 940 or solenoid and rod 932. However, in a situation where the temperature in the immediate environment of the load will be high and the motor is in that environment, the operating efficiency of the motor decreases, sometimes significantly. This is due to several factors, including the fact that the resistance of the copper wire in the motor increases with temperature. Thus at 60 degrees Celsius or at 80 degrees Celsius, the wire has a higher resistance than it does at 25 degrees Celsius. As a result, the torque capability of the motor is reduced at high temperature. To compensate for this the motor may have to be upsized significantly in order to be assured of being able to handle a given torque requirement.

The threaded rod 932 is in a hot environment due to its proximity to the engine. By mounting the actuator (e.g. the motor 940 or the solenoid) remotely from the rod 932, the actuator can be placed in a cooler environment where its operating efficiency is not degraded, or not degraded as much as it would be in the hotter environment. For example, the actuator may be placed near the grille of the vehicle where it is exposed to a strong airflow for cooling purposes.

Also a remote mounting of the actuator can be advantageous if there are space and size limitations proximate to where the rest of the tensioner 910 is mounted.

Instead of using a solenoid, a vacuum actuator can be used in some embodiments to drive the rod 932 linearly. The vacuum actuator may draw power from the vacuum drawn from the air induction system. Vacuum drawn from the air induction system has been used in the past for other purposed such as to drive turbo waste gate motors and manifold induction duct actuator motors, for example.

In some embodiments a pneumatic actuator may be used to drive the rod 932 if a compressed air supply is available onboard the vehicle. Alternatively, a hydraulic actuator could be used, drawing power from a source of hydraulic fluid, such as the power steering system in vehicles that use a hydraulic power steering system, or, for example from the engine oil system. A compressed air supply, a hydraulic power supply, or a vacuum source are sometimes available on certain vehicles such as trucks and SUVs.

A vacuum actuator, a pneumatic actuator, or a hydraulic actuator may be switched via a relatively inexpensive solenoid powered valve, and could be controlled electronically, via either an analog or digital signal, from the control system 943.

An example of a suitable actuator may be a door lock actuator, similar to (but perhaps scaled up in power and resistance to high temperature) those described in U.S. Pat. No. 6,067,826, U.S. Pat. No. 5,983,739, U.S. Pat. No. 5,634,676 the contents of all of which are incorporated herein by reference. Such an actuator could be used successfully in some embodiments by incorporating a gearbox with worm drive and a high gear ratio. Backdriving of such an arrangement can be prevented by the worm drive (in embodiments wherein it is provided) and/or by providing some other structure such as one or more detent lock features, with a spring loaded lock and load feature as described in U.S. Pat. No. 5,983,739, the contents of which are hereby incorporated by reference.

While a push-pull cable has been described as being usable in certain embodiments, other arrangements may be used, in addition to or instead of a push-pull cable. For example a linkage may be used such as the linkage shown in U.S. Pat. No. 5,634,676 the contents of which are hereby incorporated by reference, optionally with a push-pull cable. Using some linkages linear motion could be converted to rotary motion, or vice-versa. Such linkages may be used to alter the mechanical advantage by increasing force by reducing displacement, or by decreasing force by increasing displacement, depending on the embodiment.

Figure 27:
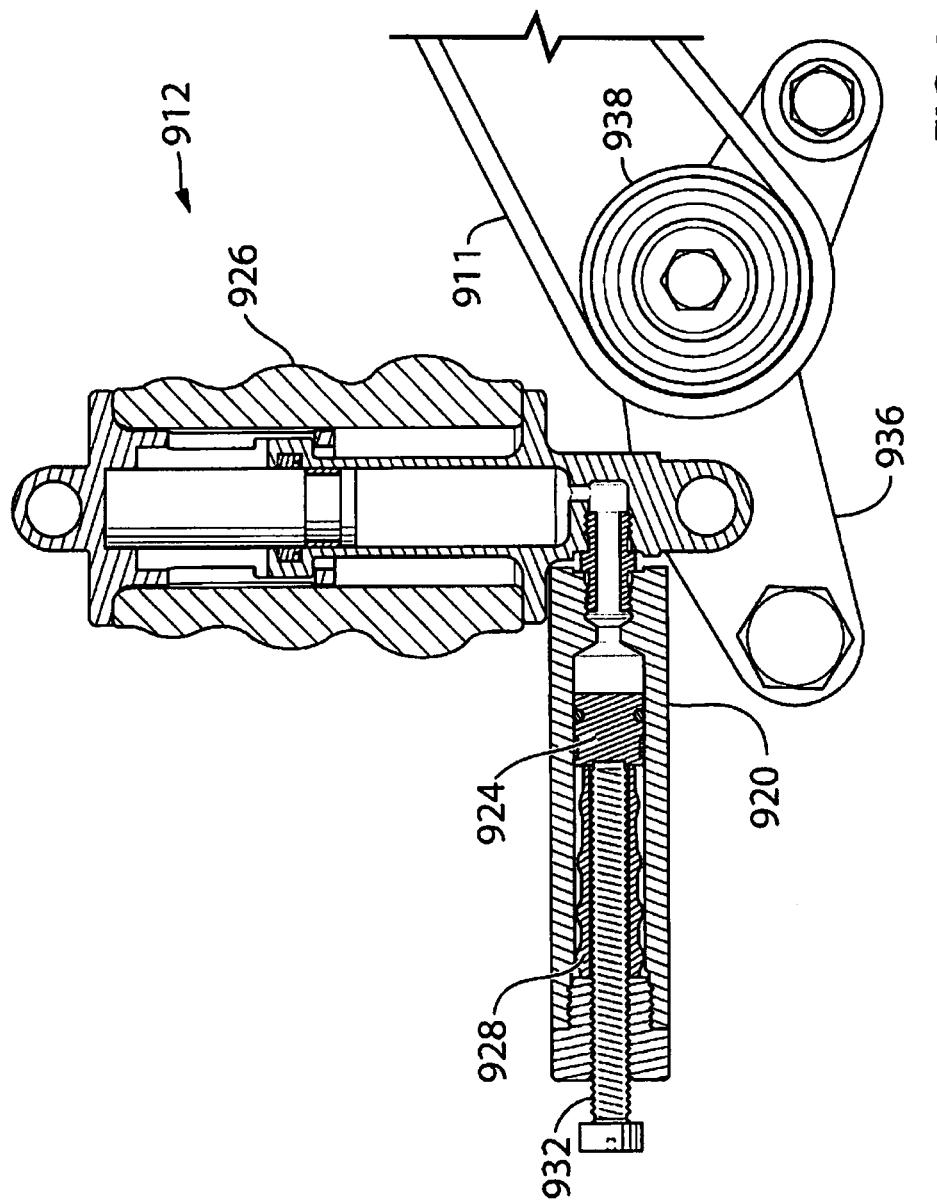
FIG. 27 is a sectional side view of another variant of the portion of the tensioner shown in FIG. 17.
Figure 28:
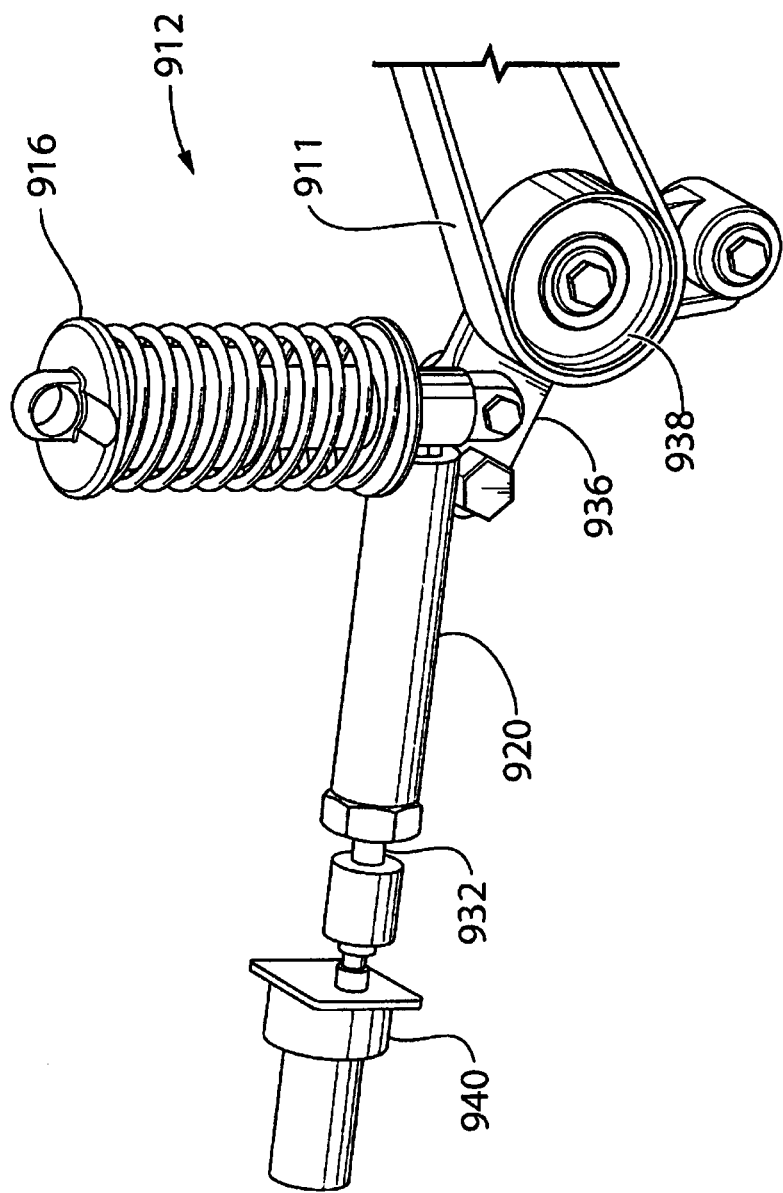
FIG. 28 is a perspective view of another variant of the portion of the tensioner shown in FIG. 17.

The first piston biasing member 926 may be a coil spring, as shown in the figures, or it may be some other type of spring such as a closed cell foam (CCF) spring as shown in FIG. 27. It could alternatively incorporate both a coil spring and a closed cell foam spring. An example of such a spring is supplied by BASF. An advantage to CCF springs is that they can collapse to only 20% of their original height (vs 40% for some steel coil springs). Another advantage to CCF springs is that it is easy to manufacture them with a desired constant spring rate or a spring rate that varies with the amount of compression of the CCF spring. This may be achieved by co-molding portions (e.g. layers) of the CCF spring, each having different properties. Properties that may be varied include density of the CCF, the cell size, the outer diameter and inner diameter of the CCF spring (in embodiments wherein they are hollow-cylindrical. Additionally you can easily tune their design to provide a selected amount of energy dissipation. The shorter collapsed length of the CCF spring could be used to provide a larger linear travel of the cylinder 912 for a given overall length of the cylinder 912. As another alternative, the first piston biasing member may include some other type of biasing member such as, for example, one or more Belleville washers, one or more wave washers, gas pressure, or a combination of two or more of these. All of these alternatives may also be used as the second piston biasing member 928 instead of or in addition to a coil spring.

In an example, the CCF spring may be used just as an end-of-travel jounce stop, to impart an elastically damped, super high spring rate at the end of travel of a normal coil spring design. In another example, the CCF spring may be molded around metal coil springs or washer springs to impart new spring and new jounce stop properties to the overall spring assembly.

Figure 25:
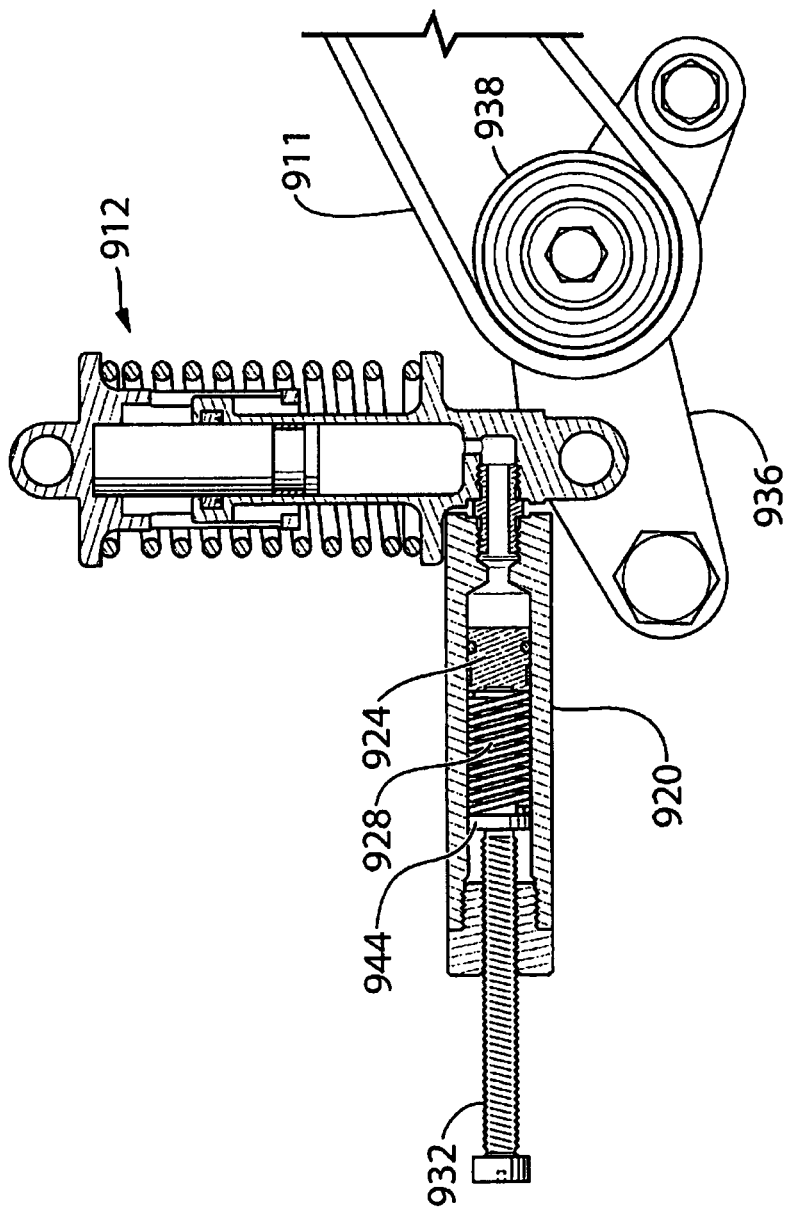
FIG. 25 is a sectional side view of a variant of the portion of the tensioner shown in FIG. 17.

In an alternative embodiment shown in FIG. 25, the second piston biasing member 928 may be positioned between the second piston 924 and a limit member 944 that is in the second housing 920. The threaded rod 932 engages the limit member 944. This structure is particularly advantageous when using the threaded rod 932 to set a limit for the amount of retraction that is possible for the first piston 916 in the first housing 914. With this structure, as the threaded rod 932 is advanced into the second housing 920, it advances the limit member 944 towards the second piston 924. This in turn causes the second piston biasing member 928 to compress, increasing its resistance to further compression. As a result, when the second piston 924 is moved to abut the limit member 944 because of an increase in tension in the belt 911, the increased resistance offered by the biasing member 928 helps to reduce the abruptness of the engagement between the limit member 944 and the second piston 924.

Figure 26:
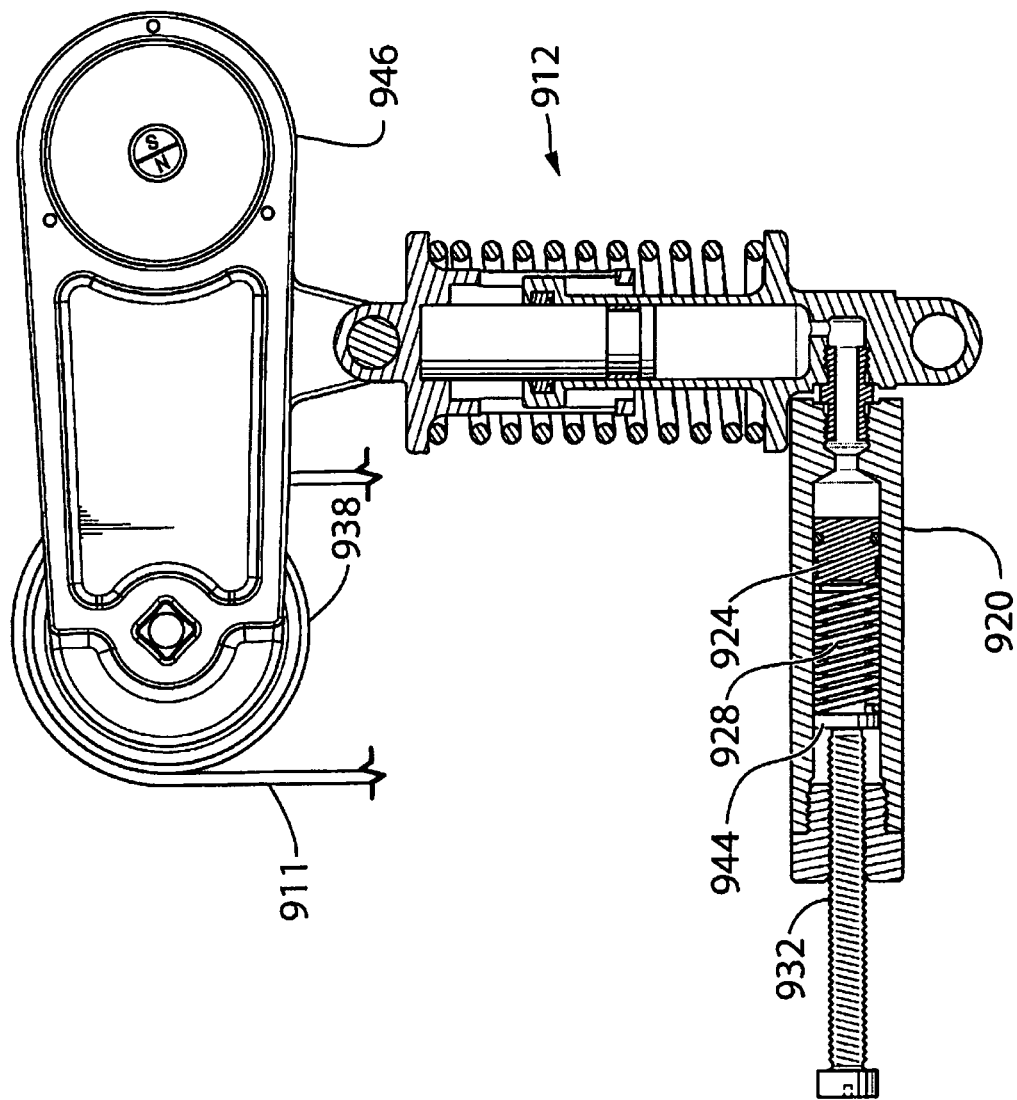
FIG. 26 is a sectional side view of another variant of the portion of the tensioner shown in FIG. 17.

Reference is made to FIG. 26, which shows another embodiment of the present invention. In this embodiment, the tensioner includes a hub 946 that is mountable to a base structure such as the engine block (not shown). A tensioner arm 948 is pivotable about the hub 946. The pulley 938 is positioned at the end of the arm 948. A tensioning spring (not shown) and a damping element (not shown) are positioned about the hub 946, as they are in a typical tensioner. The cylinder 912 is mounted in such a way that one end (in this case the external end of the housing 914) is pivotally mounted to a base structure, and the other end (in this case the external end of the piston 916) is pivotally mounted to the tensioner arm 948. The second housing 920 is provided, with the second piston 924 therein. In this embodiment, the threaded rod 932 is engageable with the second piston 924 only through the limit member 944 and the second biasing member 928, however it is alternatively possible to omit the limit member 944 and to provide an arrangement similar to that shown in FIG. 24, wherein the threaded rod 932 directly engageable with the second piston 924. The tensioner shown in FIG. 26 may act substantially like a typical tensioner. However, the additional structure including the cylinder 912 and related components, permits the tensioner arm 948 to be locked hydraulically as described above (ie. by engagement of the threaded rod 932 or limit member 944 so as to prevent complete compression of the cylinder 912), and to be driven to a different (higher tension) position via the threaded rod 932 and a suitable actuator (eg. motor 940 and flexible shaft 942).

Figure 29A:
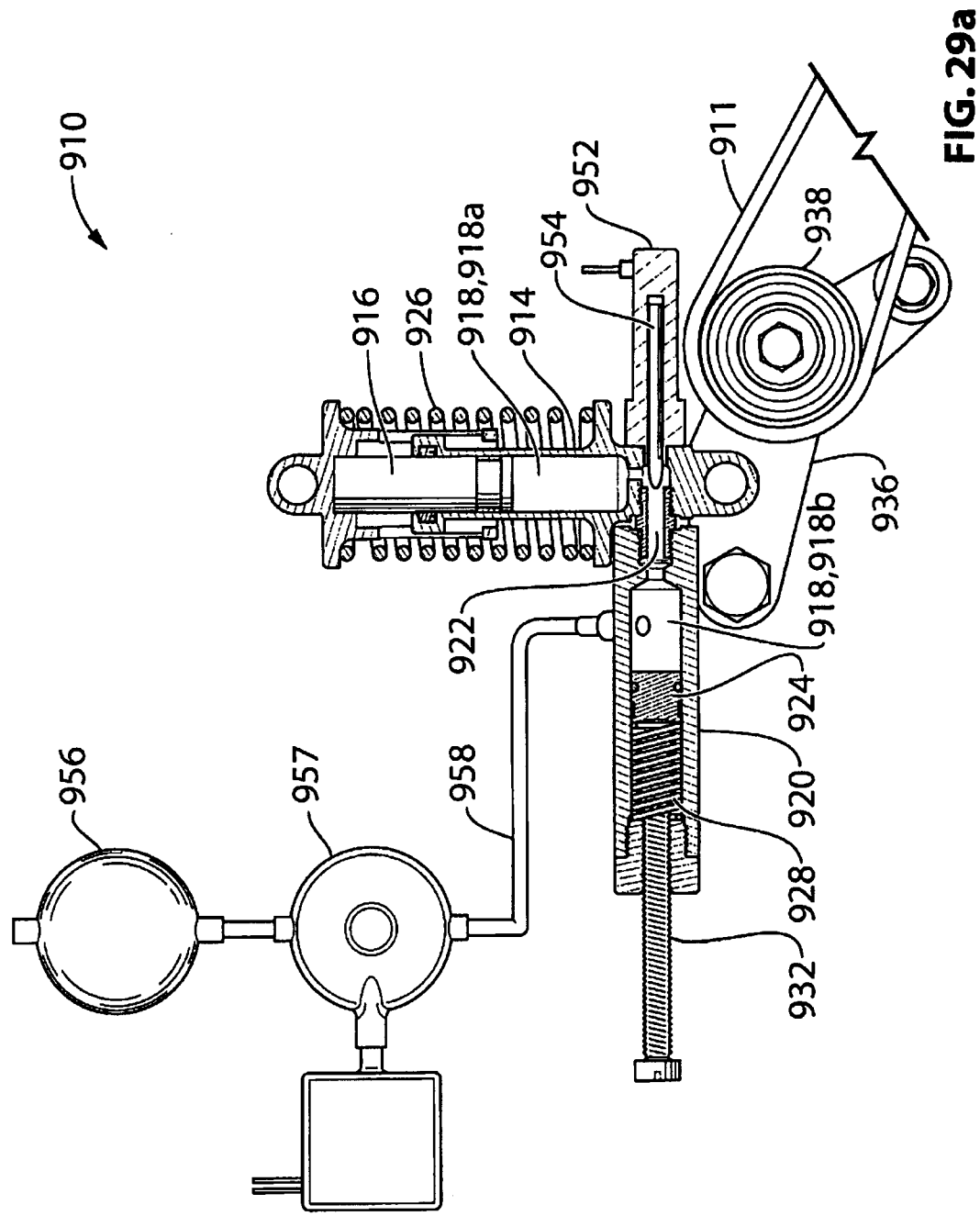
FIG. 29*a* is a sectional side view of another variant of the portion of the tensioner shown in FIG. 17 with a needle valve in a first position.
Figure 29B:
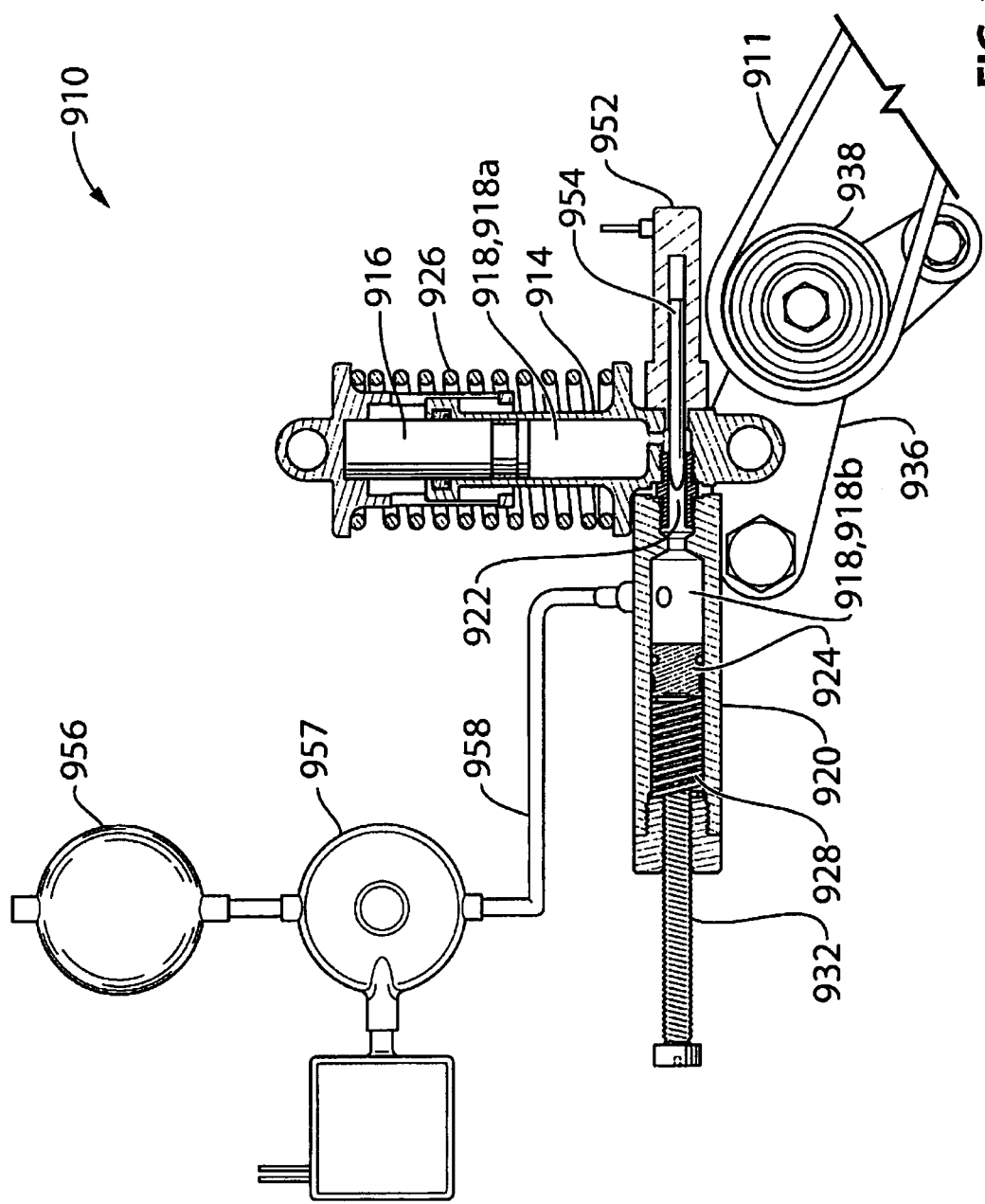
FIG. 29*b* is a sectional side view of another variant of the portion of the tensioner shown in FIG. 17 with a needle valve in a second position.

Reference is made to FIGS. 29a and 29b which show alternative structures for locking the tensioner 910 and for boosting the tension in the tensioner 910. A needle valve shown at 952 may be provided for controlling the flow of fluid between the first chamber portion shown at 918a and the second chamber portion shown at 918b. The needle valve 952 includes a flow control element 954 that is positionable in at least an open position wherein flow through the passageway 922 is permitted and a closed position (FIG. 29b) wherein flow through the passageway 922 is prevented. The flow control element 954 may be positionable in only those two positions (by means, for example, of a two-position solenoid) or alternatively it may be positionable in three or more positions. In some embodiments it may be infinitely adjustable in position via proportional control. When the flow control element 954 is in the closed position, the tensioner 910 is locked hydraulically in position, in similar manner to the embodiment shown in FIGS. 15-28 in which the threaded rod 932 is adjusted to abut the second piston 924. When the flow control element 954 is in the open position it does not prevent the cylinder 912 from extending and retracting. When the flow control element is positionable in one or more partially open positions, an example of which is shown in FIG. 29a, it can be used as an adjustable orifice to control the rate of flow of fluid between the chamber portions 918a and 918b, thereby controlling the rate of extension or retraction that is available to the cylinder 912 and acting as a damping member. While the threaded rod 932 is shown in FIGS. 29a and 29b it is not needed and the second housing 920 could simply have a closed end instead.

Also shown in FIGS. 29a and 29b is an alternative tension boost mechanism shown at 955. The tension boost mechanism includes a fluid reservoir 956 and a pressure source 957, such as an electric pump. The pressure source 957 connects to the chamber portion 918b (or alternatively to somewhere else in chamber 918), via conduit 958. When it is desired to boost the tension, the pump 957 operates to pump fluid into the chamber 918, forcing the second piston 914 backwards until the second biasing member 928 can no longer compress, and forcing the cylinder 912 to extend to drive the pulley 938 into the belt 911. When a desired tension is reached in the belt a valve (not shown) in conduit 958 can be closed which would still permit the tensioner 910 to extend and retract, or alternatively, the locking valve 952 could be closed, however this would lock the tensioner 910 in position.

Reference is made to FIG. 30, which shows the controller 34. As described above the controller receives input 960 that may include any one or more of the following:

Engine ECU Parameters
Time information, which provides daily driver information such as time of vehicle use, days on/days off and the like;
Date information, which provides seasonal time of year approximations, and which may be available from SAT radio/GM OnStar™/Ford Sync™/ECU with battery backup;
Engine information, including RPM (based on crankshaft pulley speed)/engine on/engine start successful
Transmission information including transmission gear position & shift status which provides rate of acceleration/deceleration information for belt slip prediction/transmission downshift & upshift information,
Cruise Control information: prolonged steady state speed would imply that use of lower belt tension is permissible/no rapid engine RPM transitions
Vehicle ECU Parameters
Windshield wiper status—Via CAN bus
Windshield rain sensor—Via CAN bus Traction control system wheel slip status (acceleration)—wheel slippage indicates wet or slushy road conditions—predicts belt contamination/belt slip probability ABS system wheel slip status (braking)—wheel slippage indicates wet or slushy road conditions—predicts belt contamination/belt slip danger probability Key fob Sensor in a simple embodiment it can be used to sense the approach of any driver and can adjust belt tension prior to initial cold engine start. In a more advanced embodiment it can sense approach of driver 1/driver 2—and can predicts driver driving style Ignition Status:

Ignition Status: For a hybrid vehicle stop/start applications—if brakes are applied and if wheel speed=0 and engine RPM=0 would indicate to increase belt tension Wheel Speed—Hybrid stop/start applications—if brakes are applied AND if wheel speed=0 AND if engine RPM=0 this is an indication to increase belt tension Brakes—Hybrid stop/start applications—if brakes are applied AND if wheel speed=0 AND engine RPM=0 then this is an indication to increase belt tension Engine RPM—Hybrid stop/start applications—if brakes are applied AND if wheel speed=0 AND if engine RPM=0 then this is an indication increase belt tension Headlight Status—If the high beams are on this may indicate fog or some other wet condition in which it would be beneficial to increase belt tension Throttle position sensor, and the Brake position sensor: this includes the actual positions of the accelerator pedal and brake pedal, and the rate of change in the positions of the accelerator pedal and the brake pedal: these may be used to indicate whether the vehicle is coming to a stop, is leaving a stopped condition, or is in a panic stop, or is in a panic acceleration Driver selectable settings, such as the driving mode (LUXURY, SPORT, ECO, NORMAL—used to control shift map for the transmission and in some cases the suspension settings). Seat settings, mirror settings and the like may also be used to indicate to the vehicle which driver is in it, which can be used to indicate whether or not high tension in the belt is likely to be needed.

Fead Component Information

Battery voltage and battery outgoing current

Electric Fan on/off status—indicates that the alternator may need to be started to maintain the battery charge Alternator regulator status (charge status: on/off)

Alternator speed via rotor rotation output

Alternator temperature

Alternator voltage

Alternator charge current

Hydraulic power steering pressure switch: this indicates power steering status—on/off, if traveling on a highway no turns are anticipated and so the hydraulic power steering usage is expected to be low Electric power steering motor status: indicates power steering status—on/off, if traveling on a highway no turns are anticipated and so the electric power steering usage is expected to be low Air conditioning compressor clutch state: A/C compressor shaft on/A/C compressor shaft off Waterpump SWP clutch state: waterpump impeller on/waterpump impeller off Idler pulley speed (for belt slip calculation where tensioner pulley speed sensor is not viable)

Tensioner pulley speed (for belt slip calculation where tensioner pulley speed is provided)

Tensioner arm angle position (measures tensioner arm rotation angle using the tensioner arm position sensor (e.g. shown at 462)

Bumper arm information: This information could include: extended/retracted if using a two position sensor, or could include multiple positions between extended and retracted positions to provide more precise information regarding the force applied to the tensioner arm by the bumper arm. Optionally a continuous displacement sensor can be provided to indicate the amount of compression in the second biasing member more accurately. A load cell sensor could be provided which would provide direct information relating to the amount of force being applied by the bumper arm to the tensioner arm.

Spindle position sensor—measures rotation of spindle—which provides spring tang wind up angle in embodiments where the first end of the biasing member is moved by the actuator.

Dedicated Sensor Inputs

Temperature sensor for under hood (engine bay) temperature, close to FEAD belt drive Humidity sensor for under hood (engine bay) humidity, close to FEAD belt drive Temperature sensor—absolute outside ambient outdoor temperature Humidity sensor—absolute outside ambient out door humidity Dedicated Sensor and Calculation Procedures and Inputs Pulley torsional vibration measurement can be as described in PCT publication WO2006045181 the contents of which are incorporated herein by reference. Belt elongation and belt stretch measurement can be as described in PCT publication WO2007143830 the contents of which are incorporated herein by reference.

Belt flutter/belt twist may be detected as a vibration or as an underhood noise by acoustic microphones, vibration sensors, or perhaps, by simple "touch" proximity sensors.

Input 960 may also include any other input described herein and may include other inputs also not described herein. The controller 34 uses these inputs to determine whether or not the change the tension in the tensioner. The controller 34 controls the motor 962 accordingly which may be the motor in any of the embodiments described herein.

While the term 'belt' has been used and an accessory drive belt has been described in much of the description above, it will be understood that the present invention may be applied advantageously to other types of endless drive member such as a timing belt, a timing chain and any other type of endless drive member.

While the description contained herein constitutes a plurality of embodiments of the present invention, it will be appreciated that the present invention is susceptible to further modification and change without departing from the fair meaning of the accompanying claims.

The invention claimed is:

1. A tensioner for a vehicle engine accessory drive system having an endless drive member, at least one drive pulley disposed to drive the endless drive member, and at least one driven pulley disposed to be driven by the endless drive member and connected to drive an accessory, the tensioner comprising:

a tensioner arm mounted to the engine for movement along a path delimited by a free arm position and a load stop position;

a tensioner pulley rotatably mounted to the tensioner arm, the tensioner pulley engaging the endless drive member;

a biasing member arranged to urge the tensioner arm in a first direction along the path towards the free arm position; and an adjustable load stop mechanism including a moveable load stop member, a drive mechanism for moving the load stop member and a controller connected to the drive mechanism;

wherein the load stop member arrests movement of the tensioner arm along the path in a second direction, opposite the first direction, to thereby define the load stop position;

wherein the load stop member is moveable between a first position correlated to the tensioner free arm position and a second position correlated to a tensioner arm position that is maximally displaced from the tensioner free arm position, and wherein, provided the load stop member is not in the first position, the tensioner arm is unconstrained by the load stop member to move in the first direction toward the free arm position;

wherein the drive mechanism moves the load stop member to thereby vary the location of the tensioner arm load stop position; and wherein the controller directs the drive mechanism to move the load stop member towards the first position and in the process actively drive the tensioner arm towards the free arm position so as to increase tension on the endless drive member.

2. A tensioner as claimed in claim 1, wherein the tensioner arm is pivotally mounted to the engine and the tensioner arm path is arcuate.

3. A tensioner as claimed in claim 1, wherein the tensioner arm is connected to a housing and the biasing member acts between the housing and the tensioner arm such that, when the tensioner arm is arrested by the load stop member, at least a portion of the reaction load arising from the tension placed on the endless drive member bypasses the biasing member and is borne by the load stop member.

4. A tensioner as claimed in claim 3, wherein:
the tensioner arm is pivotally connected to a first cylinder filled with incompressible fluid;
the first cylinder is fluidly connected to a second cylinder;
a first piston is mounted in the first cylinder such that as the tensioner arm moves in the second direction the cylinder is compressed and the incompressible fluid flows into the second cylinder;
a second piston is moveably mounted in the second cylinder;
the load stop member is provided by a moveable shaft that projects into the second cylinder and is disposed within a travel path of the second piston; and
wherein the shaft drives the second piston to transfers fluid from the second cylinder into the first cylinder to thereby extend the first cylinder and move the tensioner arm in the first direction towards the free arm position.

5. A tensioner as claimed in claim 4, wherein the second piston is biased into engagement with the incompressible fluid in the second cylinder.

6. A tensioner as claimed in claim 4, wherein the shaft includes a screw thread meshing with a corresponding nut thread in the second cylinder and the drive mechanism is provided by an electric motor connected via a transmission to rotate the shaft.

7. A tensioner as claimed in claim 1, wherein in the engine accessory drive system a drive pulley and a driven pulley are capable of reversing roles such that the driven pulley becomes a drive pulley and the drive pulley becomes a driven pulley.

* * * * *